(12) United States Patent
Roselli et al.

(10) Patent No.: US 8,645,248 B2
(45) Date of Patent: Feb. 4, 2014

(54) INTEGRATED CUSTOMER COMMUNICATIONS COMPUTER SYSTEM AND PROCESS FOR IMPLEMENTING SAME

(75) Inventors: Paris F. Roselli, Buffalo, NY (US); Ronald M. Lesandro, Hamburg, NY (US); Martin Hayes, New York, NY (US); Neil T. Parsons, Vancouver (CA); Michael R. Antognoli, Chicago, IL (US); Atakorn Tangtrakul, Chicago, IL (US); Anil Diwan, Chicago, IL (US); Richard A. Gemma, Chicago, IL (US)

(73) Assignee: HSBC Technology & Services (USA) Inc., Mettawa, IL (US)

( * ) Notice: Subject to any disclaimer, the term of this patent is extended or adjusted under 35 U.S.C. 154(b) by 0 days.

(21) Appl. No.: 13/282,822

(22) Filed: Oct. 27, 2011

(65) Prior Publication Data

US 2012/0179677 A1 Jul. 12, 2012

Related U.S. Application Data

(60) Provisional application No. 61/407,210, filed on Oct. 27, 2010, provisional application No. 61/435,000, filed on Jan. 21, 2011.

(51) Int. Cl.
*G06Q 40/00* (2012.01)
(52) U.S. Cl.
USPC .............. 705/35; 707/736; 715/235; 715/253
(58) Field of Classification Search
USPC .................................. 707/736; 715/235, 253
See application file for complete search history.

(56) References Cited

U.S. PATENT DOCUMENTS

| | | |
|---|---|---|
| 5,866,889 A | 2/1999 | Weiss |
| 6,021,397 A | 2/2000 | Jones et al. |
| 6,131,810 A | 10/2000 | Weiss |
| 6,199,077 B1 | 3/2001 | Inala |
| 6,278,993 B1 | 8/2001 | Kumar |
| 6,292,789 B1 * | 9/2001 | Schutzer ........................ 705/40 |
| 6,354,490 B1 | 3/2002 | Weiss |
| 6,412,073 B1 | 6/2002 | Rangan |
| 6,567,850 B1 | 5/2003 | Freishtat |
| 6,594,766 B2 | 7/2003 | Rangan |
| 6,633,910 B1 | 10/2003 | Rajan |

(Continued)

OTHER PUBLICATIONS

International Search Report and Written Opinion from International application No. PCT/US11/58014, issued Feb. 27, 2012.

(Continued)

*Primary Examiner* — Pierre Vital
*Assistant Examiner* — Christopher J Raab
(74) *Attorney, Agent, or Firm* — Stroock & Stroock & Lavan LLP

(57) ABSTRACT

An integrated customer communications computer system is configured to provide outbound customer communications. The communications computer system generates documents associated with the communications in a predefined format, in real-time or in batch, by merging templates comprising static data received from a template repository, dynamic data received from at least one component of an account opening system, and static content for the templates received from a content repository. The communications computer system includes a communication manager, a plurality of transmission channels, an interface for managing the templates and the content, and a document repository. Various embodiments are described, including a computer implemented method of providing customer communications using an integrated customer communications component and/or module.

50 Claims, 63 Drawing Sheets

(56) References Cited

U.S. PATENT DOCUMENTS

| | | |
|---|---|---|
| 6,725,425 B1 | 4/2004 | Rajan |
| 6,802,042 B2 | 10/2004 | Rangan |
| 6,859,212 B2 | 2/2005 | Kumar |
| 6,865,680 B1 | 3/2005 | Wu |
| 6,867,789 B1 | 3/2005 | Allen et al. |
| 6,871,220 B1 | 3/2005 | Rajan |
| 6,871,346 B1 | 3/2005 | Kumbalimutt et al. |
| 6,886,025 B1 * | 4/2005 | Britton .................... 709/201 |
| 7,013,310 B2 | 3/2006 | Messing |
| 7,085,997 B1 | 8/2006 | Wu |
| 7,178,096 B2 | 2/2007 | Rangan |
| 7,200,804 B1 | 4/2007 | Khavari |
| 7,203,845 B2 | 4/2007 | Sokolic |
| 7,225,464 B2 | 5/2007 | Satyavolu |
| 7,313,813 B2 | 12/2007 | Rangan |
| 7,321,874 B2 | 1/2008 | Dilip |
| 7,321,875 B2 | 1/2008 | Dilip |
| 7,383,223 B1 | 6/2008 | Dilip |
| 7,424,520 B2 | 9/2008 | Daswani |
| 7,505,937 B2 | 3/2009 | Dilip |
| 7,536,340 B2 | 5/2009 | Dheer |
| 7,571,140 B2 | 8/2009 | Weichert et al. |
| 7,577,598 B2 | 8/2009 | Rousseau et al. |
| 7,606,752 B2 | 10/2009 | Hazlehurst |
| 7,644,023 B2 | 1/2010 | Kumar |
| 7,657,761 B2 | 2/2010 | Sokolic |
| 7,672,879 B1 | 3/2010 | Kumar |
| 7,676,751 B2 | 3/2010 | Allen et al. |
| 7,685,525 B2 | 3/2010 | Kumar |
| 7,729,283 B2 | 6/2010 | Ferguson |
| 7,734,541 B2 | 6/2010 | Kumar |
| 7,797,207 B1 | 9/2010 | Dilip |
| 7,856,386 B2 | 12/2010 | Hazlehurst |
| 7,856,453 B2 | 12/2010 | Malik |
| 7,873,677 B2 | 1/2011 | Messing |
| 7,925,579 B1 | 4/2011 | Flaxman et al. |
| 7,933,819 B2 | 4/2011 | Dumas et al. |
| 2001/0042785 A1 | 11/2001 | Walker et al. |
| 2002/0091635 A1 | 7/2002 | Dilip |
| 2002/0156720 A1 | 10/2002 | Chow |
| 2002/0165745 A1 | 11/2002 | Greene et al. |
| 2002/0165993 A1 | 11/2002 | Kramer |
| 2003/0069780 A1 | 4/2003 | Hailwood et al. |
| 2003/0101131 A1 | 5/2003 | Warren |
| 2003/0120593 A1 | 6/2003 | Bansal et al. |
| 2003/0135457 A1 | 7/2003 | Stewart |
| 2003/0158928 A1 | 8/2003 | Knox et al. |
| 2003/0187741 A1 | 10/2003 | Brown et al. |
| 2003/0208526 A1 * | 11/2003 | Imanishi et al. ........... 709/201 |
| 2003/0225692 A1 | 12/2003 | Bosch |
| 2003/0236728 A1 | 12/2003 | Sunderji |
| 2004/0015818 A1 * | 1/2004 | McDonald et al. ........... 717/102 |
| 2004/0019853 A1 * | 1/2004 | Takizawa et al. ........... 715/523 |
| 2004/0230417 A1 | 11/2004 | Kraiss et al. |
| 2004/0230516 A1 | 11/2004 | Crosthwaite |
| 2005/0018249 A1 | 1/2005 | Miura et al. |
| 2005/0125442 A1 * | 6/2005 | Oxman et al. ........... 707/103 Y |
| 2005/0144101 A1 | 6/2005 | Khandros |
| 2005/0171833 A1 | 8/2005 | Jost et al. |
| 2005/0187809 A1 * | 8/2005 | Falkenhainer ............ 705/9 |
| 2005/0246269 A1 | 11/2005 | Smith |
| 2005/0262453 A1 | 11/2005 | Massasso |
| 2006/0036954 A1 | 2/2006 | Satyadas et al. |
| 2006/0075334 A1 * | 4/2006 | Sato .................... 715/523 |
| 2006/0101393 A1 * | 5/2006 | Gerken et al. ........... 717/109 |
| 2006/0116949 A1 | 6/2006 | Wehunt |
| 2006/0143107 A1 | 6/2006 | Dumas et al. |
| 2006/0195816 A1 | 8/2006 | Grandcolas et al. |
| 2006/0230343 A1 | 10/2006 | Armandpour |
| 2006/0253463 A1 | 11/2006 | Wu |
| 2007/0022027 A1 | 1/2007 | Gupta et al. |
| 2007/0061254 A1 | 3/2007 | Blunck |
| 2007/0067239 A1 | 3/2007 | Dheer |
| 2007/0089047 A1 | 4/2007 | Joshi |
| 2007/0130347 A1 | 6/2007 | Rangan |
| 2007/0180380 A1 | 8/2007 | Khavari |
| 2007/0244816 A1 | 10/2007 | Patni |
| 2007/0282627 A1 * | 12/2007 | Greenstein et al. ........... 705/1 |
| 2008/0080017 A1 * | 4/2008 | Ishizuka et al. ........... 358/452 |
| 2008/0082454 A1 | 4/2008 | Dilip |
| 2008/0086403 A1 | 4/2008 | Dilip |
| 2008/0086426 A1 | 4/2008 | Dilip |
| 2008/0091591 A1 | 4/2008 | Egnatios |
| 2008/0091593 A1 | 4/2008 | Egnatios |
| 2008/0091600 A1 | 4/2008 | Egnatios |
| 2008/0098030 A1 * | 4/2008 | Edd et al. .................... 707/102 |
| 2008/0177848 A1 | 7/2008 | Wakhlu |
| 2008/0189185 A1 | 8/2008 | Matsuo |
| 2008/0208737 A1 | 8/2008 | Dilip |
| 2008/0262901 A1 | 10/2008 | Banga et al. |
| 2008/0275816 A1 | 11/2008 | Hazlehurst |
| 2008/0288376 A1 | 11/2008 | Panthaki |
| 2008/0288400 A1 | 11/2008 | Panthaki |
| 2008/0288861 A1 * | 11/2008 | Jones et al. .................... 715/253 |
| 2008/0301023 A1 | 12/2008 | Patel |
| 2008/0306846 A1 | 12/2008 | Ferguson |
| 2009/0006582 A1 | 1/2009 | Daswani |
| 2009/0007098 A1 | 1/2009 | Chevrette et al. |
| 2009/0024505 A1 | 1/2009 | Patel |
| 2009/0030771 A1 | 1/2009 | Eder |
| 2009/0048999 A1 | 2/2009 | Gupta et al. |
| 2009/0112753 A1 | 4/2009 | Gupta et al. |
| 2009/0234466 A1 | 9/2009 | Kunze |
| 2009/0265211 A1 | 10/2009 | May et al. |
| 2009/0276359 A1 | 11/2009 | Panthaki |
| 2010/0030687 A1 | 2/2010 | Panthaki |
| 2010/0063896 A1 | 3/2010 | Rose |
| 2010/0094878 A1 | 4/2010 | Soroca et al. |
| 2010/0121677 A1 | 5/2010 | An et al. |
| 2010/0205065 A1 | 8/2010 | Kumar |
| 2010/0205079 A1 | 8/2010 | Ferguson |
| 2010/0217662 A1 | 8/2010 | Ramer et al. |
| 2010/0293447 A1 * | 11/2010 | Kadowaki et al. ........... 715/201 |
| 2010/0299286 A1 | 11/2010 | Dilip |
| 2011/0029491 A1 * | 2/2011 | Joshi et al. .................... 707/692 |

OTHER PUBLICATIONS

International Search Report and Written Opinion from International application No. PCT/US11/55767, issued Mar. 7, 2012.
International Search Report and Written Opinion from International application No. PCT/US11/056839, issued Mar. 8, 2012.
International Search Report and Written Opinion from International application No. PCT/US11/37143, issued Sep. 21, 2011.
International Search Report and Written Opinion from International application No. PCT/US12/22022, issued May 8, 2012.

* cited by examiner

Create Document eMail Channel (HTML) OnDemand Batch Archival System Flow

Print Channel (AFP) OnDemand Batch Archival System Flow

Internet Channel (PDF & HTML) OnDemand Real Time Archival System Flow

ICCM 1.2 Proposed Core Environments (Dev-Integration, SIT, SAT)

ICCM 1.2 Proposed Core Environment (SAT)
After OnDemand Goldstack is Approved

ICCM Deployment View

Figure 63

INTEGRATED CUSTOMER COMMUNICATIONS COMPUTER SYSTEM AND PROCESS FOR IMPLEMENTING SAME

RELATED APPLICATIONS

This application claims the benefit of, and priority to, U.S. Provisional Application No. 61/407,210, filed Oct. 27, 2010, entitled "Integrated Customer Communications Module (ICCM)," and U.S. Provisional Application No. 61/435,000, filed Jan. 21, 2011, entitled "Account Opening Flow Configuration: Navigation Interceptor and Portlet Wiring." This application is related to International Application No. PCT/US2011/037143, filed May 19, 2011, entitled "Account Opening Computer System Architecture and Process for Implementing Same"; International Application No. PCT/US2011/055767, filed Oct. 11, 2011, entitled "Computer Architecture and Process for Application Processing Engine"; and International Application No. PCT/US2011/056839, filed Oct. 19, 2011, entitled "Computer Metrics System and Process for Implementing Same." Each of the above applications is incorporated herein by reference in its entirety.

BACKGROUND

Emerging systems and methods lack straight through computer processing for a variety of technological and/or computer driven processes to support both flexibility and global consistency, to standardize processes for an enhanced customer experience, and to reduce the need for IT support and other development resources. We have determined, however, that an organization's global footprint, economies of scale, and local expertise can all be leveraged for the benefit of computer service and/or resource users globally.

We have developed an integrated customer communications module, supporting a variety of application processing services within an computer system.

SUMMARY

An integrated customer communications computer system includes at least one computer database; and a communications computer system, in communication with said at least one database and at least one component of an account opening system, and configured to provide outbound customer communications.

In some embodiments, the communications computer system generates documents associated with the communications in a predefined format, in real-time or in batch, by merging templates comprising static data received from a template repository, dynamic data received from said at least one component of the account opening system, and static content for the templates received from a content repository.

In some embodiments, the communications computer system includes a communication manager, comprising a communication controller receiving, recording, sending, and processing at least one of communication requests and history requests from the at least one component of the account opening system, and transmitting communications responsive thereto; a document manager managing documents associated with the communications; and a communication history component maintaining a record of the communications transmitted, including at least one of date, time, channel, and content, and saving the record to a communication history database;

In some embodiments, the communications computer system includes a plurality of transmission channels for transmitting the communications; an interface for managing the templates and the content; and a document repository storing, retrieving, and managing storage of the documents.

In some embodiments, the communications computer system transmits the documents to at least one of the channels via a communication link.

In some embodiments, the communications computer system transmits the documents to at least one of multiple channels and multiple recipients.

In some embodiments, the communications computer system receives channel preferences for the communication from a customer data management system.

In some embodiments, the communication requests comprise individual communication requests and batch communication requests.

In some embodiments, the communication manager further comprises a batch handler managing batch communications responsive to the batch communication requests.

In some embodiments, the communication requests are for at least one of a new document to be generated by the communications computer system and an existing document to be retrieved from said at least one database.

In some embodiments, the communications computer system is configured to determine when more than one communication for the same recipient is transmitted by the same communication method, and when the more than one communication is transmitted by the same communication method, the communications computer system groups the communications together into one communication.

In some embodiments, the communications computer system provides logs of the communications to a customer contact history database.

In some embodiments, the document repository manages the storage of the documents by setting a configurable maximum storage period at a document level.

In some embodiments, the communications computer system converts a saved document to a different format for transmission.

In some embodiments, the interface for managing the templates is configured to provide a user functionality to create, preview, edit, maintain and delete communication templates for different channels, define what data items are included in the communication, insert dynamic variables that vary by at least one of channel and communication type, define a source of the dynamic data for the communication, and make deployments to various environments for validation.

In some embodiments, the communication history component maintains and configures the communication history to be searchable by at least one of customer, communication type, channel, and date.

In some embodiments, the communications computer system provides the communications automatically, responsive to a predetermined configurable trigger event or alert.

In some embodiments, the communications computer system is configured to capture metrics data regarding messages sent, delivered, bounced, opened, and clicked, and transmit the metrics data to a computer intelligence system to generate reports at aggregate and detailed customer level views.

In some embodiments, the communications computer system further includes an interface that is configured to provide a user functionality to manage communications; access, retrieve, and view the stored documents; view the communication history; and view metrics and request reports.

In some embodiments, the communication controller receives the at least one of communication requests and history requests from at least one of a front end application, an application processing engine, and a product or service system.

In some embodiments, the communication controller is configured to route the communication requests to a predetermined channel for distribution.

In some embodiments, the front end application executes at least one of a free format portlet to transmit a free format communication, and a communication history portlet enabling a user to search the transmitted communications for review and resend to the same transmission channel.

In some embodiments, the communications computer system transmits the documents to a third party system, including at least one of a print service provider, an SMS provider, and an email provider.

In some embodiments, the communication requests include a request type, a message ID, a message version, a product type, a document type, a channel ID, customer data, and account information.

In some embodiments, the communication requests comprise information regarding what documents are to be sent, the dynamic data required to generate the documents, the document formats, the delivery channels, and the data required by the delivery channels.

In some embodiments, the communications computer system is configured to determine when the data required by the delivery channels is not provided in the communication request, and when the data required by the delivery channels is not provided in the communication request, the communications computer system retrieves the data from the at least one component of the account opening system.

In some embodiments, the communications computer system further includes a message handler providing an interface to external applications.

In some embodiments, the communications computer system is configured to transmit the communications using the dynamic data and the templates to an automated teller machine (ATM).

In some embodiments, the interface for managing the templates and the content is configured to be accessible to a user based on entitlements.

In some embodiments, the interface for managing the templates and the content is configured to provide the user functionality to request the communications, and the user functionality to request the communications comprises functionality to select the template comprising at least one of header, footer, marketing, body, and web links; select a milestone comprising at least one of validate identity, decisioning, product configuration, funding, and boarding/fulfillment; select at least one of a message type, a brand, a line of business description, a language, a layout, and a channel; and enter the content and select images to be included in the document, and the communications computer system is configured to display, responsive to the user selection, the template specific for the selected channel and layout.

In some embodiments, the interface for managing the templates and the content is configured to interface with a content management application to retrieve a channel layout template, generate the content, apply the content to the template, and transmit the communication to the customer.

In some embodiments, the interface for managing the templates and the content is configured to receive input from a user comprising at least one of text, images, layout, and templates, and to deploy content control files comprising user entered content and images in a predetermined format responsive to the channel to a content and template host server.

In some embodiments, the content and template hosting server is configured to be accessible to local interfaces of different geographical locations for managing the templates and the content.

In some embodiments, the communication controller is configured to receive inbound communications from a plurality of channels.

In some embodiments, a computer implemented method of providing integrated customer communications includes generating documents associated with the communications in a predefined format, in real-time or in batch, by merging templates comprising static data received from a template repository, dynamic data received from said at least one component of the account opening system, and static content for the templates received from a content repository, including receiving, recording, sending, and processing at least one of communication requests and history requests from the at least one component of the account opening system, and transmitting communications responsive thereto; managing documents associated with the communications; and maintaining a record of the communications transmitted, including at least one of date, time, channel, and content, and saving the record to a communication history database.

In some embodiments, the method includes transmitting the communications via one or more transmission channels; managing the templates and the content; and storing, retrieving, and managing storage of the documents.

In some embodiments, the method includes transmitting the documents to multiple channels and/or multiple recipients.

In some embodiments, the method includes managing batch communications responsive to batch communication requests.

In some embodiments, the method includes determining when more than one communication for the same recipient is transmitted by the same communication method, and when the more than one communication is transmitted by the same communication method, grouping the communications together into one communication.

In some embodiments, the method includes providing logs of the communications to a customer contact history database.

In some embodiments, the method includes creating, previewing, editing, maintaining and deleting communication templates for different channels, defining what data items are included in the communication, inserting dynamic variables that vary by at least one of channel and communication type, defining a source of the dynamic data for the communication, and making deployments to various environments for validation.

In some embodiments, the method includes generating the documents associated with the communications automatically, responsive to a predetermined configurable trigger event or alert.

In some embodiments, the method includes capturing metrics data regarding messages sent, delivered, bounced, opened, and clicked, and transmitting the metrics data to a computer intelligence system to generate reports at aggregate and detailed customer level views.

In some embodiments, the method includes managing communications; accessing, retrieving, and viewing the stored documents; viewing the communication history; and/or viewing metrics and request reports.

In some embodiments, the method includes transmitting the documents to a third party system, including at least one of a print service provider, an SMS provider, and an email provider.

In some embodiments, the method includes determining when the data required by the delivery channels is not provided in the communication request, and when the data required by the delivery channels is not provided in the communication request, retrieving the data from the at least one component of the account opening system.

In some embodiments, the method includes transmitting the communications using the dynamic data and the templates to an automated teller machine (ATM).

In some embodiments, the method includes requesting the communications, including selecting the template comprising at least one of header, footer, marketing, body, and web links; selecting a milestone comprising at least one of validate identity, decisioning, product configuration, funding, and boarding/fulfillment; selecting at least one of a message type, a brand, a line of business description, a language, a layout, and a channel; and entering the content and select images to be included in the document.

In some embodiments, the method includes interfacing with a content management application to retrieve a channel layout template, generate the content, apply the content to the template, and transmit the communication to the customer.

In some embodiments, the method includes receiving input from a user comprising at least one of text, images, layout, and templates, and deploying content control files comprising user entered content and images in a predetermined format responsive to the channel to a content and template host server.

In some embodiments, the method includes receiving inbound communications from a plurality of channels.

BRIEF DESCRIPTION OF THE DRAWINGS

FIG. 9 shows an exemplary Send Communication use case.

FIG. 10 shows an exemplary Send Communication—Batch use case.

FIG. 11 shows an exemplary Re-Send Communication—Print use case.

FIG. 12 shows an exemplary Re-Send Communication—Email use case.

FIG. 13 shows an exemplary Create Document use case.

FIG. 17 is an exemplary diagram of the Search Communication History function.

FIG. 18 is an exemplary diagram of the Search Communication function.

FIG. 19 is an exemplary diagram of the Create Document function.

FIG. 20 is an exemplary diagram of the Resend Communication function.

FIG. 21 is an exemplary diagram of the Retrieve Archived Document function.

FIG. 22 is an exemplary diagram of the Send Batch Communication function.

FIG. 23 is an exemplary diagram of the Update Communication History Status function

FIG. 63 illustrates an exemplary screen showing message history for a customer.

DETAILED DESCRIPTION

The integrated customer communications module (ICCM) of the present invention provides computer system architectures and computer implemented methods for customer communications. ICCM supports a variety of communication types (print, email, SMS, etc.) and user types (customer, staff, etc.), and may work in conjunction with a plurality of account opening component systems to support an overall account opening process.

In various embodiments, ICCM can serve as a single source for templates and content for merging communications to/from customers, provide straight through processing of customer communications, and eliminate the need for each individual system to develop its own communication solution. Thus, ICCM can maximize reuse, promote standardization, reduce time to market, and reduce cost.

Figure 1:
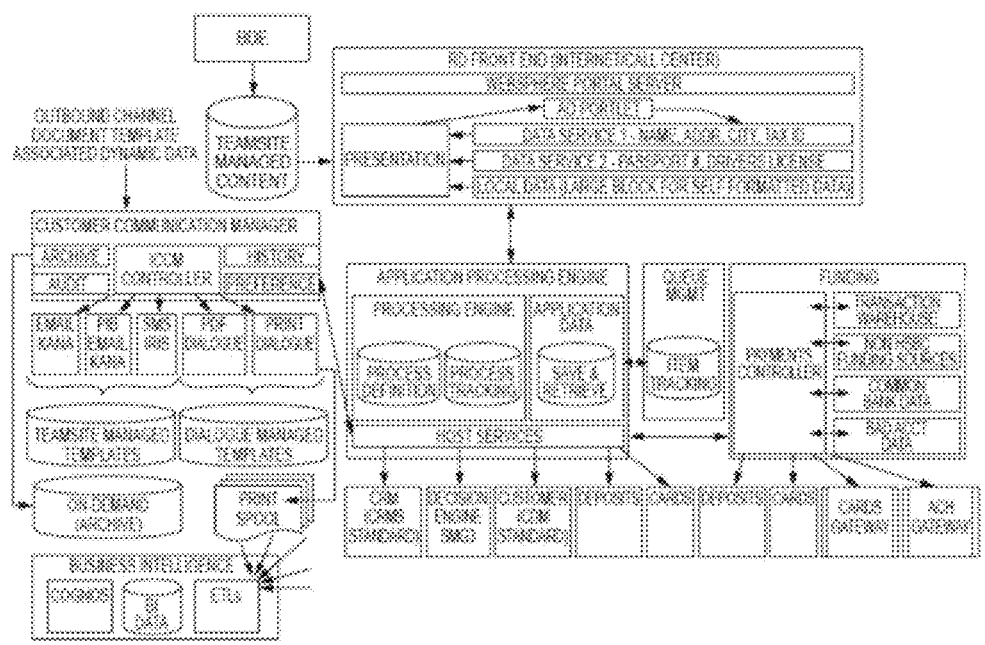
FIG. 1 is an exemplary diagram showing how ICCM may interface with various account opening product/service systems or data stores to receive communication requests and data input, according to some embodiments of the invention.

As shown, for example, in FIG. 1 according to some embodiments, ICCM can interface with various account opening product/service systems or data stores to receive communication requests and data input. ICCM can then render a document in a pre-defined format in real-time or in batch.

ICCM output can be delivered through a variety of delivery channels, including multiple channels. ICCM can work with any channel needed by a calling product/service system, including, but not limited to, Internet, E-mail, SMS, Phone (outbound dialler), Print, Fax, ATM, Kiosk, and Secure Messages. Users can receive communication in their language of choice, via their preferred delivery channel(s), when they need it.

ICCM can also store documents and communication records with appropriate access controls.

In some embodiments, ICCM comprises the following main components:

(1) Communication Request Router: The Communication Request Router accepts communications requests from One-HSBC (OH) systems and local systems and routes those requests to the appropriate channel for distribution. The request may contain, for example, information regarding what documents are to be sent, the dynamic data required to generated new documents, the document formats, and the delivery channels and the data required by the delivery channels, etc. In some embodiments, if all of the data required by the delivery channels is not provided in the request, then ICCM retrieves it from the appropriate systems.

(2) Template and Document Management Tools: The Template Management tool may be used to create, store, preview, amend, delete and maintain templates used in generation of documents in formats needed by the channels. The Document Management tool is used in the creation and storage of documents.

(3) User interfaces: User interfaces can, for example, allow a user to set and manage communication; access, retrieve and view documents; view communication history; and/or view metrics and run reports (this may be provided by the work stream handling metrics functionality).

Figure 2:
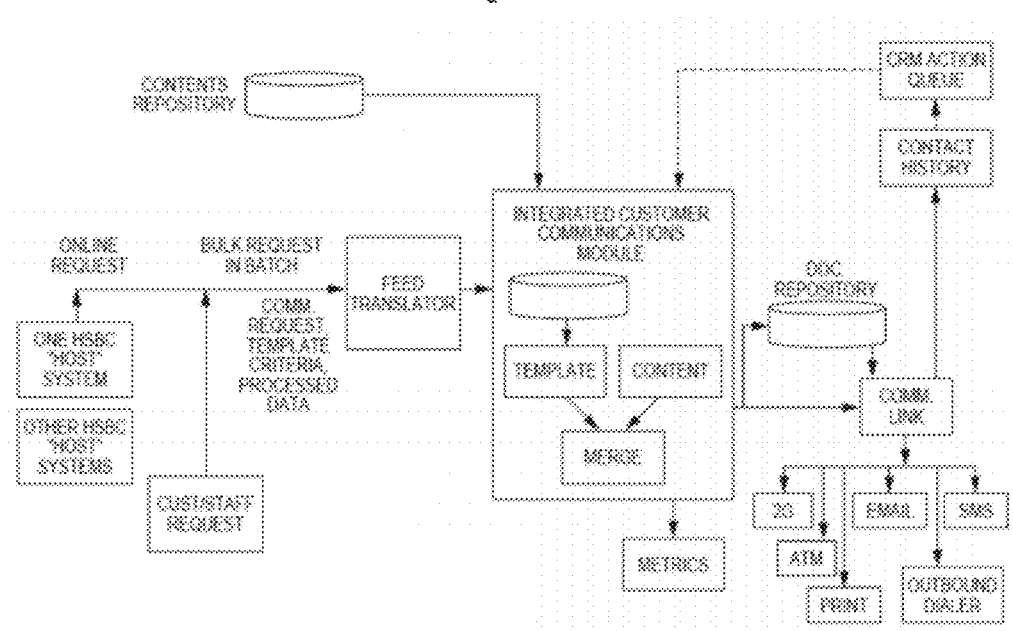
FIG. 2 provides an exemplary view of the main flow of the outbound customer communication processes, according to some embodiments.

FIG. 2 provides an exemplary view of the main flow of the outbound customer communication processes, according to some embodiments.

Host systems such as HUB or processes such as Account Opening (AO) may send individual communication requests or bulk communication requests in batch to ICCM. Requests may also be made by staff or customer. In addition, ICCM may receive requests via CRM Action Queue.

The requests may be for new documents, existing documents, or a combination of both. Sometimes, a previous communication may be requested again, to be sent either to the same address or additional addresses.

In some embodiments, for new documents, the communication request provides ICCM with the template IDs/criteria and the processed data (dynamic data) to produce the documents. The communication request also includes information about the delivery channel(s), the addresses to which the communication is to be delivered, when the communication is to be delivered, branding, etc. It is the responsibility of the host system to collect as much customer and message data as possible prior to handing the request off to the ICCM. If not all data is present, the ICCM will fetch dynamic data (such as the customer preferred channel) to complete the transaction request where appropriate.

Information that may be included with the communication request includes, but is not limited to, one or more of:
   a. Template(s) (criteria for template selection or template IDs) to be used for generating the communication
   b. Entity for which the communication is to be sent
   c. Channel(s) to be delivered to as well as addresses
   d. Date and time for delivery
   e. Despatch Code,
     i. To be used by the print shop to indicate how the printed communication is to be delivered, e.g., mail, courier, recorded delivery, registered post, etc.
     ii. Should be configurable at entity level
   f. Security level of communication
     i. For example:
       1) Communication may be encrypted or not encrypted
       2) Attached document in an email may require password for opening it
       3) Instead of attaching a document, the email may contain a link.

ii. How the security of communication is to be handled should be specified by the Business Design team and may be defined based on the Security Framework, g. Data to enable selection of logos, etc. such as entity name, customer type (Premier), etc.

h. Dynamic data that is to be merged with template's static data. Examples of dynamic data include:
   i. Customer Preferences (including but not limited to) from the customer profile:
      1) Language: For certain documents such as tax receipts (W2 in U.S., T4 in Canada), they may only be in country's official language(s)
      2) Preferred channels; if no preference, default channel
      3) Preferred format (including Braille, audio, etc.)
   ii. Customer data (e.g., customer number, name, addresses for communication)
   iii. Product data (e.g., list of selected product options). Several product attributes may be needed such as product, sub-product, product type, and product brand. Example—credit card, HSBC Cash or Fly, Platinum, HSBC Premier
   iv. Arrangement data (e.g., account number and name, maturity date and instructions for a term product)
   v. Transaction data (e.g., interest applied to a loan account, charges)

In some embodiments, a feed translator may convert the communication request and the data associated with it into a format understandable to ICCM.

In some embodiments, ICCM produces the documents by merging the templates, which contain static data, together with the dynamic data provided by the requester and tailoring content such as logos, barcodes, etc. from a content repository.

The produced documents are transformed into the required formats and provided to the delivery channels via a communication link. A communication may be issued through multiple channels at the same time and to multiple recipients, if necessary. In addition, they may be stored in a permanent storage, such as OnDemand. Existing documents may be retrieved from the storage rather than produced again, transformed into the required formats, and delivered.

In some embodiments, the maximum period for the storage of the documents should be determined at country level since regulations vary from country to country. In some embodiments, a minimum period of seven years can be assumed. The requirement for maximum storage period may vary from document to document. For example, some documents may need to be maintained permanently, some others for the lifetime of the account. Therefore, ICCM can handle the maximum storage period at document level.

For example, in some embodiments, processed data and template criteria received from the host system may include customer data, arrangement data, transaction data, template criteria, urgency of document, security level of communication, etc. ICCM may then select a template based on the provided criteria; select content based on customer data, legal entity, etc. provided; and merge the data from the host system, the content, and the template to output the rendered document. The rendered document may then be stored (e.g., in OnDemand), indexed based on a variety of predetermined parameters for easy and rapid retrieval, and access rights may be set for the document. The rendered document is provided to the preferred channel(s), to specified addresses, in specified number of copies, with specified level of security and specified level of urgency, responsive to customer preferences and any other required criteria.

A record is preferably kept of each and every communication that is issued to a customer through ICCM, including date, time, channel, and content, and stored for a length of time determined by the entity. The history is preferably easily accessible by users in order to help address any enquiries that may arise as a result of the issue of the communication and may also be visible to the customer as described previously. The history may be searched, for example by customer, communication type, channel issued and/or date issued, to allow the user to narrow down the communication items they wish to view.

ICCM has the ability to retrieve and provide communication records based upon specified criteria. If only a single communication record meets the criteria, it will provide that record. If several communication records meet the criteria, it may, for example, provide a list of the records together with descriptive data (e.g., communication name, date, customer number, etc.) as well as their hyperlinks so that the desired communication record may be selected and retrieved.

ICCM can automatically issue a communication to a customer, based on a trigger event or alert. The events/actions that trigger communications to the customer are configurable by the local entity, and may be automated, semi-automated, or manual. For example, the local entity can set up rules surrounding when these triggers will occur, parameterized so they can choose what type of communication will be sent when an event occurs (e.g., send after n days pending, send when an application status changes, etc.). This could apply to both outbound and inbound customer communications. In some embodiments, the account opening system may automatically raise a trigger or alert, based on an event that has taken place (e.g., when a milestone status changes), to ICCM, requesting that a communication be sent. For instance, if an application has been pending for a certain number of days, a chaser communication may be required, at various, pre-determined and repeated intervals.

In some embodiments, in order to enable monitoring, anticipation of potential problems and identification of opportunities for performance improvement, ICCM will capture data and pass it to a data warehouse where appropriate reports will be built at aggregate and detailed customer level views. For example, ICCM can capture total messages sent, delivered, bounced, opened, clicked, etc.

ICCM preferably supports maintenance of an audit trail (e.g., capture and storage of relevant data for follow up in case of issues). ICCM also supports maintenance, storage, and analysis of metrics for process, performance and cost management, SLA management, capacity and volume planning, and supports reporting of metrics and their implications at predetermined frequency to predetermined users, entities, and/or systems.

In various embodiments, ICCM also supports one or more of: the ability to send a document to multiple channels simultaneously; the ability to resend to the same channel and to extend trigger to include other channels; the ability to group together like documentation for the same address (e.g., advices for interest applications to multiple accounts of a customer); ability to group by legal entity when multiple legal entities exist in a country or region; ability to provide parameters for sorting documents based on country or region requirements.

Figure 3:
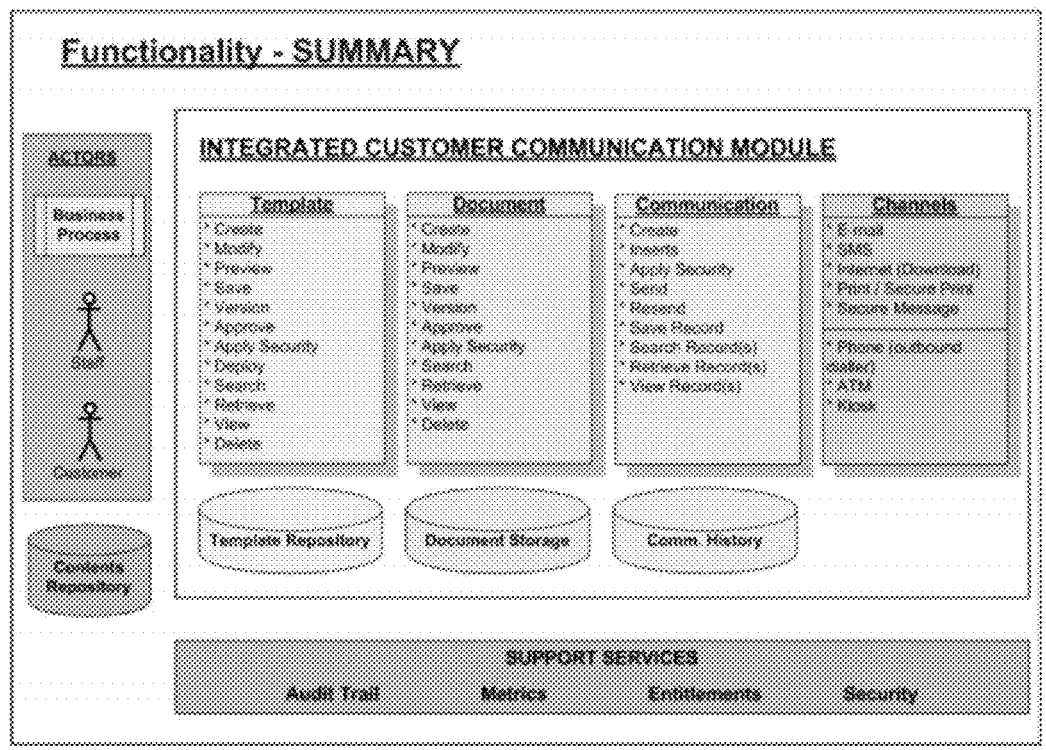
FIG. 3 shows an overview of ICCM functionality, according to some embodiments of the invention.

FIG. 3 shows an overview of ICCM functionality, according to some embodiments of the invention.

ICCM can, for example, support the following exemplary use cases:
Staff Sends Communication (Real Time)
Staff Resends Communication (Real Time)

Customer Resends Communication
Staff Creates Document
Staff/Customer Views Communication History
Customer Views Archived Document
Staff Searches Archived Documents
ICCM Receives outbound communication in batch from scheduler
ICCM Processes requests in batch ICCM preferably supports communications in multiple languages. In some embodiments, ICCM supports Islamic Finance capabilities.

In some embodiments, ICCM is not generally a rules engine nor a workflow engine nor CRM nor a scheduler for CRM Action Queue. Authentication, and authorization will be handled by a separate system; however, they are prerequisites for accessing ICCM.

In some embodiments, ICCM will not generally store customer preferences (such as preferred channel of communication).

In some embodiments, ICCM will not generally develop functionality, such as audit trail or entitlements; rather it will use available functionality.

In some embodiments, ICCM will not generally process data (e.g., calculations such as determination of balance, ratios, etc. for each transaction or as of a certain date) for the requesting process/system. It will be provided the data to be merged in the template by the requesting process/system, the criteria for selecting the template and the content (like logos), the addresses to which the communication is to be sent, security level of the communication, etc. ICCM will, however, perform sorting (e.g., by date) and grouping of data and calculate the totals, sub-totals, average, etc. for a group of rows for a column.

In some embodiments, text received as part of the data from the requesting process/system (e.g., transaction narratives in a statement) will not be translated to a different language by ICCM.

In some embodiments, access permission to documents will be determined externally to ICCM.

In some embodiments, it is expected that business processes will be rationalized to ensure that more than one communication to the same recipient and address to be delivered by the same method within a short time are not issued and that they are combined together into one before a request is made to ICCM.

In some embodiments, communication scheduling and follow up will be done by CRM. Consequently, CRM will cancel/override previously issued communication requests before issuing the request to ICCM. Communication history data can be used by calling/product systems to query status and perform appropriate action.

Figure 4:
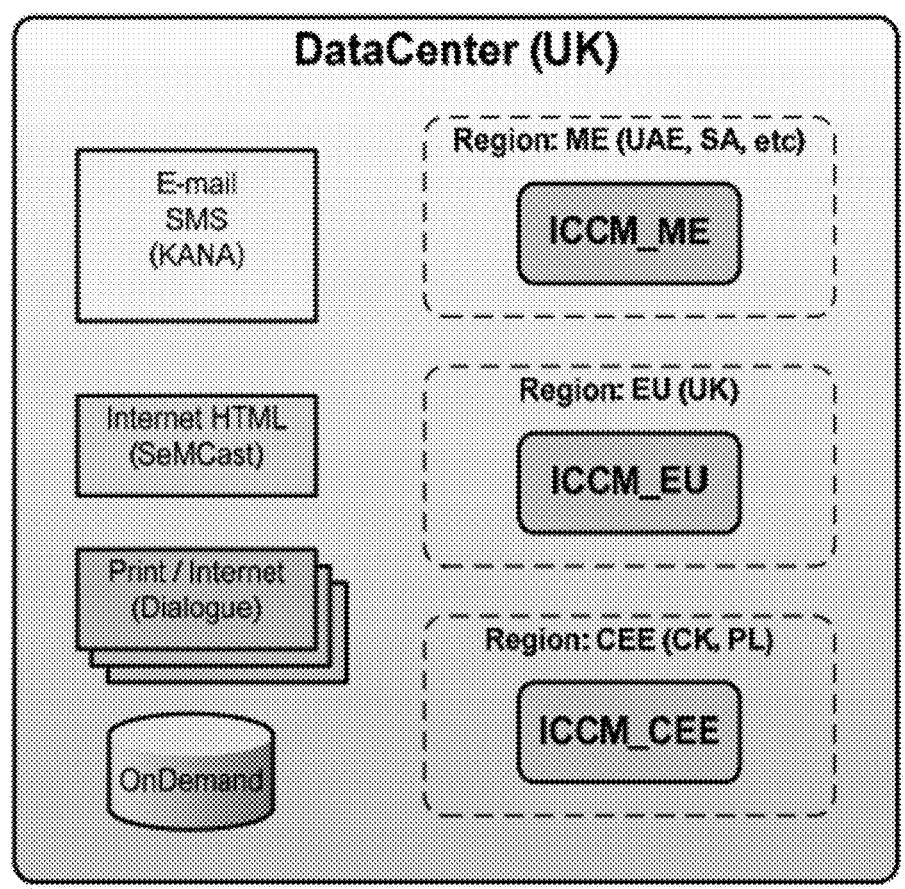
FIG. 4 shows at a high level how ICCM may be deployed regionally.

ICCM is preferably a regionally deployed application, where multiple entities can be supported on a single instance. ICCM Front End User Interface (UI) will follow a local deployment model. FIG. 4 shows at a high level how ICCM may be deployed regionally. In a single data center multiple instances of ICCM may exist, each instance supporting a different region. FIG. 4 also depicts that the delivery channels for ICCM may have their own one or more instances.

In some embodiments, ICCM will use a centralized database for holding data. The ICCM data model will take into consideration data partitioning based on the recommended partitioning strategy based on Country, Group member, Operational unit.

In various embodiments, ICCM will use the central Reference data repository for storage and retrieval of reference data and/or will implement National Language Support (NLS) through use of UTF-8 format for data.

In various embodiments, ICCM will use an EBA process for business modeling, and an ESA process for message modeling. ICCM will preferably use a standardized messaging format for supporting applications.

In some embodiments, ICCM services will generally be:
atomic, performing a single unit of work, without ever allowing a change to leave the host data in an inconsistent, incomplete state
strictly stateless, containing all the information to process the request, without need for session information
channel-agnostic, being reusable by all appropriate delivery channels
process-agnostic, being reusable across all appropriate business processes and unaware of their evolution and variation
largely product-agnostic, where appropriate, providing the service for all applicable products, and where necessary, capable of providing product-specific information within a generic, reusable structure
non-conversational, having no knowledge of previous services and their results, but, expected to follow an 'enquire before amend' pattern In some embodiments, ICCM will conform, for example, to standard GITO to establish the operational architecture for the solution. R2 green components will be used wherever available for the space. The core system will be built on the standard GoldStack for ICCM, for example: Application Server, DB Server, MQ Server. And IHS Server. A SuSe Linux Enterprise Server (SLES) may be indicated in certain Superstacks. ICCM delivery channels and Archival systems will be based on the stacks defined for each channel. ICCM FE will be based on the Websphere Portal server.

In some embodiments, the "Core" Application Servers are Superstacks (e.g., WAS-SLES 2.0.1: SLES9 SP3, 32 bit, WAS 6.1.0.17). In addition to the Application server Superstack components, IBM's OnDemand Web enablement Kit (ODWEK) may be used on the core application servers for native communication with OnDemand. The ICCM core does not necessarily use an HTTP server in front of the appserver as there is no presentation layer. Connectivity is preferably provided from Core Application Servers to MQ using MQ client; Application Servers to DB servers using jdbc; and Application Servers to OnDemand using ODWEK.

Exemplary "Channel Template Hosting Provider" Application Servers may include, for example, Superstack (WAS-SLES 2.0.1: SLES9 SP3, 32 bit, WAS 6.1.0.17) and Superstack: IHS-SLES 2.0.1 (SLES9 SP3, 32 bit, IHS 6.1.0.17). IHS will be co-located with WAS on these systems. Connectivity is preferably provided from Core Application Servers to Database Server using JDBC and DataStage to Database using SQL.

In some embodiments, the MQ server is Superstack: WMQ 1.0.0 (Solaris 10, WMQ 6.0.2.0). Connectivity is preferably provided from MQ to Message Broker and AppServer to MQ Server.

The "Internet Client Content" IHS Server may, for example, be Superstack: IHS-SLES 2.0.1 (SLES9 SP3, 32 bit, IHS 6.1.0.17). A cluster of IHS servers may be provided in the Internet DMZ to deliver static content to Internet-based clients. This content could be in the form of gif, jpg, css, javascript, etc. In some embodiments, these servers will have no j2ee functionality. Connectivity is preferably provided from Internet Clients using HTTP(S).

Regarding recovery, resilience, and scalability, the ICCM core application servers are preferably clustered, however since the application is stateless, no session persistence is required. Multiple application servers can pull communication requests off of the MQ queues and perform parallel processing. The Channel Template Content Hosting Provider application servers do not need to be clustered. They may be used to merge content fragments and request data into useable communication templates that will then be consumed by the various channels within ICCM. In some embodiments, functionality of these systems will be limited to what is provided in j2ee specifications, and no additional application code will be deployed on these systems.

ICCM relies heavily on the communication database server. In preferred embodiments, local redundancy is provided as well as data replication across datacenters for disaster recovery.

Queue managers will be run on dedicated, clustered hardware and will be accessed by the application servers using client connections.

Network load balancing will be employed to distribute request traffic to clusters of IHS servers.

In some embodiments, for Systems Management, there are no specific requirements for MI from the ICCM core. Queue depth monitoring may be provided on an asynchronous work queue.

In some embodiments, ICCM is a regional service by design. It is to be shared by the entities within a region. If desired, multiple instances of ICCM may be deployed, and smaller sub-groupings of entities within a region may be created.

In some embodiments, ICCM will work closely with the Group Information Architecture team for data modeling and will adhere to group standards for modeling.

Figure 5:
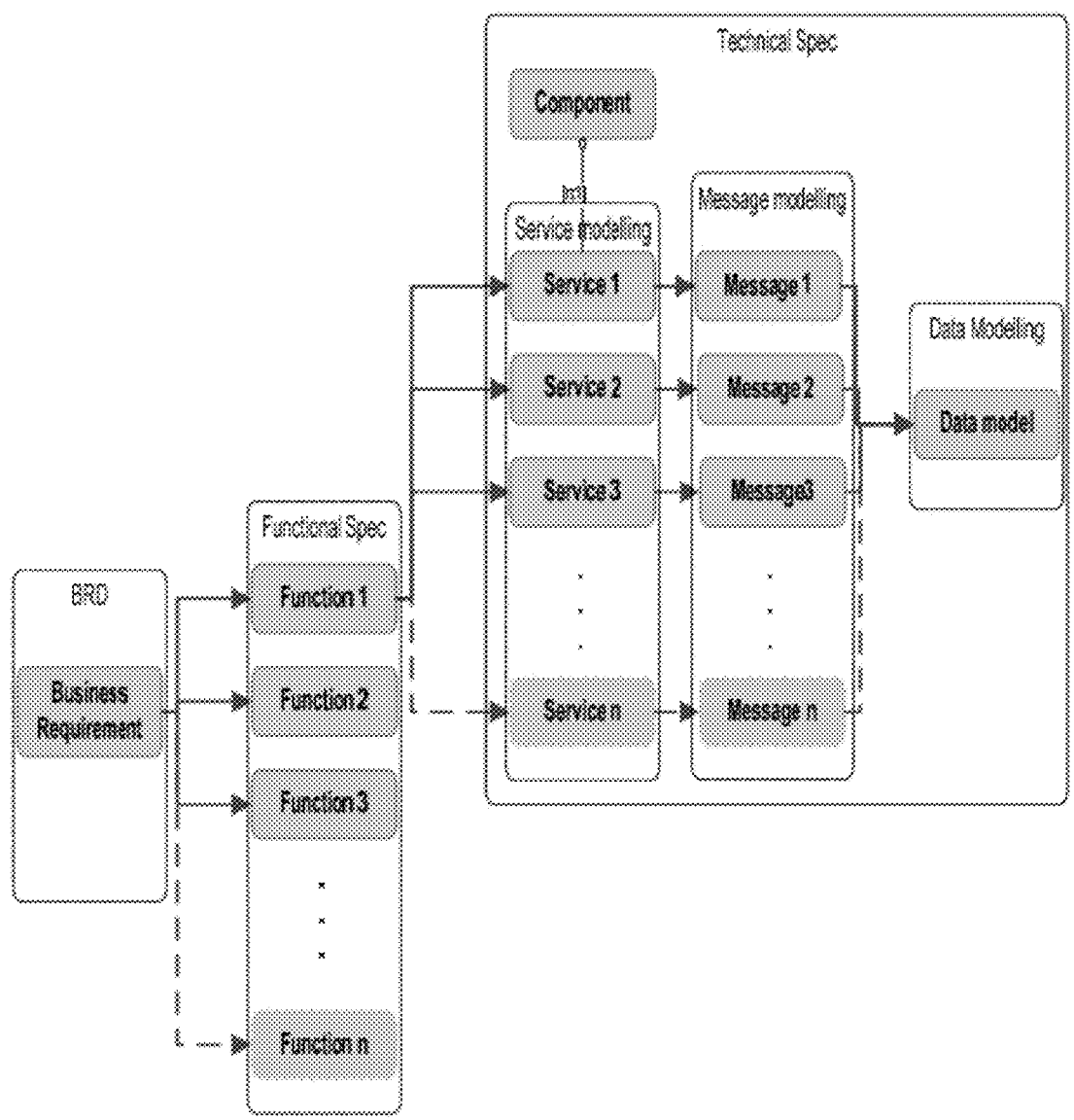
FIG. 5 gives a high level view of traceability, according to some embodiments.

For traceability, ICCM will preferably follow the standard RBPM process throughout the lifecycle of the project. Appropriate version control and modeling tools will be used at each phase of the project. Traceability will be tracked through the mapping between each document. FIG. 5 gives a high level view.

Figure 6:
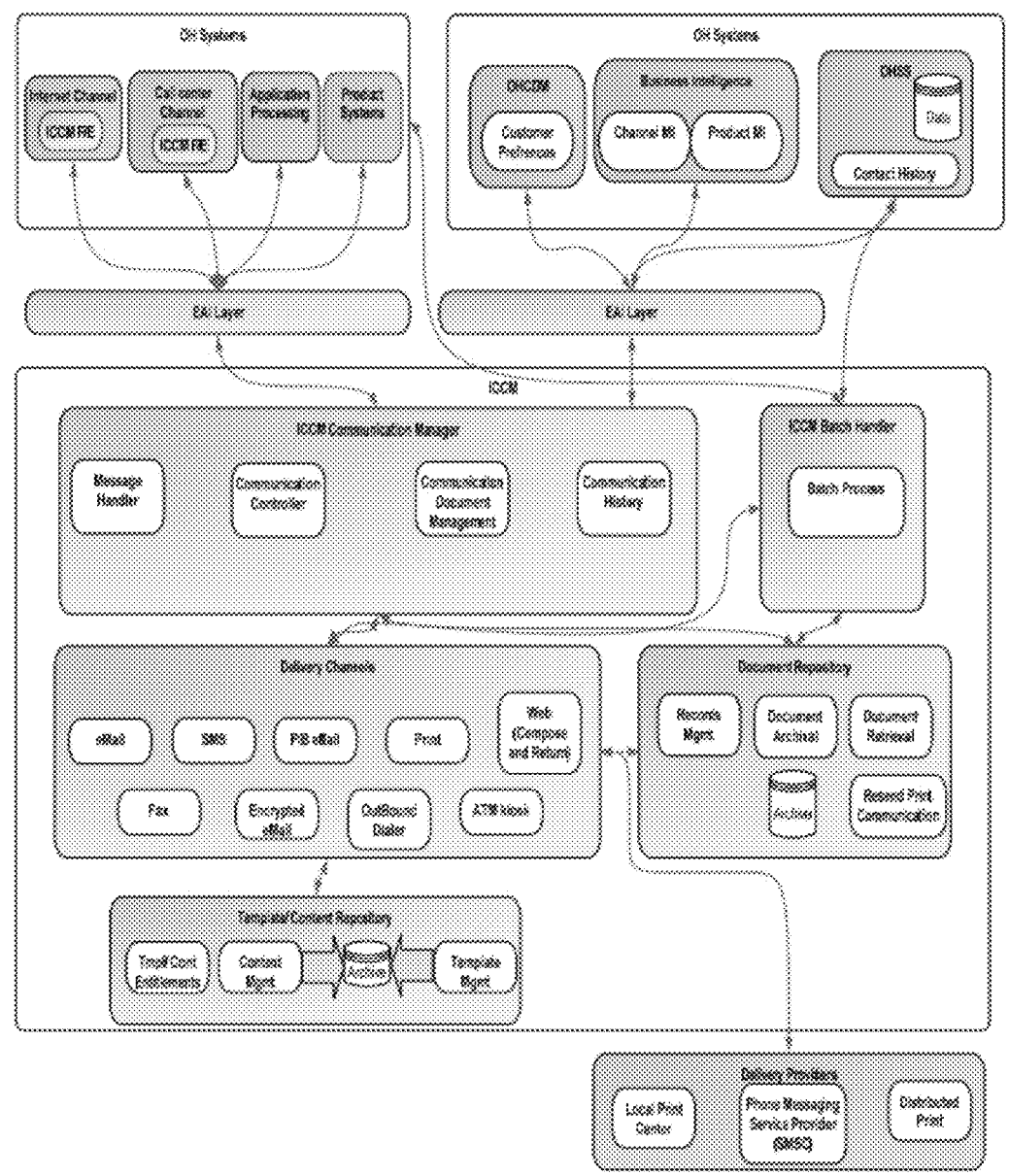
FIG. 6 shows a high level view of exemplary logical components of ICCM and their functional capabilities, according to some embodiments of the invention.

FIG. 6 shows a high level view of the logical components and their functional capabilities supporting the Customer Communications module according to some embodiments of the invention.

Table 1 provides a summary of exemplary functions of one or more logical components in the ICCM system, grouped by functional area, according to some embodiments of the invention.

TABLE 1

| Logical Component | Description |
|---|---|
| OH Systems | |
| Internet Channel | One HSBC Internet channel provides UI based features to enable bank customers perform internet banking operations. These will act as ICCM service requester. |
| Call Centre Channel | Provides features for bank staff (CSRs) to perform customer servicing operations. These will act as ICCM service requester. |
| Application Processing | One HSBC product supporting Application Processing These will act as ICCM service requester. |
| Product Systems | Other One HSBC systems requiring sending of customer communications. These will act as service requester to ICCM. |
| OHCDM | One HSBC Customer Data Management. Houses Customer Preferences. ICCM will be a service requester to OHCDM for getting channel preferences for a communication. |
| OHSS | One HSBC Sales Services team. Houses Contact history. ICCM will be a service requester to OHSS and will use OHSS as the data store for Customer communication history |
| Business Intelligence | OH application responsible for providing business data warehousing and analytics. ICCM will provide data for BI/MI operations. |
| ICCM F/E | |
| ICCM F/E | ICCM Front End component is a utility providing integration options to internet channels. Integration options will be service based or UI based. OH Systems may choose not to use ICCM F/E and communicate with ICCM directly, by making service calls. |
| ICCM Communication Manager | |
| Communication Controller | Central component responsible for handling the request, interfacing with other ICCM components to fulfil the request. Controller will also be responsible for receiving, recording, sending and related orchestration of communication and history requests. Communication Controller will be responsible for handling real-time communications. |
| Message Handler | Component for providing external applications interface into ICCM. It also handles sending back response/acknowledgement to the calling applications. |
| Communication Document management | Component responsible for managing documents associated with a communication. Provides Communication search and Retrieval from archival system for search and retrieval of communication documents from the Document Repository. |
| Communication history | Maintain a record of communication sent. Provide services for insert, update and searching of communication history. |

TABLE 1-continued

| Logical Component | Description |
|---|---|
| | ICCM Batch Handler |
| Batch Process | Process for handling Batch Communications for ICCM. Batch communications will be communications sent into ICCM as a large file and ICCM processes the file as a batch. |
| | Delivery Channels |
| eMail | Communication composition using dynamic data and templates and delivery via eMail |
| SMS | Communication composition using dynamic data and templates and delivery via SMS |
| PIB eMail | Communication composition using dynamic data and templates and delivery via secure eMail |
| Encrypted eMail | Communication composition using dynamic data and templates and delivery via encrypted eMail |
| Print | Communication composition using dynamic data and templates and delivery via print mail |
| Web | Compose and return document back to the caller |
| Fax | Communication composition using dynamic data and templates and delivery via Fax |
| Outbound Dialler | Communication composition using dynamic data and templates and delivery via Outbound Dialler voice message |
| ATM | Communication composition using dynamic data and templates and deliver to ATM Kiosk |
| | Template/Content Repository |
| Template Mgmt | Module that provides interface to manage templates for communications. For e.g. template for Terms and Condition eMail etc. |
| Content Mgmt | Module that provides interface for business users to manage static content on the template. |
| Template/Content Entitlements | Entitlement solution contained within the template/content repositories |
| | Document Repository |
| Document Archival | Store documents in an archival system |
| Document Retrieval | Retrieve Documents from the archive |
| Document Retention | Document storage management - Retention, expiration and move |
| | Delivery Providers (Third Party) |
| Local Print Centre | Local print centre that receives the print file for printing and delivering via mail |
| Phone Messaging Service Provider | Local SMSC provider. |
| Distributed Print | Component for using Distributed printing |
| | Data |
| Customer Preferences | Channel and delivery preferences for the customer |
| Contact History | Record of communication history |
| Communication Archive | Repository Archive of actual communication that was sent out |

Figure 7:
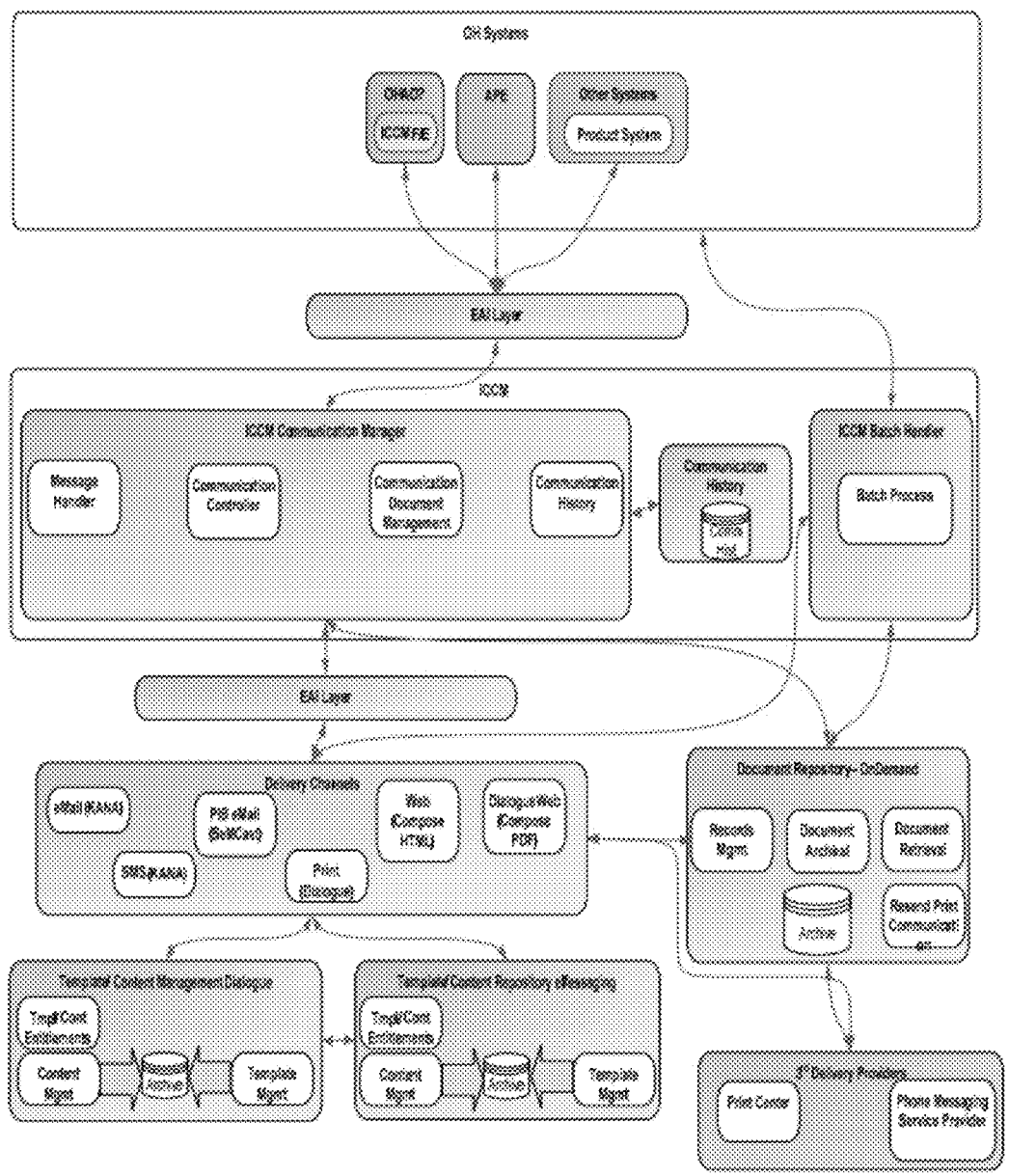
FIG. 7 shows an exemplary ICCM system context, according to some embodiments.

In one or more alternative embodiments, the ICCM system context may be as shown in FIG. 7. Table 2 provides a summary of exemplary functions of the various logical components in the ICCM system as shown in FIG. 7, grouped by functional area.

TABLE 2

| Logical Component | Description |
|---|---|
| | OH Systems |
| OHAO | One HSBC Account Opening Application |
| APE | Application Processing Engine. Fulfils the requests for |
| Application Processing | One HSBC product supporting Application Processing These will act as ICCM service requester. |
| Product Systems | Other One HSBC systems requiring sending of customer communications. These will act as service requester to ICCM. |

TABLE 2-continued

| Logical Component | Description |
| --- | --- |
| ICCM F/E | |
| ICCM F/E | ICCM Front End component is a utility providing integration options to internet channels. Integration options will be service based or UI based. OH Systems may choose not to use ICCM F/E and communicate with ICCM directly, by making service calls. |
| ICCM Communication Manager | |
| Communication Controller | Central component responsible for handling the request, interfacing with other ICCM components to fulfil the request. Controller will also be responsible for receiving, recording, sending and related orchestration of communication and history requests. Communication Controller will be responsible for handling real-time communications. |
| Message Handler | Component for providing external applications interface into ICCM. It also handles sending back response/acknowledgement to the calling applications. |
| Communication Document management | Component responsible for managing documents associated with a communication. Provides Communication search and Retrieval from archival system for search and retrieval of communication documents from the Document Repository. |
| Communication history | Maintain a record of communication sent. Provide services for insert, update and searching of communication history. |
| ICCM Batch Handler | |
| Batch Process | Process for handling Batch Communications for ICCM. Batch communications will be communications sent into ICCM as a large file and ICCM processes the file as a batch. |
| Delivery Channels | |
| eMail | Communication composition using dynamic data and templates and delivery via eMail |
| SMS | Communication composition using dynamic data and templates and delivery via SMS |
| PIB eMail | Communication composition using dynamic data and templates and delivery via secure eMail |
| Print | Communication composition using dynamic data and templates and delivery via print mail |
| Web | Compose and return document back to the caller |
| Template/Content Repository eMessaging | |
| Template Mgmt | Module that provides interface to manage templates for communications. For e.g. template for Terms and Condition eMail etc. |
| Content Mgmt | Module that provides interface for business users to manage static content on the template. |
| Template/Content Entitlements | Entitlement solution contained within the template/content repositories |
| Template/Content Repository Dialogue | |
| Template Mgmt | Module that provides interface to manage templates for communications print and web (PDF) communications. |
| Content Mgmt | Module that provides interface for business users to manage static content on the template. |
| Template/Content Entitlements | Entitlement solution contained within the template/content repositories |
| Document Repository | |
| Document Archival | Store documents in an archival system |
| Document Retrieval | Retrieve Documents from the archive |
| Document Retention | Document storage management - Retention, expiration and move |
| Delivery Providers (Third Party) | |
| Logical Component | Description |
| Local Print Centre | Local print centre that receives the print file for printing and delivering via mail |
| Phone Messaging Service Provider | Local SMSC provider. |
| Data | |
| Communication History | Record of communication history |
| Communication Archive | Repository Archive of actual communication that was sent out |

Listed below are exemplary architecture features of ICCM in accordance with some embodiments:

Communication History Data Store—In some embodiments, the contact history in OHSS may be extended to cover ICCM communication history or a new database will be established for ICCM. The communication history will be hosted in ICCM.

Customer Preference Business Rules—OHCDM will optionally incorporate business rules (e.g., document category to delivery channel mapping) as part of its customer data update and retrieval logic.

Account Opening—One or more of the AO system components (e.g., AO FE or AO APe) will be responsible for calling the ICCM communication service.

Enterprise Service Repository—ICCM does not need consume data from ESR but needs to provide data in ESR for usage by other applications.

Batch Communication—ICCM will provide services to process batch communication where a large file is sent to ICCM for processing.

Regional Deployment Approach—Regions will be configured per implementation.

Internet Channel location—Documents that are part of other communications also (e.g., Terms and Conditions) will be composed through ICCM and sent back to the calling application. HTML and PDF will be two formats. PDF will be provided by Dialogue. HTML will be provided.

Print Center (Print Service Provider)—Print center services are utilized for printing of documents/communications and mailing. Documents that are part of other communications also (e.g., Terms and Conditions) will be composed through ICCM and sent back to the calling application. HTML and PDF will be two formats. PDF will be provided by Dialogue. HTML will be provided.

Archiving of document instead of recreating the document for resending of communication—Due to the various versions of templates and tools, recreation of the document may not necessarily be feasible for exact reproduction. It is therefore recommended that the document that needs to be resent exactly as it was first produced to be archived.

Validation of communication dynamic data—Dynamic data is the data that is provided by the host system and gets merged onto the template to produce a document. Some examples of such data are Customer Balance, APR, etc. Validation of the dynamic data will be responsibility of the calling application.

Template and Content Repository—There is no single One HSBC Content Repository. Delivery channels utilize proprietary vendor solutions for template and content management, due to product constraints OR utilize group solutions like BDE/teamsite or BDE Portal. Delivery channels will utilize the available templating solutions for the products.

In some embodiments, ICCM includes one or more of the following features:

Template Management—ICCM deploys a variety of templates and utilizes the corresponding system associated with those templates for overall management of creation, modification, and storage. A Template Management layer may be used to consolidate the templates into a single repository to simplify creation, management, and retention.

ICCM uses IBM's OnDemand as the correspondence repository. As channels are added to ICCM, archive and retention requirements may extend beyond document-centric outputs and may use a content-centric repository to handle a diverse range of output types.

Distributed Print—ICCM can handle large volumes of print and distribute the output across branches to support products such as OHCards and OHBanking.

ICCM will handle inbound communications.

In some embodiments, Sales Services will be the single service provider for managing the bank's human interaction with potential and existing customers, and will include the communication history database. OHCDM will become the centralized repository for holding customer preferences, and ICCM will interface with CDU to retrieve customer preferences.

Figure 8:
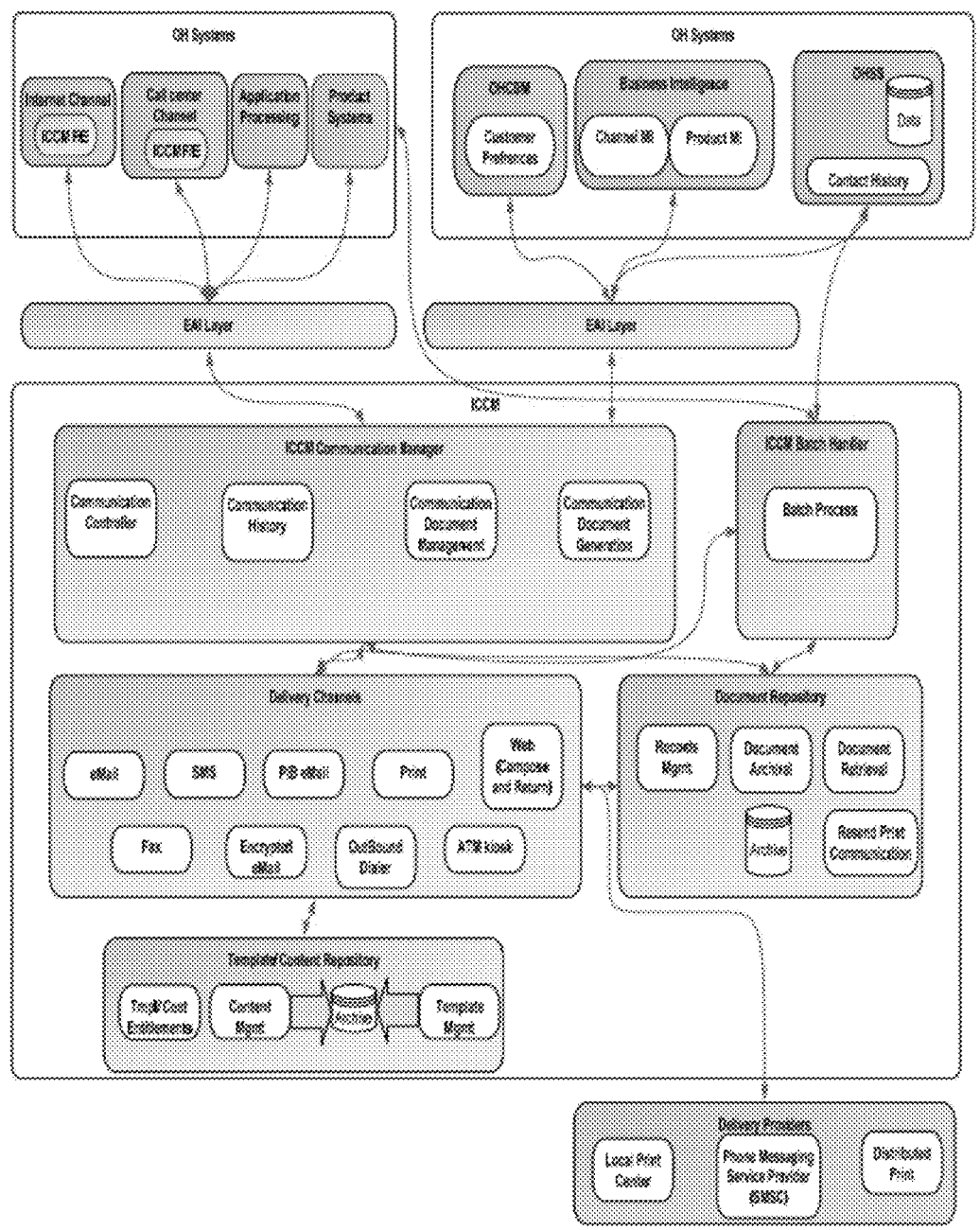
FIG. 8 shows another exemplary ICCM system context, according to some embodiments.

In one or more alternative embodiments, the ICCM system context may be as shown in FIG. 8.

Figure 9:
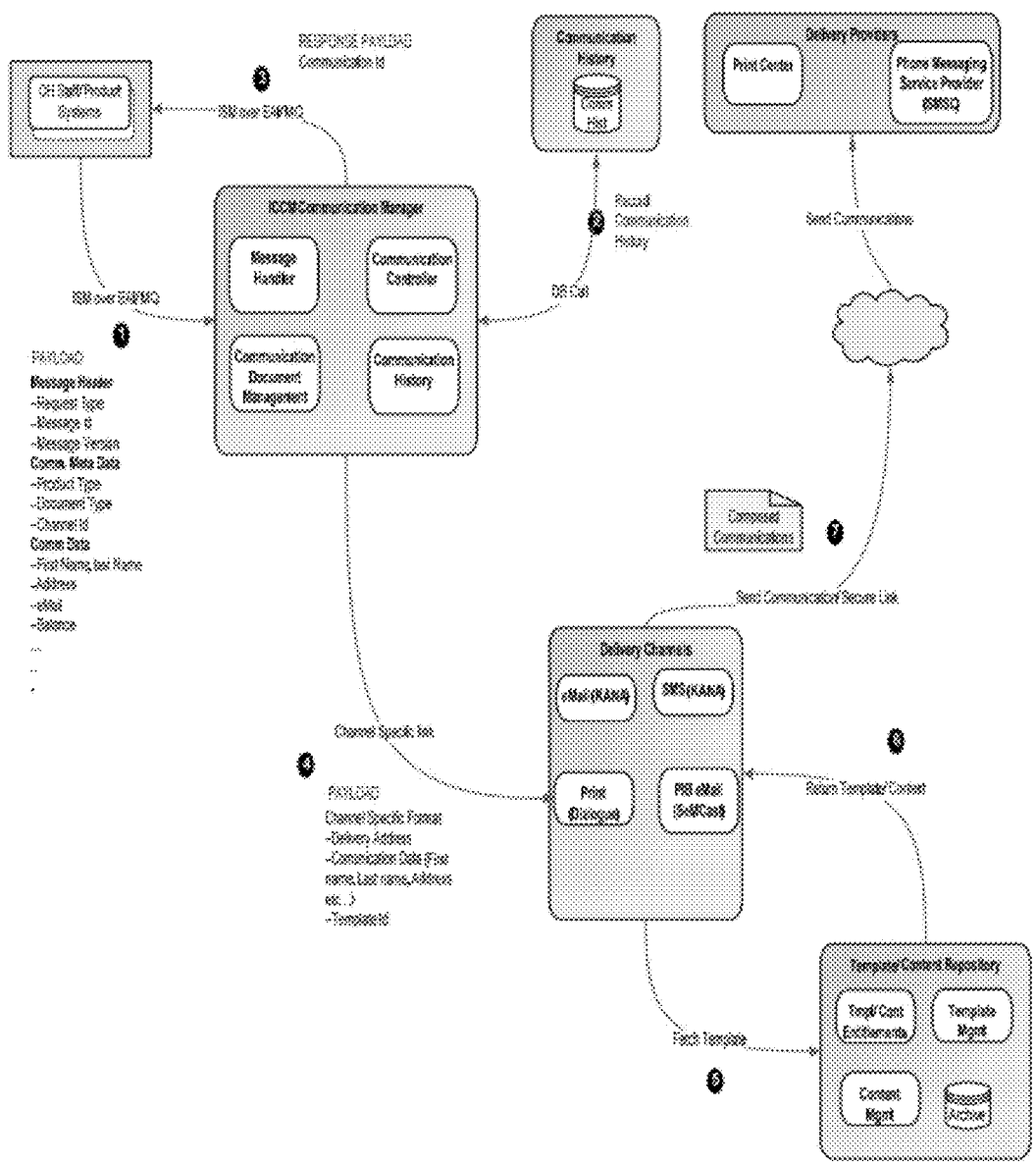
FIGS. 9-13 illustrate exemplary architecture use cases, according to some embodiments of the invention.

FIGS. 9-13 illustrate exemplary architecture use cases, according to some embodiments of the invention. FIG. 9 shows an exemplary Send Communication use case.

Figure 10:
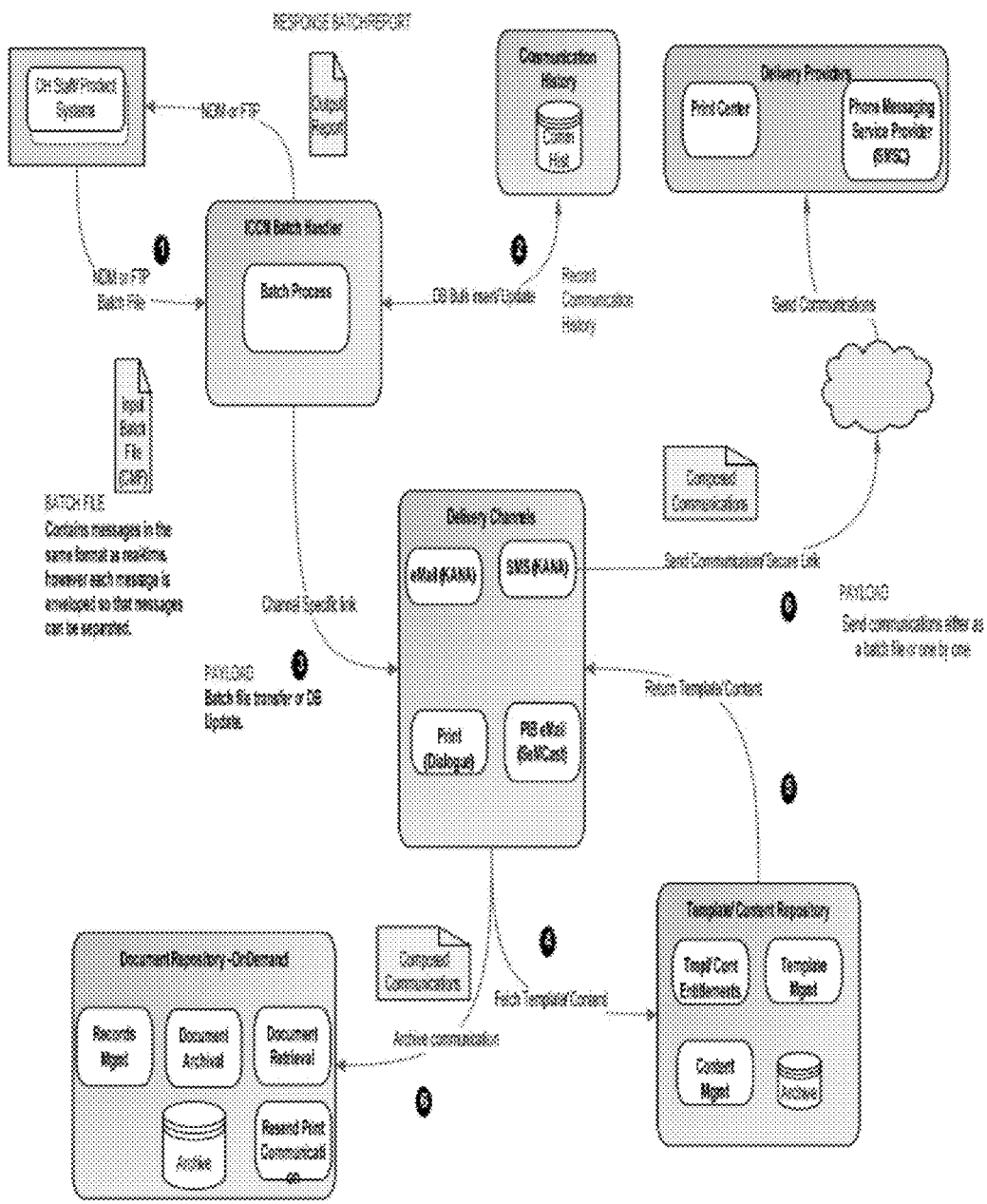
Figure 11:
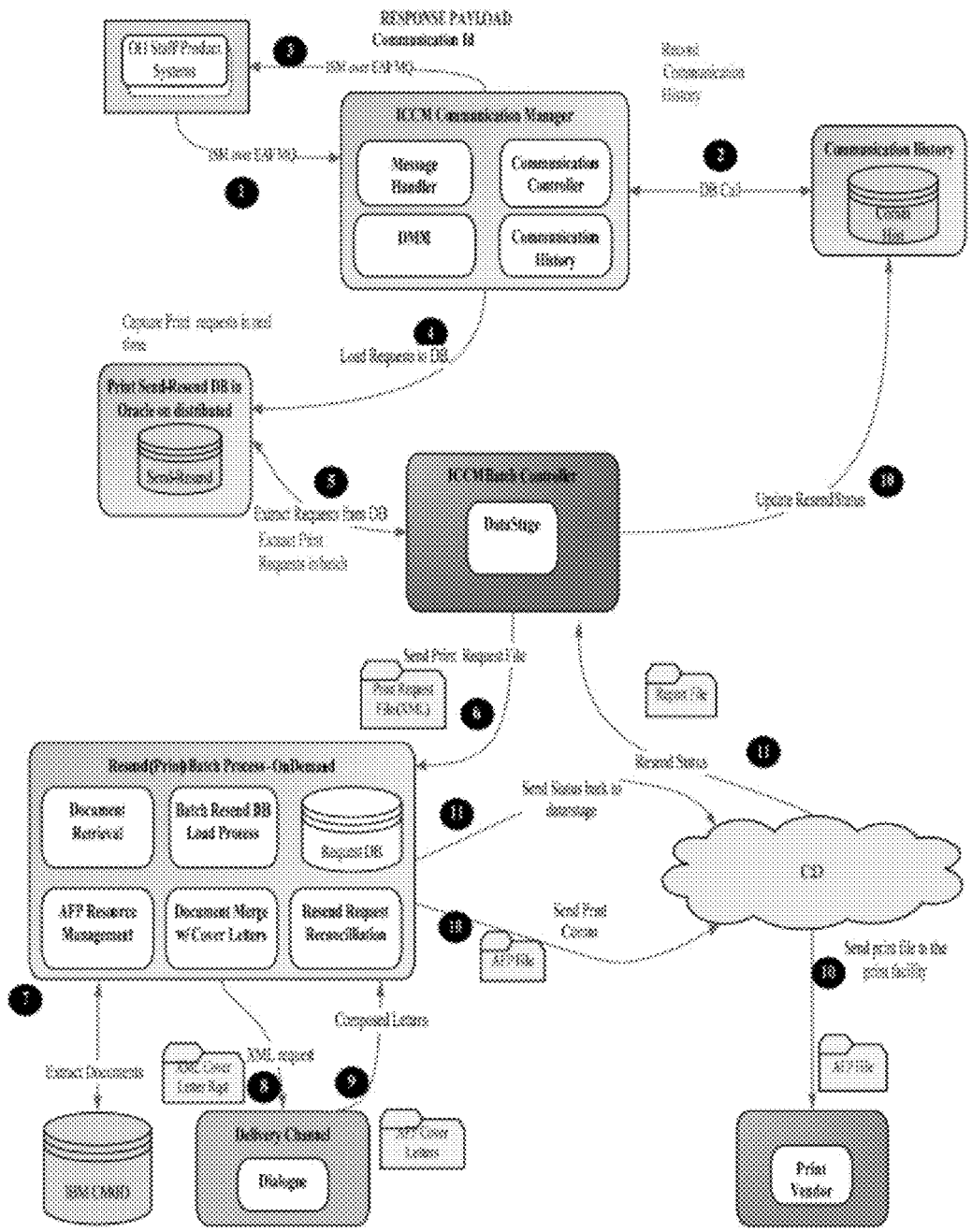
Figure 12:
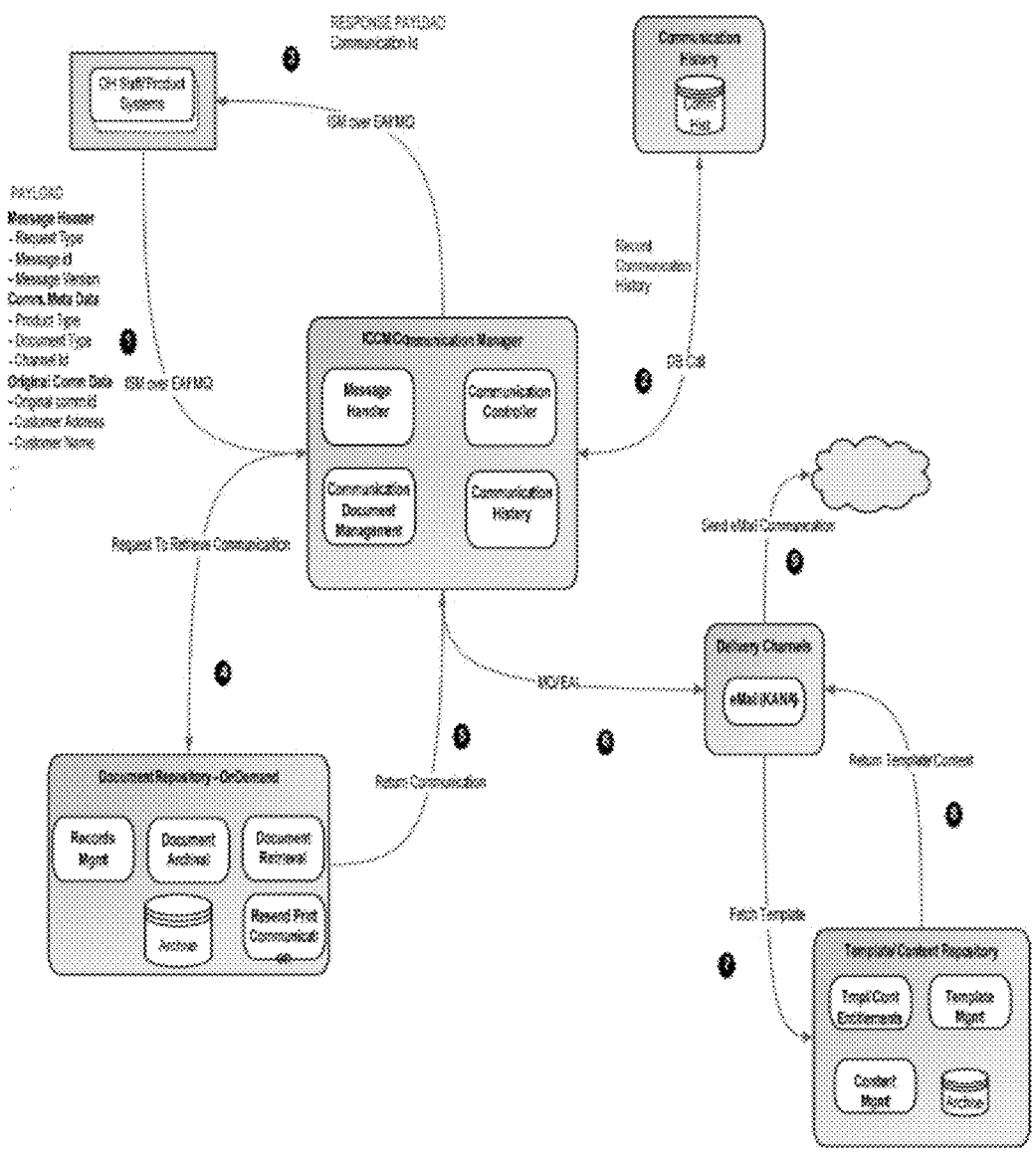
Figure 13:
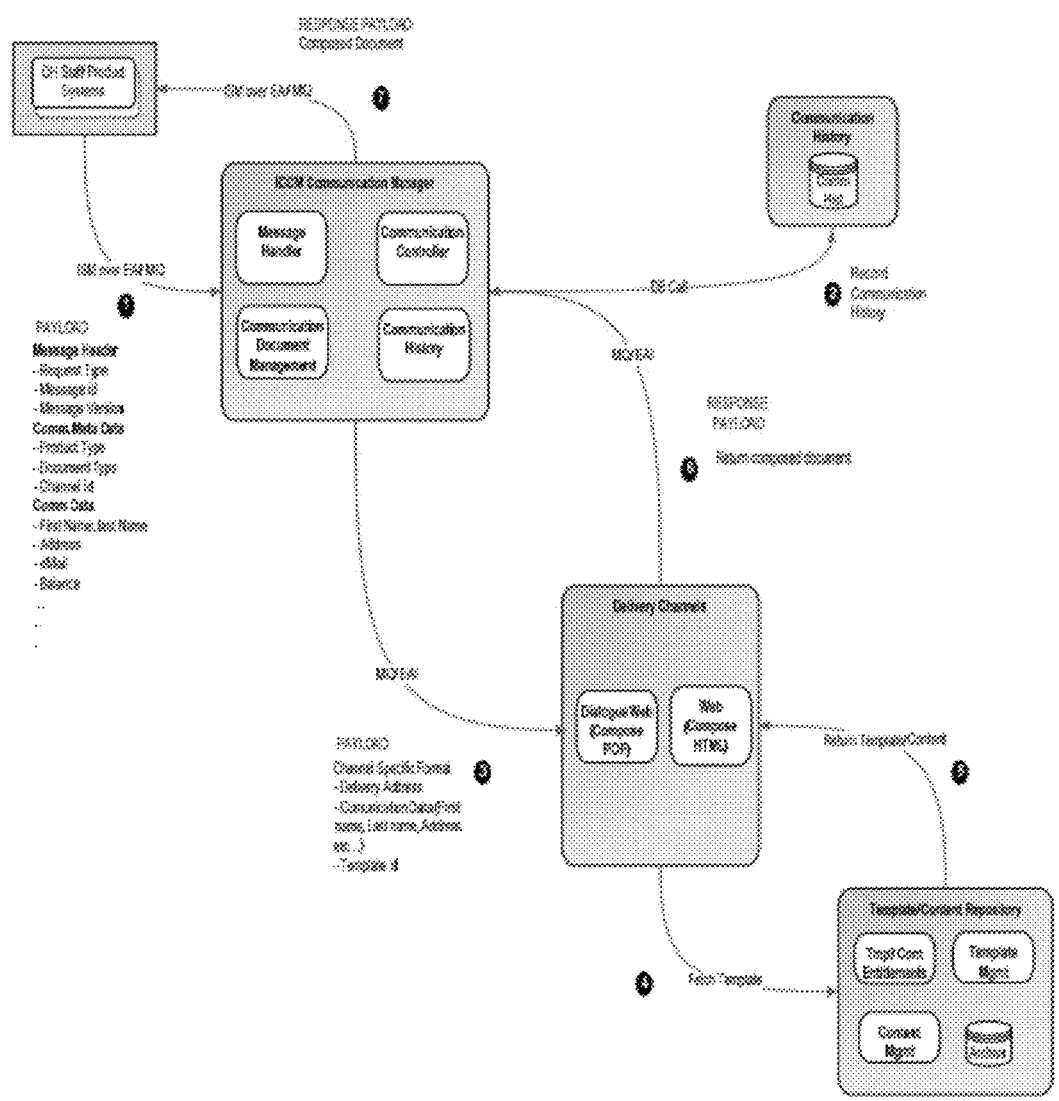

FIG. 10 shows an exemplary Send Communication—Batch use case. FIG. 11 shows an exemplary Re-Send Communication—Print use case. FIG. 12 shows an exemplary Re-Send Communication—Email use case. FIG. 13 shows an exemplary Create Document use case.

Figure 14:
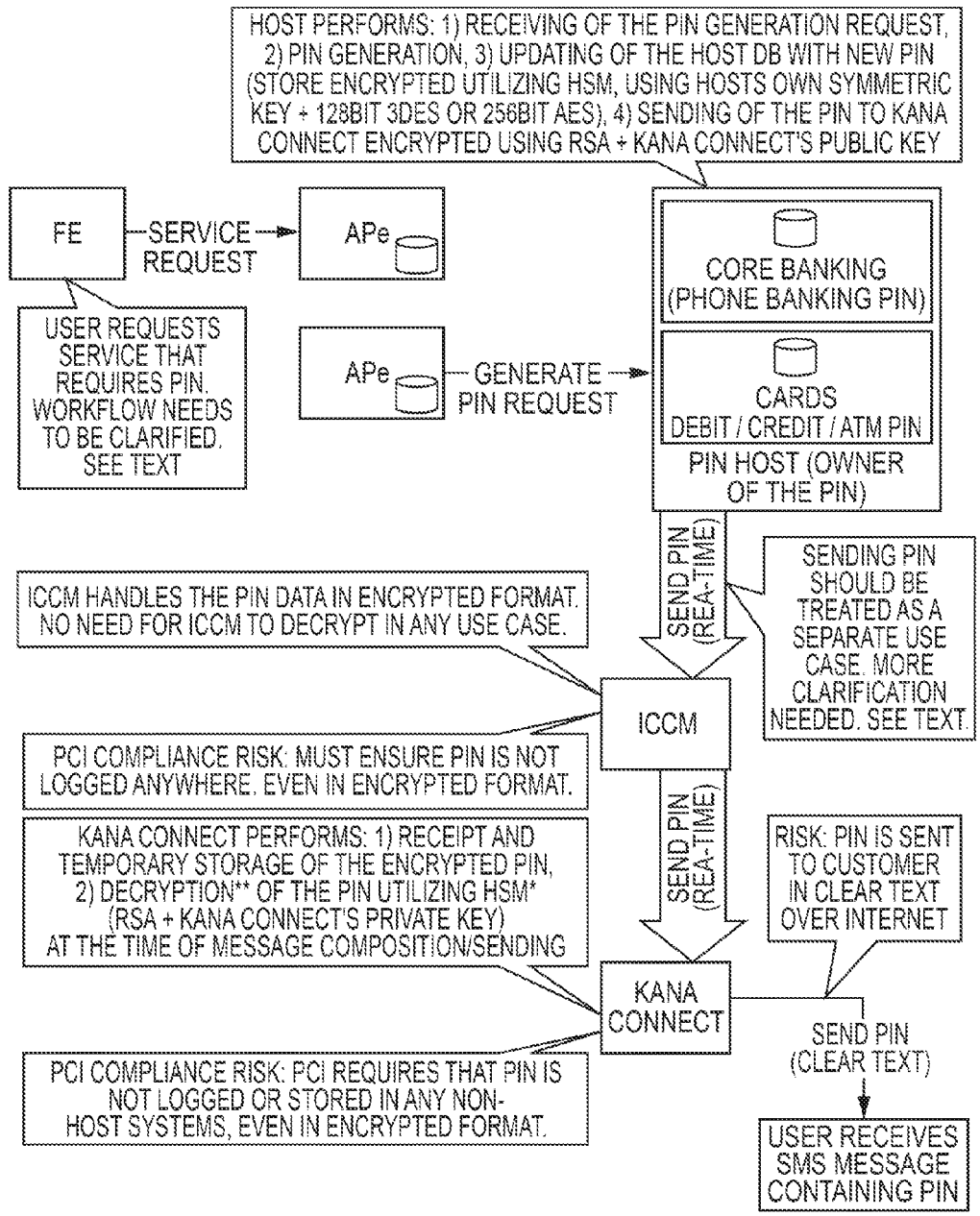
FIG. 14 illustrates exemplary PIN processes in ICCM.

PIN Communications may be sent through ICCM via the eMessaging delivery channels. PIN has a special security requirement that it should not be stored and should be transmitted in an encrypted manner between systems. FIG. 14 illustrates exemplary PIN processes in ICCM.

Figure 15:
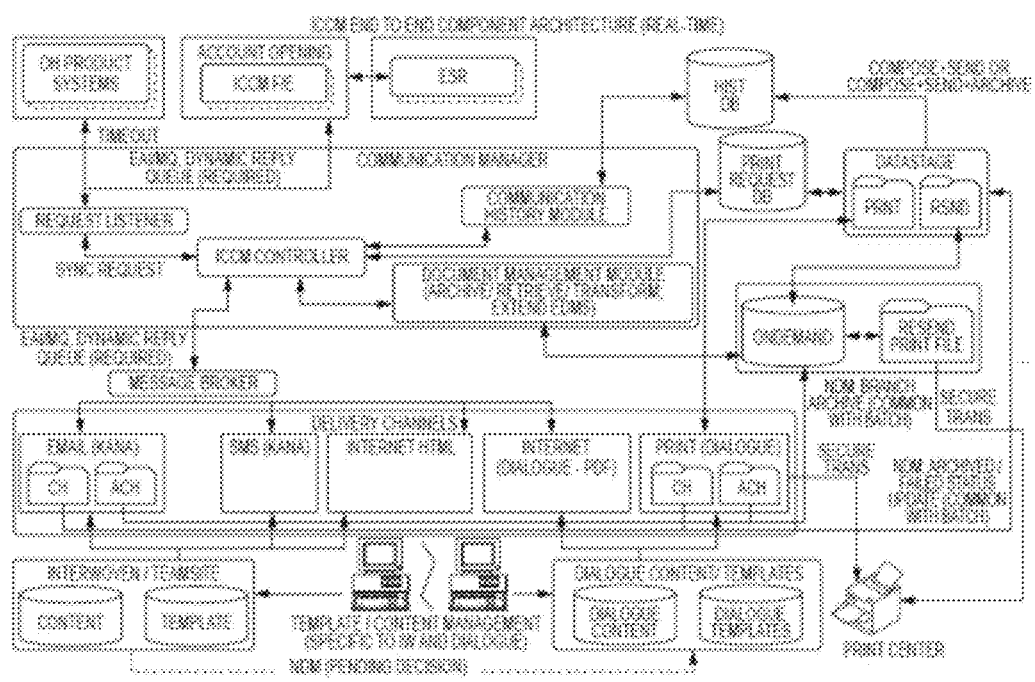
FIG. 15 is an exemplary Real-Time ICCM Component Architecture diagram.

FIG. 15 is an exemplary Real-Time ICCM Component Architecture diagram. Table 3 summarizes the logical components of FIG. 15 according to some embodiments.

TABLE 3

| Logical Component | Component Function | Description |
| --- | --- | --- |
| Account Opening (AO) | Product Systems | Account opening application. Responsible for providing UI based operations for the user to for opening accounts. |
| OH Product Systems | Product Systems | Consists of product related processes involving the need to communicate with customers. These systems are one of the means to trigger communication requests to customers (e.g., Application Processing engine). |
| ESR | Reference Data | Provides central reference data repository for OH applications. Also provides services for searching the repository. |
| Teamsite/ interwoven | Content Repository | Central storage for template content marketing materials (logos, banners) used to communicate with the customers. Content are maintained by Business Operations Staff. |
| Dialogue | Templates | Storage for templates used to generate communication for different outbound channels. |
| Content/ Templates | Repository | Content to these templates is expected to house in the content repository. |

TABLE 3-continued

| Logical Component | Component Function | Description |
|---|---|---|
| OnDemand | Document Archival System | Archives and facilitates quick retrieval of documents. |
| Kana Connect | eMail | Communication composition using dynamic data and templates and delivery via eMail |
| Kana Connect | SMS | Communication composition using dynamic data and templates and delivery via SMS |
| SeMCast | Secure eMail | Communication composition using dynamic data and templates and delivery via secure eMail |
| Internet Dialogue | PDF Doc Composition | Communication composition using dynamic data and templates and delivery back to caller |
| Print Dialogue | Print Composition | Communication composition using dynamic data and templates and delivery via print channel |
| Internet HTML | HTML Document Composition | Communication composition using dynamic data and templates and delivery back to caller |
| EAI Layer | EAI | Provides message transformation, routing and logging functionality for application integration. |
| Message Broker | EAI | Provides message transformation, routing and logging functionality for application integration. |
| CMF | Common Message Format | Common envelope for messages coming into ICCM |
| DataStage | ETL Tool | Extraction, Transformation and Loading tool |
| Print Centre | 3$^{rd}$ Party Delivery | Provides services for printing and delivery of mail. |
| Hist DB | Database | Communication history database. Provides storage for communication history. |
| Print Rqst DB | Database | Database for holding requests for print for batch purposes |

Figure 16:
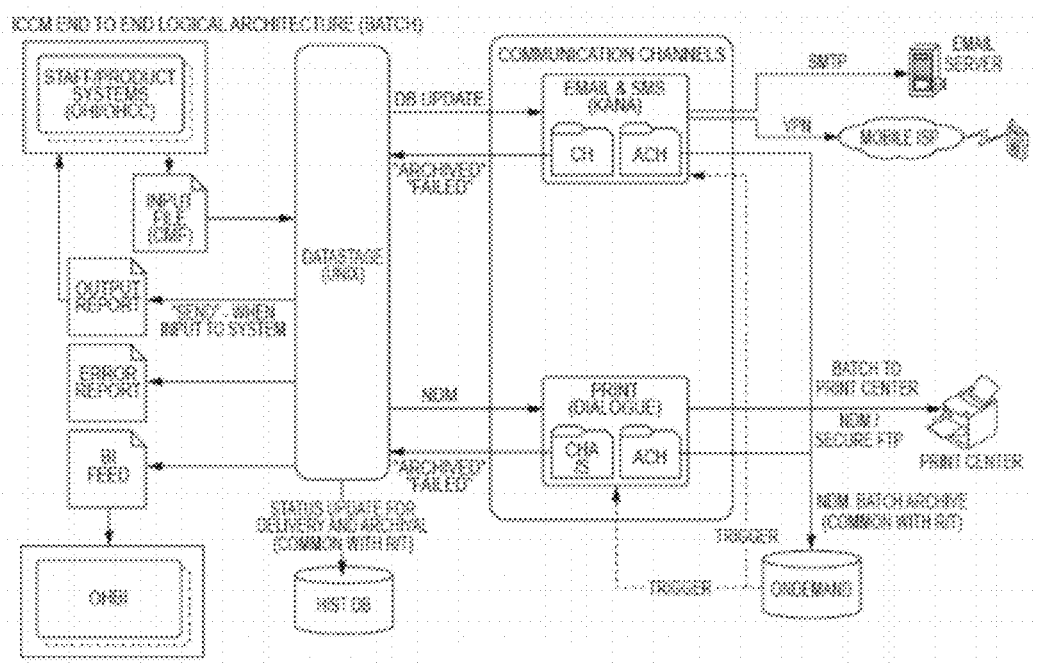
FIG. 16 is an exemplary ICCM Component Architecture diagram for Batch communications.

FIG. 16 is an exemplary ICCM Component Architecture diagram for Batch communications. Table 4 summarizes the logical components of FIG. 16.

TABLE 4

| Logical Component | Component Function | Description |
|---|---|---|
| OH Product Systems | Product Systems | Consists of product related processes involving the need to communicate with customers. These systems are one of the means to trigger communication requests to customers (e.g., Application Processing engine). |
| OnDemand | Document Archival System | Archives and facilitates quick retrieval of documents. |
| Kana Connect | eMail | Communication composition using dynamic data and templates and delivery via eMail |
| Kana Connect | SMS | Communication composition using dynamic data and templates and delivery via SMS |
| SeMCast | Secure eMail | Communication composition using dynamic data and templates and delivery via secure eMail |
| Print Dialogue | Print Composition | Communication composition using dynamic data and templates and delivery via print channel |
| CMF | Common Message Format | Common envelope for messages coming into ICCM |
| DataStage | ETL Tool | Extraction, Transformation and Loading tool |
| Print Centre | 3$^{rd}$ Party Delivery | Provides services for printing and delivery of mail. |

Figure 17:
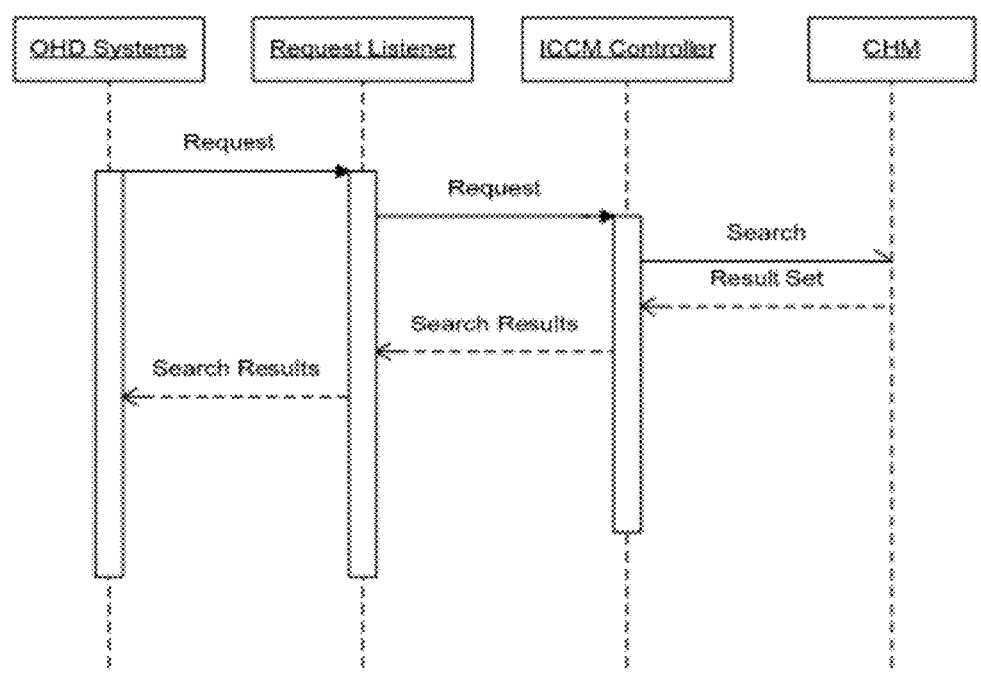
FIGS. 17-23 are exemplary diagrams of customer facing functions of ICCM, according to some embodiments.
Figure 18:
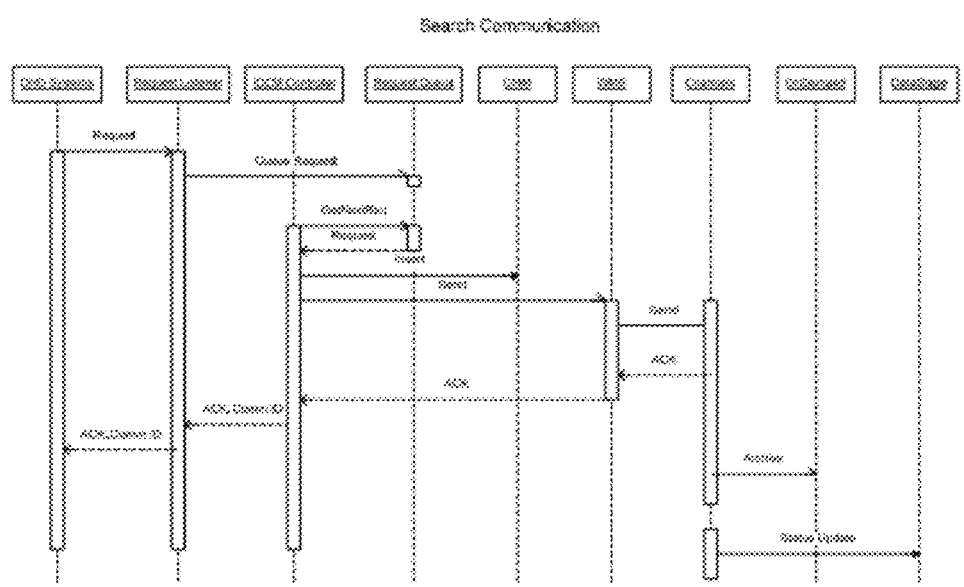
Figure 19:
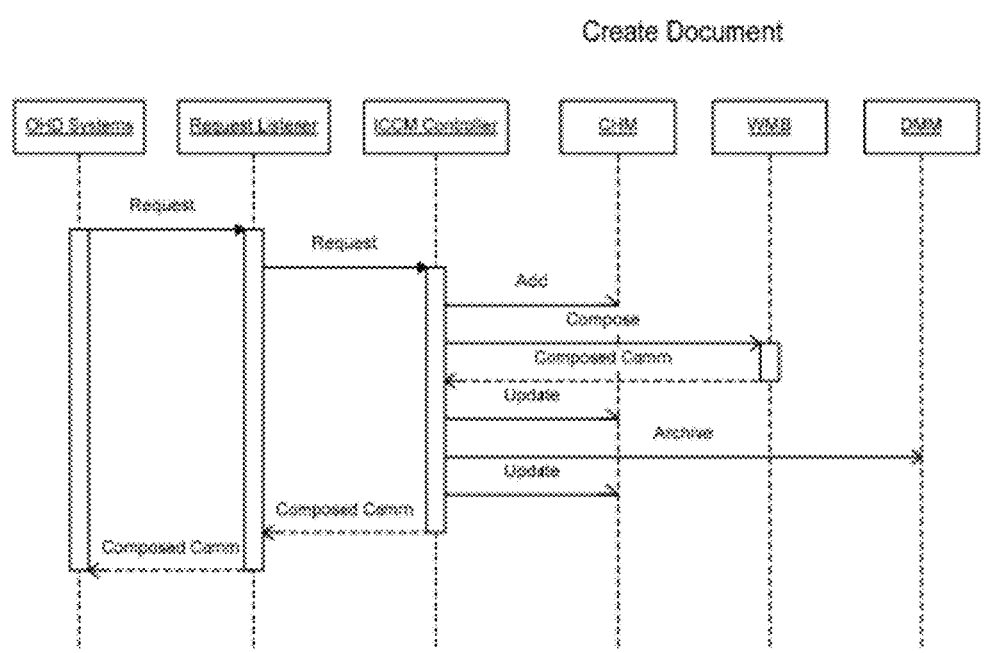
Figure 20:
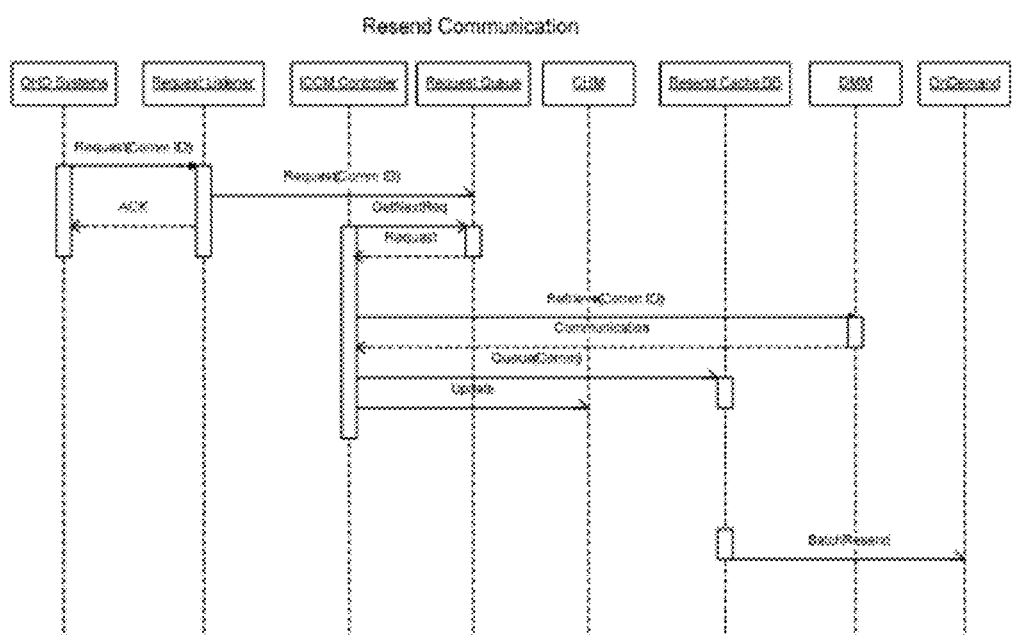
Figure 21:
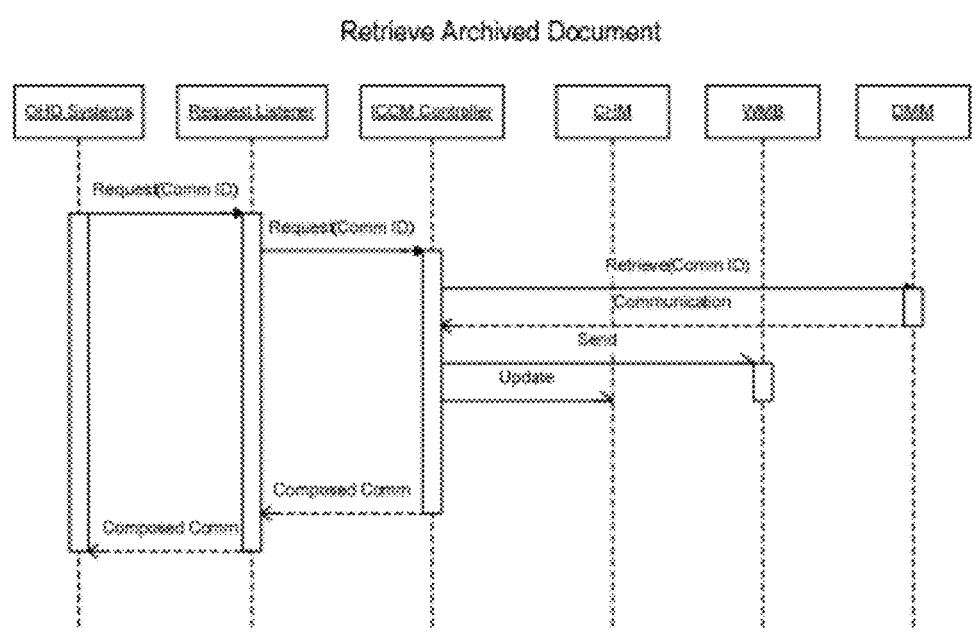
Figure 22:
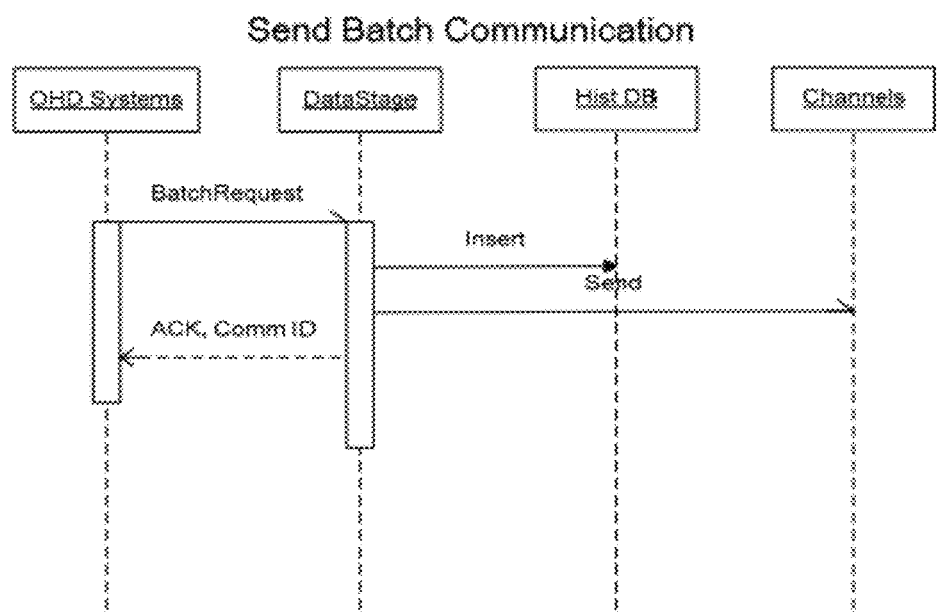
Figure 23:
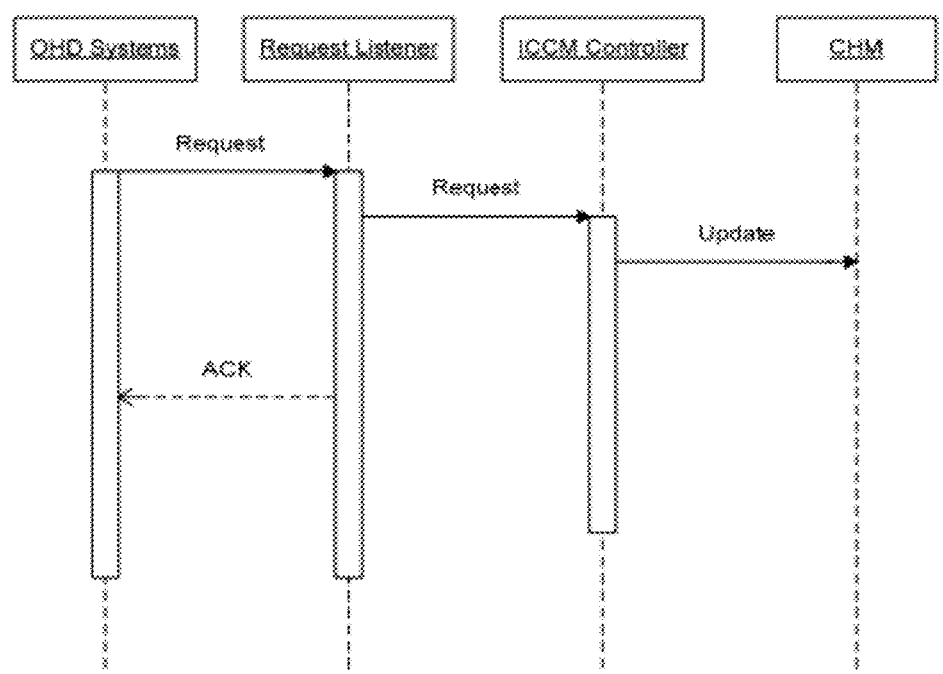

FIGS. 17-23 are exemplary diagrams of customer facing functions of ICCM, according to some embodiments. FIG. 17 is an exemplary diagram of the Search Communication History function. FIG. 18 is an exemplary diagram of the Search Communication function. FIG. 19 is an exemplary diagram of the Create Document function. FIG. 20 is an exemplary diagram of the Resend Communication function. FIG. 21 is an exemplary diagram of the Retrieve Archived Document function. FIG. 22 is an exemplary diagram of the Send Batch Communication function. FIG. 23 is an exemplary diagram of the Update Communication History Status function.

Regarding Service Provider Systems, in some embodiments, Dialogue will be used as the delivery channel for print communications and also for generating PDF documents for the internet (Front End) channel. An example of a print communication would be a Welcome letter, while a Terms and Conditions could be sent through the internet channel.

In some embodiments, there are, for example, three optional scenarios for Dialogue used as the composition engine in the Retail Distribution Account Opening stream. The possibilities include one or more of the following:

Real-time request for PDF document to be returned real-time to front-end system browser Real-time request for printing document (AFP) to be sent to local print service provider for printing (and mailing/delivery)

Batch request for printing document (AFP) to be sent to local print service provider to printing (and mailing/delivery)

Figure 24:
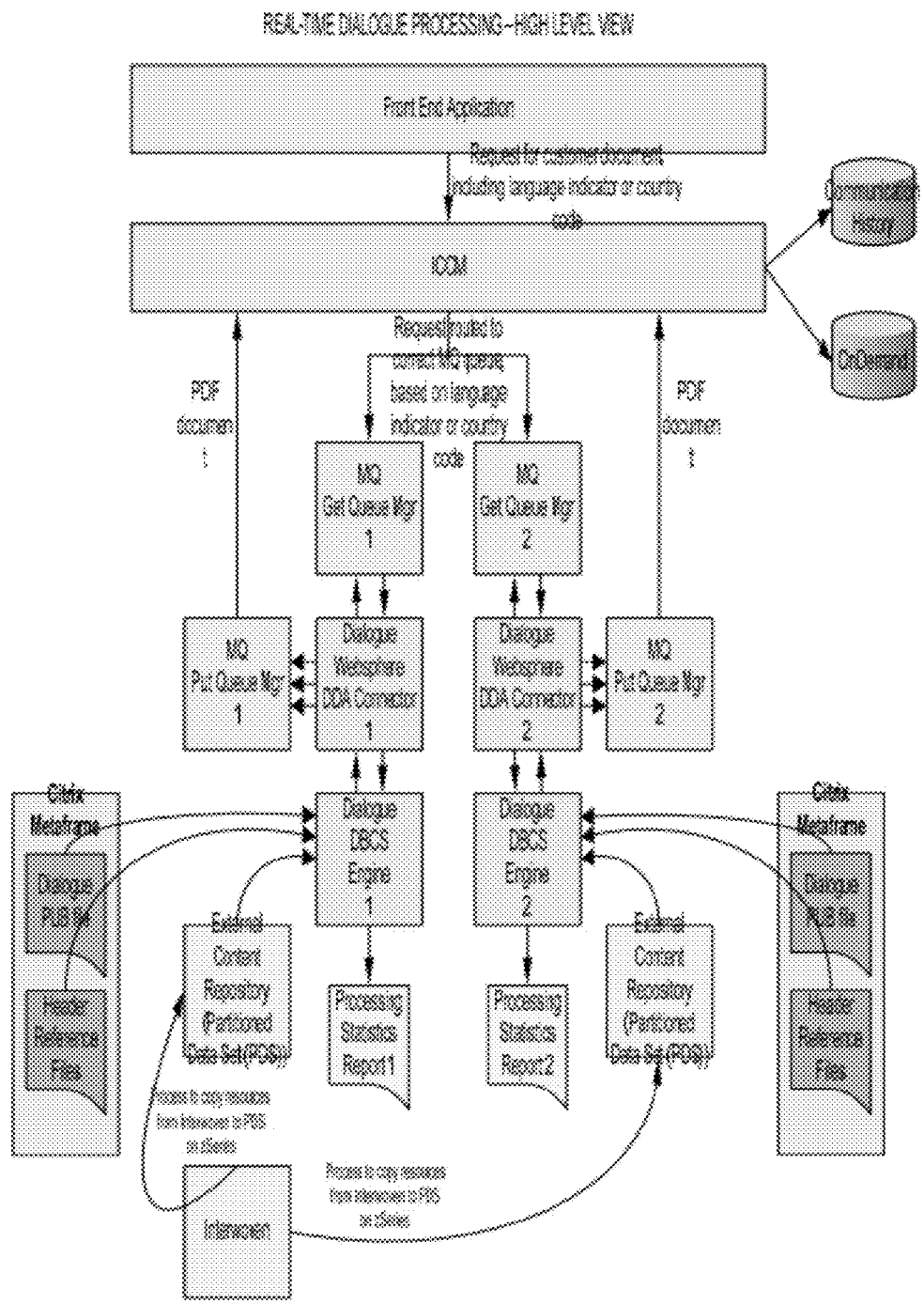
FIG. 24 is an exemplary diagram showing a High Level View of Real-Time Dialogue Processing.

FIG. 24 is an exemplary diagram showing a High Level View of Real-Time Dialogue Processing. FIG. 24 shows how requests for customer documents will flow from the front-end application for processing, according to some embodiments:

The front-end will pass a request for a document to ICCM.

For through-put efficiency, there may be more than one Dialogue process running. ICCM will decision which Dialogue process to send the document request. The decision will be based on the country code indicator.

The request will be placed into an MQ queue. The Dialogue process polls the MQ queue and will pick up the message for processing.

When the customer document is being rendered by Dialogue, if necessary any external content will be fetched by the Dialogue process.

The customer document will be rendered as a PDF document and will be placed on an MQ queue for ICCM to pick up and deliver back to the browser.

Figure 25:
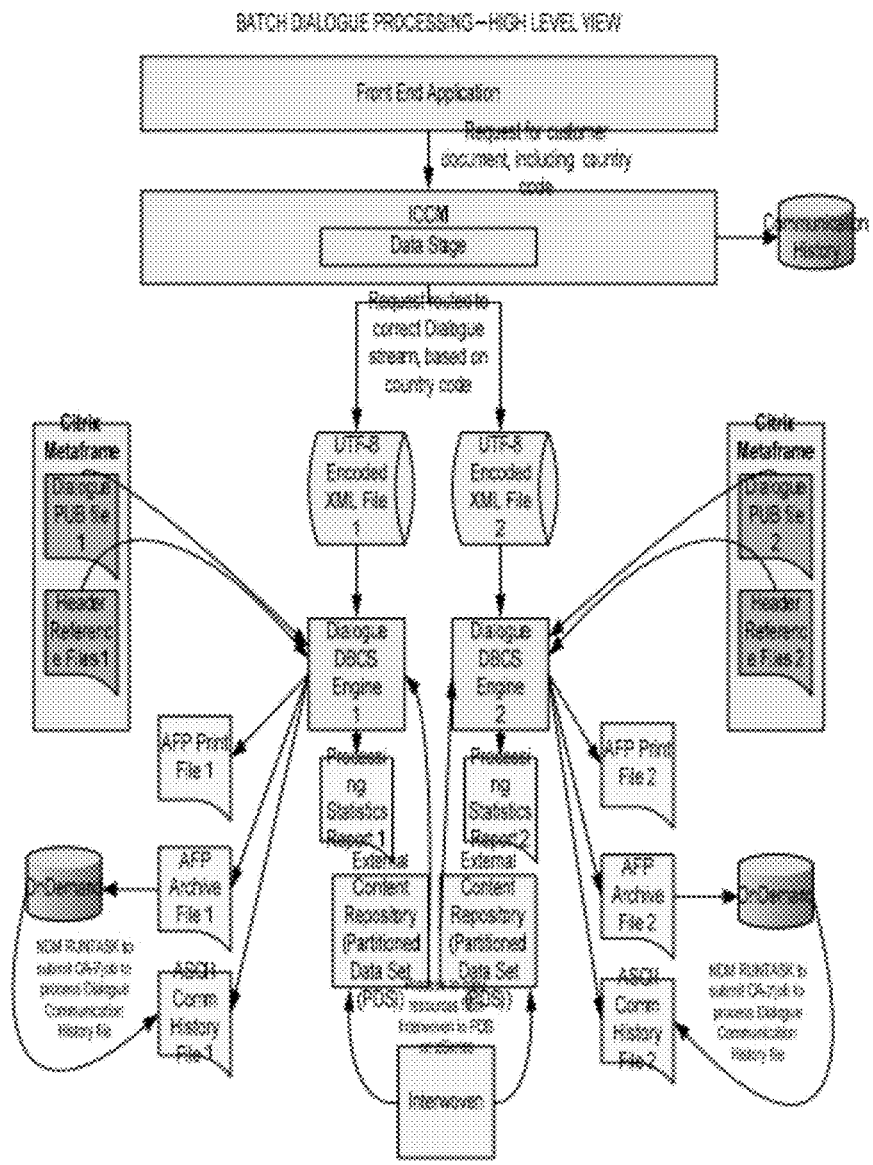
FIG. 25 is an exemplary diagram showing a High Level View of Batch Dialogue Processing.

FIG. 25 is an exemplary diagram showing a High Level View of Batch Dialogue Processing. FIG. 25 shows how requests for customer documents will flow from the front-end application for processing, according to some embodiments:

The front-end will pass a request for a document to ICCM.

For through-put efficiency, there may be more than one Dialogue process running. ICCM will decision which Dialogue process to send the document request. The decision will be based on the country code indicator.

ICCM will write out an XML file for each Dialogue batch process.

When the customer document is being rendered by Dialogue, if necessary any external content will be fetched by the Dialogue process.

At the end of batch processing the following files are written:
  Customer document file (AFP or PostScript)
  OnDemand archive file (AFP)
  Communication History file (ASCII report file)
  Dialogue Message file (ASCII report file)

Figure 26:
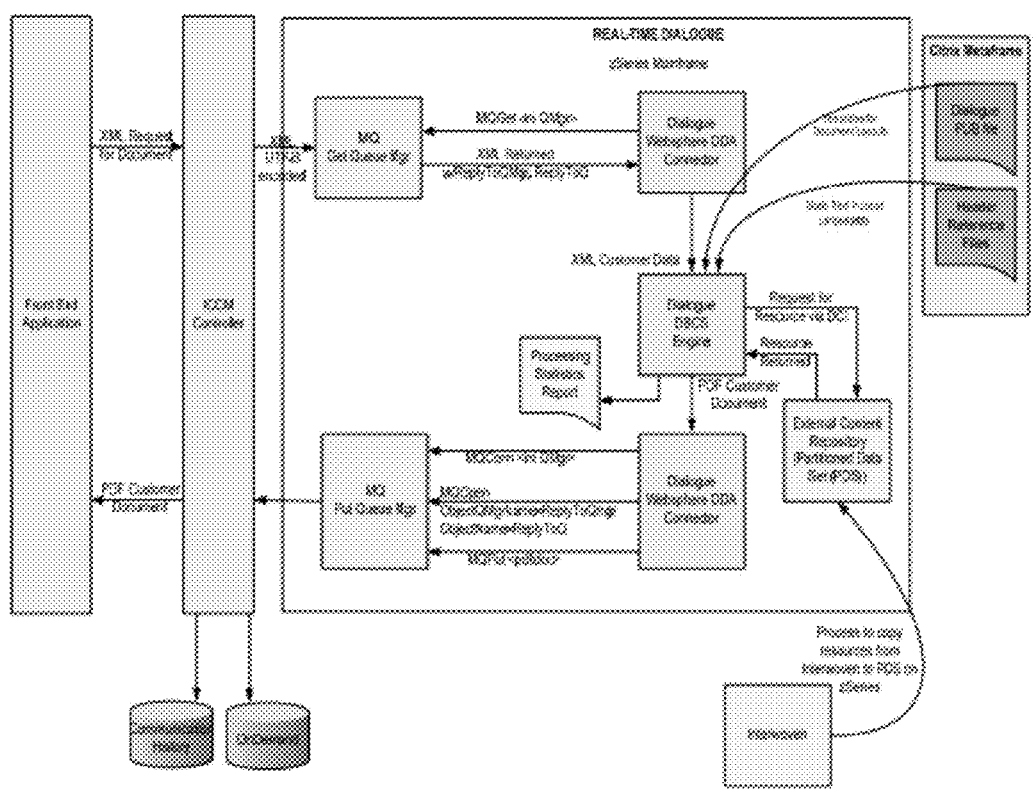
FIG. 26 is an exemplary diagram illustrating Real-Time Dialogue Processing to produce a PDF document back to a front-end browser.

FIG. 26 is an exemplary diagram illustrating Real-Time Dialogue Processing to produce a PDF document back to a front-end browser. FIG. 26 is a detailed representation of a single Dialogue process showing how requests for a customer document will flow from the front-end, according to some embodiments:

The front-end will pass a request for a document to ICCM. The request will be placed into an MQ queue.

The Dialogue connector polls the MQ queue and will pass the message to the Dialogue engine for processing.

When the customer document is being rendered by Dialogue, if necessary any external content will be fetched by the Dialogue process.

The customer document will be rendered as a PDF document and will be passed back to the Dialogue connector.

The Dialogue connector will place the PDF on an MQ queue for ICCM to pick up and deliver back to the browser.

When the Dialogue process is shut down the Dialogue message log (processing statistics report) will be written.

The size of the PDF documents produced will be limited by the allowable MQ messages size limit and performance benchmarks (usually MQ limit is 4 MB and the recommended average size of document is less than 1 MB, though these values may vary).

Figure 27:
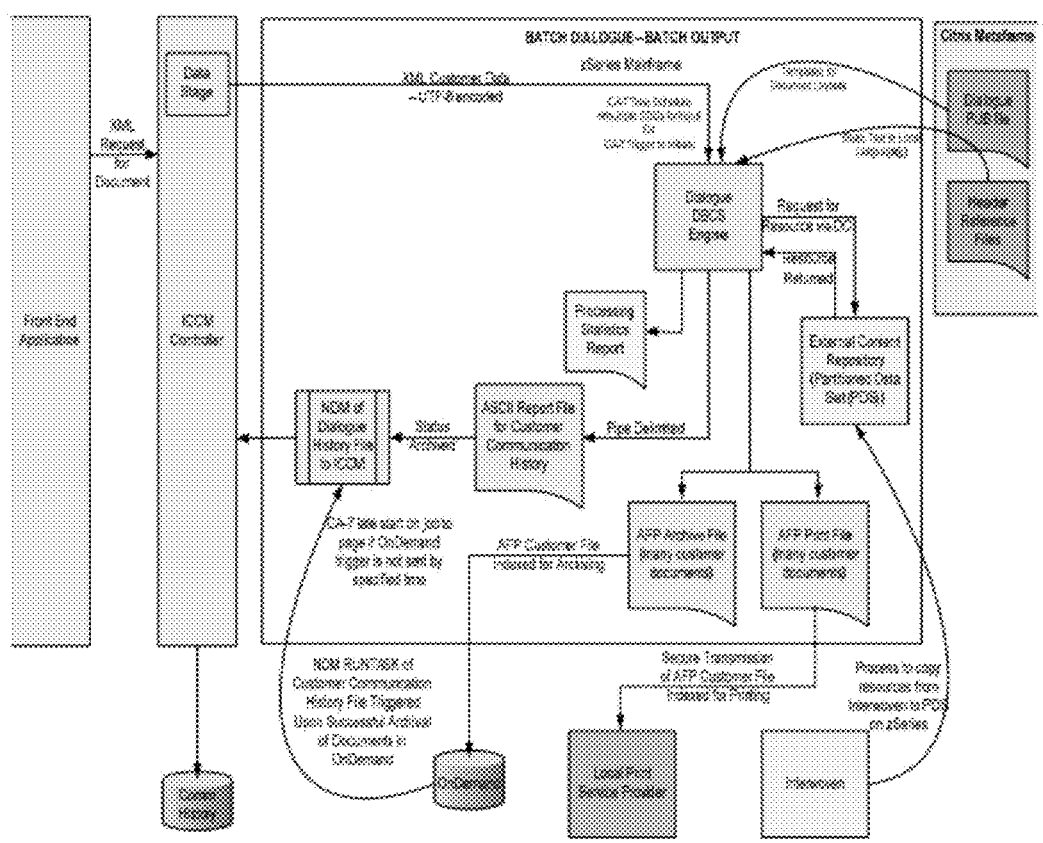
FIG. 27 is an exemplary diagram illustrating Real-Time Dialogue Processing to produce batch AFP file to transmit to local print service providers.

FIG. 27 is an exemplary diagram illustrating Real-Time Dialogue Processing to produce batch AFP file to transmit to local print service providers (Real-Time In→Batch Out). FIG. 27 is a detailed representation of a single Dialogue process showing how requests for a customer document will flow from the front-end, according to some embodiments:

The front-end will pass the requests for documents to ICCM.

ICCM will batch the input requests in a temporary database.

ICCM will use datastage to read the contents of temporary DB and write out an XML file (to be fed as input to Dialogue).

When the customer document is being rendered by Dialogue, if necessary any external content will be fetched by the Dialogue process.

At the end of batch processing the following files are written:
  Customer document file (AFP or PostScript)
  OnDemand archive file (AFP)
  Communication History file (ASCII report file)
  Dialogue Message file (ASCII report file)

Figure 28:
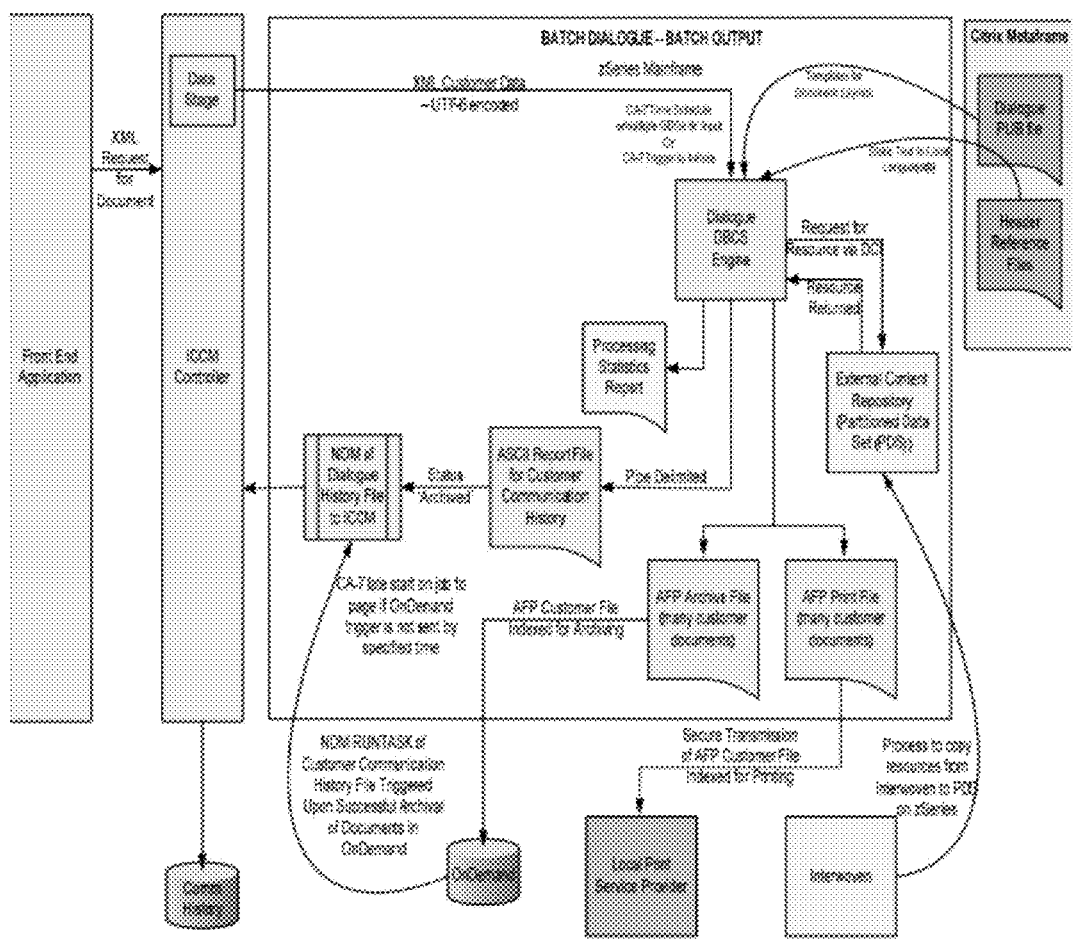
FIG. 28 is an exemplary diagram illustrating Batch Dialogue Processing to produce a batch AFP file to transmit to local print service providers

FIG. 28 is an exemplary diagram illustrating Batch Dialogue Processing to produce a batch AFP file to transmit to local print service providers. FIG. 28 is a detailed representation of a single Dialogue process showing how requests for a customer document will flow from the front-end, according to some embodiments:

The front-end will pass the requests for documents to ICCM.

ICCM will write out an XML file.

When the customer document is being rendered by Dialogue, if necessary any external content will be fetched by the Dialogue process.

At the end of batch processing the following files are written:
  Customer document file (AFP or PostScript)
  OnDemand archive file (AFP)
  Communication History file (ASCII report file)
  Dialogue Message file (ASCII report file)

Send communication requests will be initiated from the product system to ICCM. Distribution to the different fulfillment engines will be processed by the Messaging Module and handed off to each delivery channel. For sending out eMail and SMS communications, Kana is the tool of choice.

Figure 29:
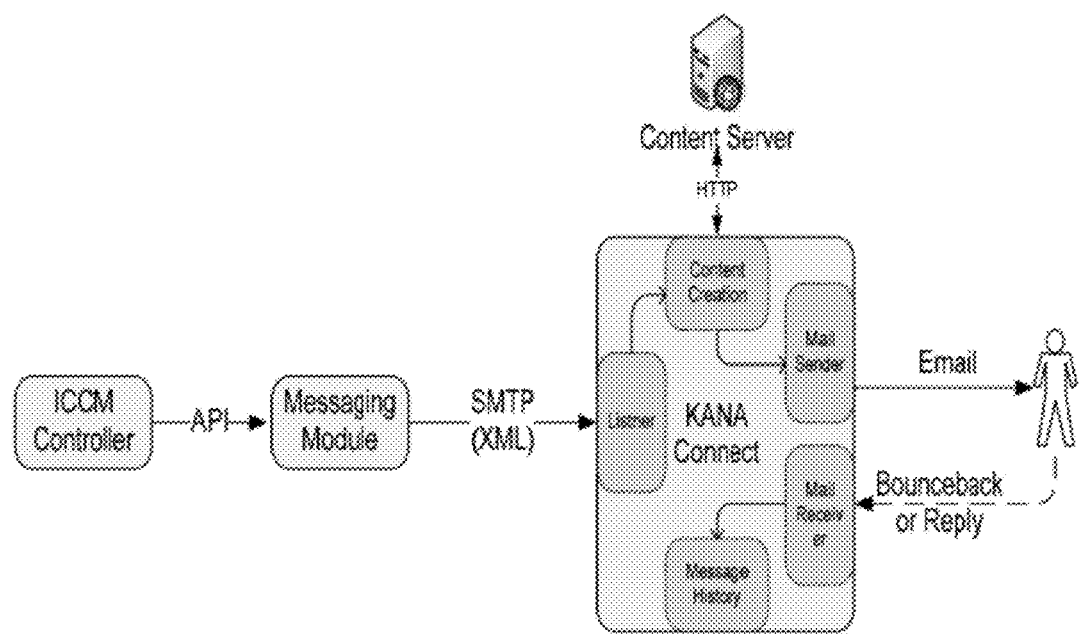
FIG. 29 illustrates how real-time processing may be managed through KANA Connect, according to some embodiments.

As shown, for example, in FIG. 29, real-time processing will be managed through the KANA Connect event listener. The event listener is a service within Connect that listens and processes XML message triggers. The SMSC will be responsible for aggregation and delivery to customer's mobile phone.

Figure 30:
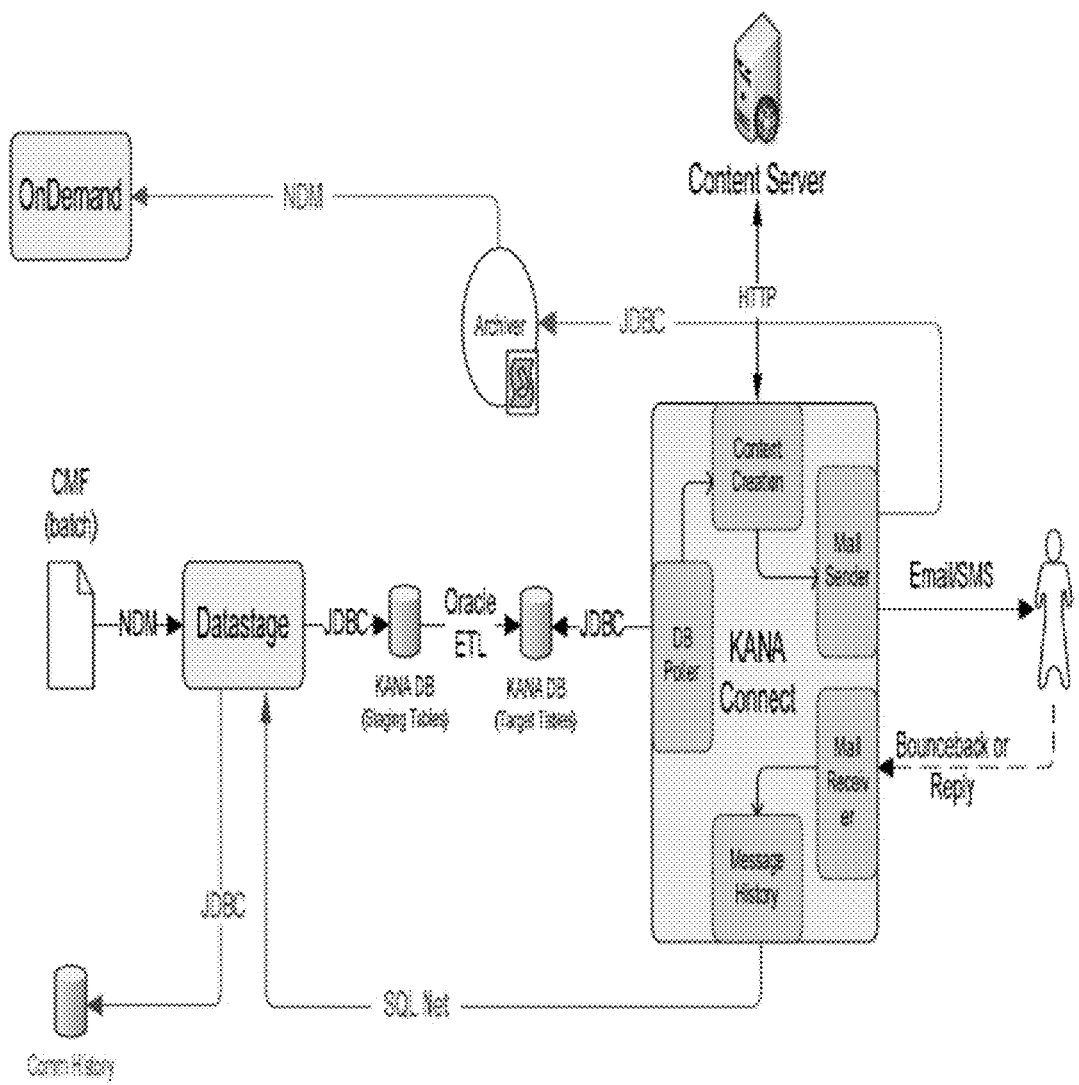
FIG. 30 illustrates how batch processing may be initiated through a dataload to a KANA Connect database, according to some embodiments.

As shown, for example, in FIG. 30, batch processing will be initiated through a dataload to the Connect database. Within the Connect schema several staging tables will be loaded with new customer email/SMS requests. Once the dataload has completed several Oracle ETL processes will commence to load the target tables and activate the campaigns within Connect.

Figure 31:
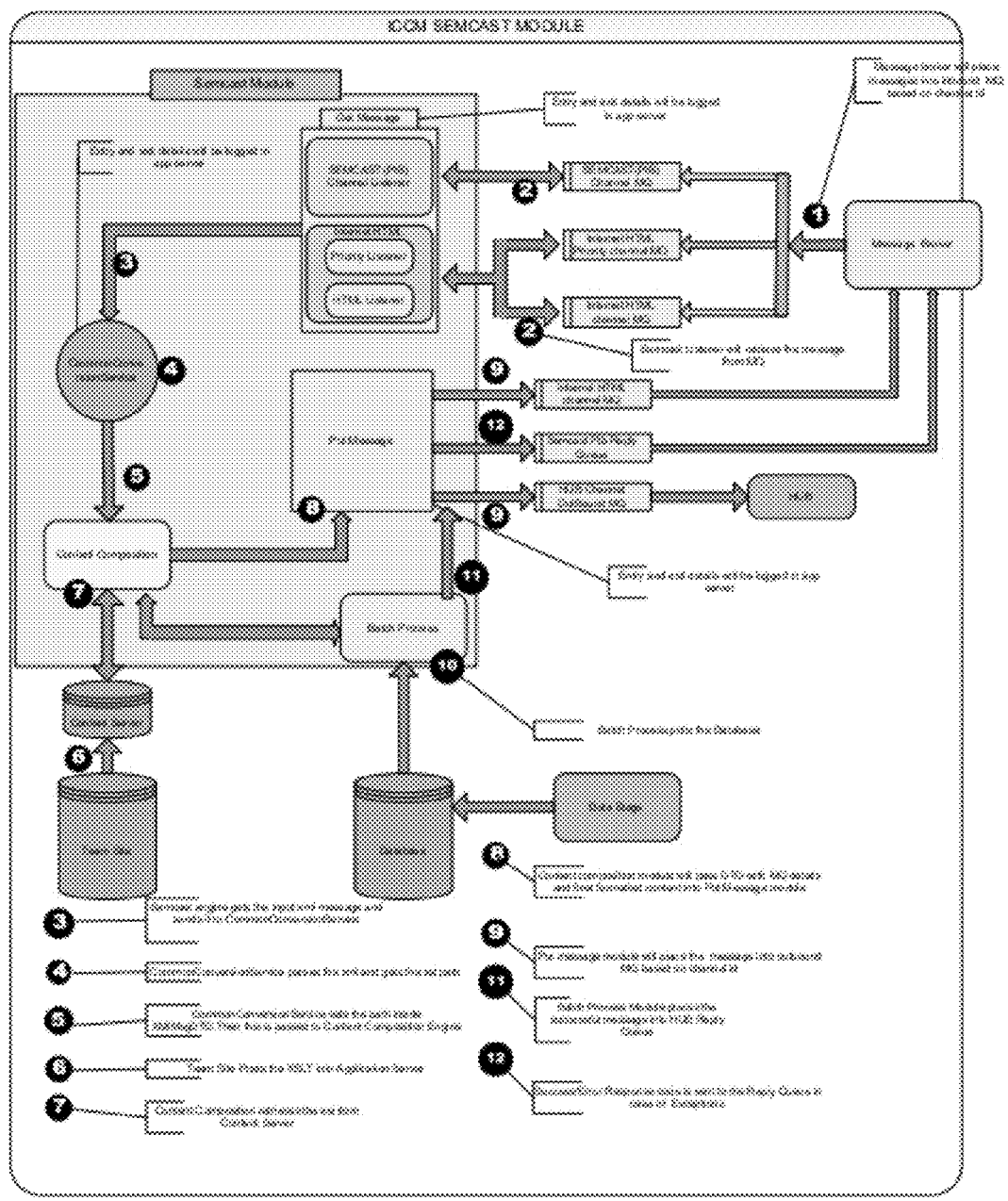
FIG. 31 depicts an exemplary high level architecture diagram for SeMCast.

SeMCast will be used to support production of HTML documents such as terms and conditions for presentment on the AO front end application. FIG. 31 depicts an exemplary high level architecture diagram for SeMCast.

Regarding Document Archival, in some cases recreating a document from existing template, dynamic data and static data does not guarantee an exact reproduction of the document at the level needed. For example, certain documents may need to be exactly reproduced due to legal or compliance reasons. In order to achieve this, the composed documents/communications may be stored in an archival system.

Also, in order to be able to resend the communications, these documents will need to be retrieved from the archive and sent for delivery.

In some embodiments, OnDemand is the R2 green technology used for document archival. Listed below are some exemplary scenarios explaining how OnDemand may be utilized.

For eMail Archival, eMail communications can be archived in OnDemand. In some embodiments, the steps below are followed:

ICCM controller will read the request queues and will send the request to the Messaging Module (MM) using the MM API. The messaging module will send the request to Kana.

Once the eMail will be sent successfully it will be stacked in a flat file with appropriate index records at Kana. The structure of the flat file will be attached in Fields section which will contain index record followed by the HTML documents.

The flat file will be sent over to the zSeries OnDemand high level qualifiers using Connect Direct.

This will trigger a batch job in CA7 Scheduler on zSeries which will archive the HTML documents in IBM CMOD (Archive).

On successful archival of documents in IBM CMOD a trigger will be sent back to Kana as a Run Task in Connect Direct which will trigger the process of Kana updating the Communication history.

Figure 32:
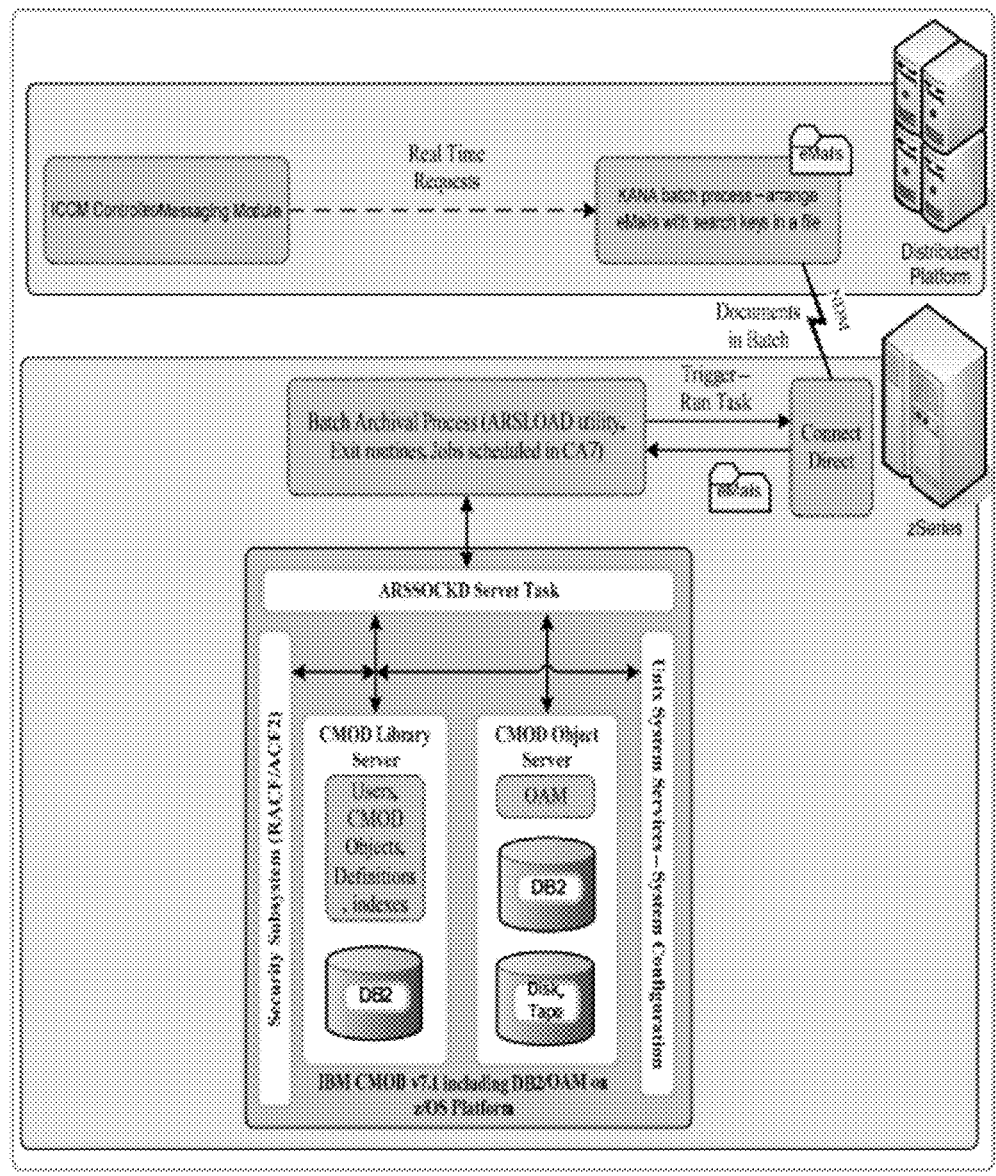
FIG. 32 illustrates an exemplary email batch archival system flow.

FIG. 32 illustrates an exemplary email batch archival system flow.

Figure 33:
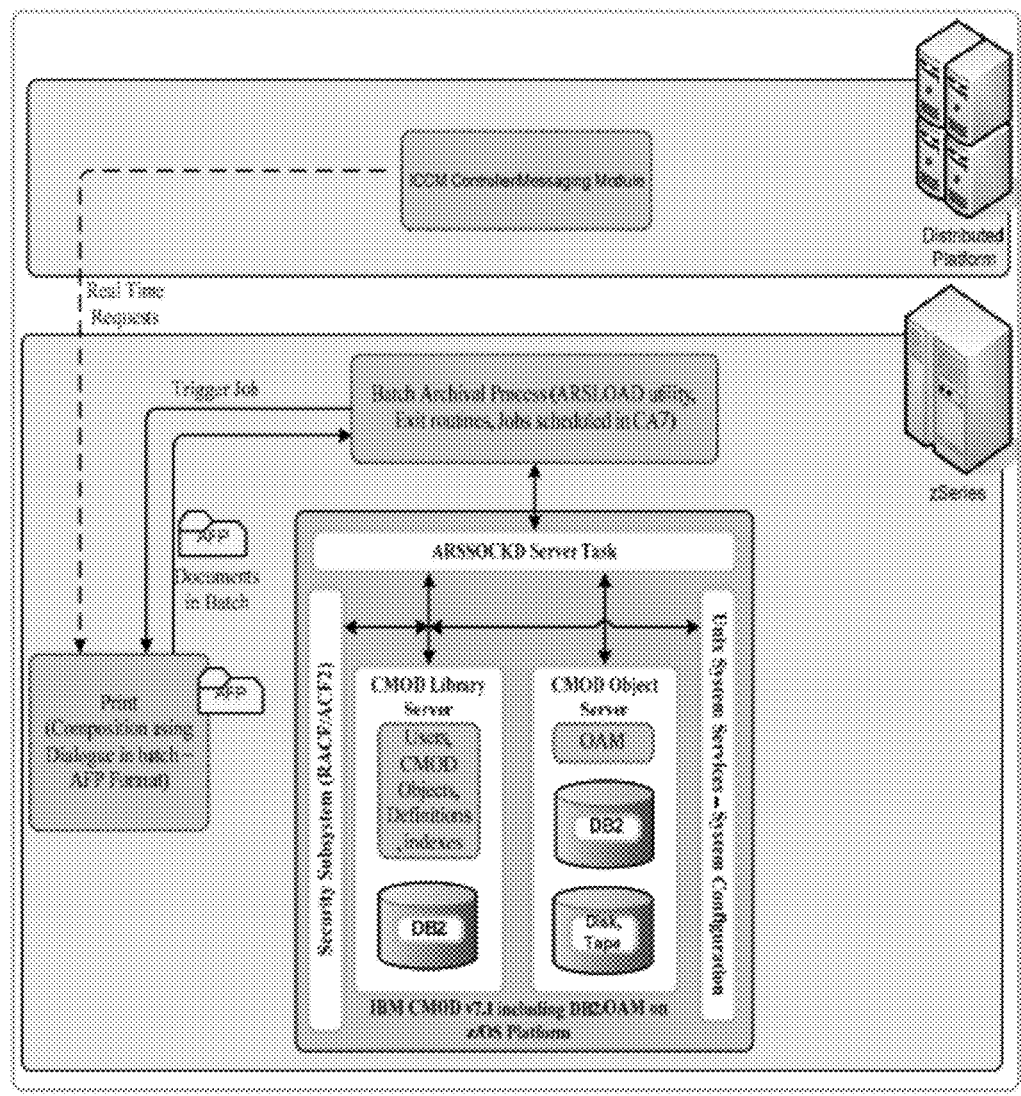
FIG. 33 illustrates an exemplary print batch archival system flow.

In some embodiments, ICCM also provides Print Archival functionality (Dialogue on same LPAR)—e.g., archival of print documents that need to be reproduced exactly the same as issued. The steps below and FIG. 33 explain an exemplary print archival process:

ICCM controller will read the request queues and will send the request to the Messaging Module (MM) using the MM API. The messaging module will send the request to be batched at Dialogue in XML.

Dialogue will compose the documents and will stack it in an output file in AFP format. The AFP documents will have the TLE structure with agreed upon fields. Details in the Fields section.

The AFP file will be copied over to the zSeries OnDemand high level qualifiers assuming the Dialogue engine would be running on the same LPAR. Otherwise connect direct will be used.

This will trigger a batch job in CA7 Scheduler on zSeries which will archive the AFP documents in the IBM CMOD (Archive).

On successful archival of documents in IBM CMOD a trigger will be sent back to CA7 to trigger the Dialogue process of updating the Communication History.

Figure 34:
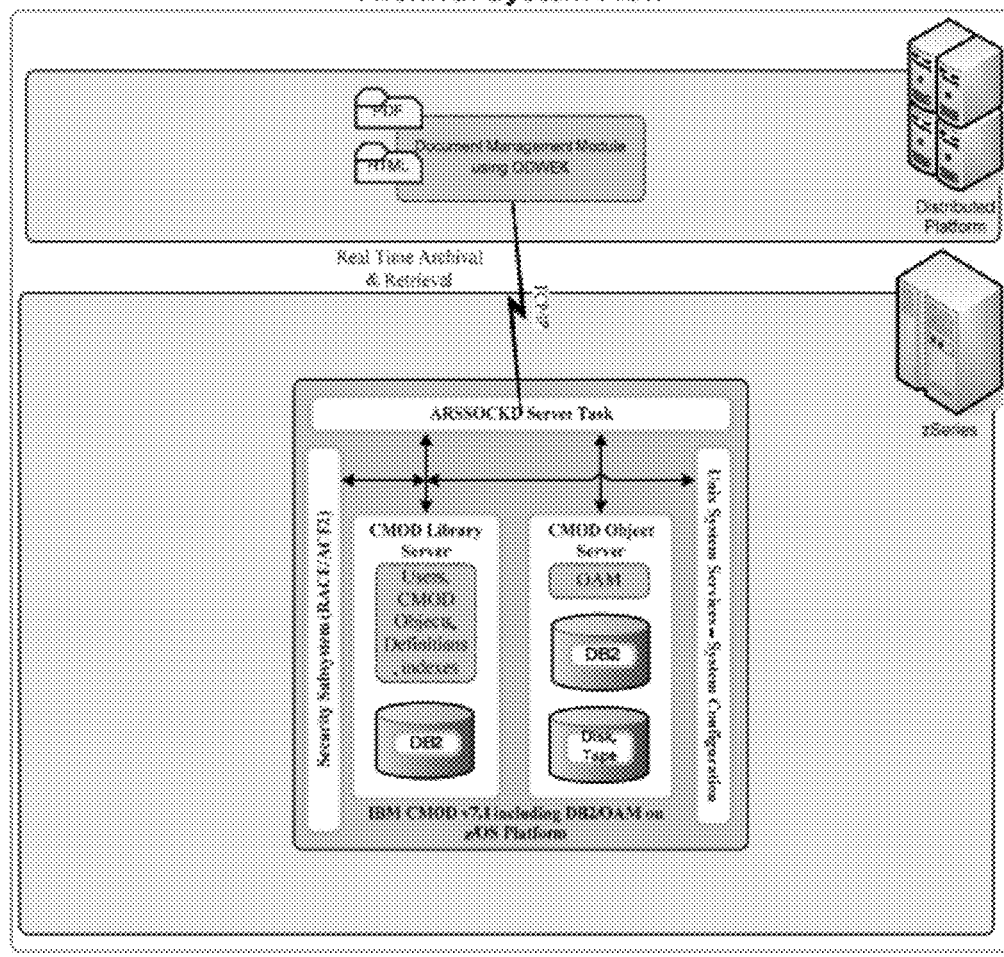
FIG. 34 shows an exemplary diagram of an Internet Channel PDF & HTML real time archival system flow.

For internet archival, if a document needs to be archived, ICCM will use the IBM CMOD ODWEK API's (StoreDoc API) to archive the document to IBM CMOD (Archive) in real time. FIG. 34 shows an exemplary diagram of Internet Channel PDF & HTML Archival system flow, according to some embodiments. The steps may, for example, be as follows:

ICCM Controller will read the request queues and will send the request to the Document Management Module (DMM) using the DMM API.

The DMM module will send the request to compose the documents to the Internet Channel (Dialogue) in XML.

Dialogue will compose the documents and will return the document back to the DMM Module.

DMM Module will check the appropriate system configuration to decide if the document needs to be archived or not.

Figure 35:
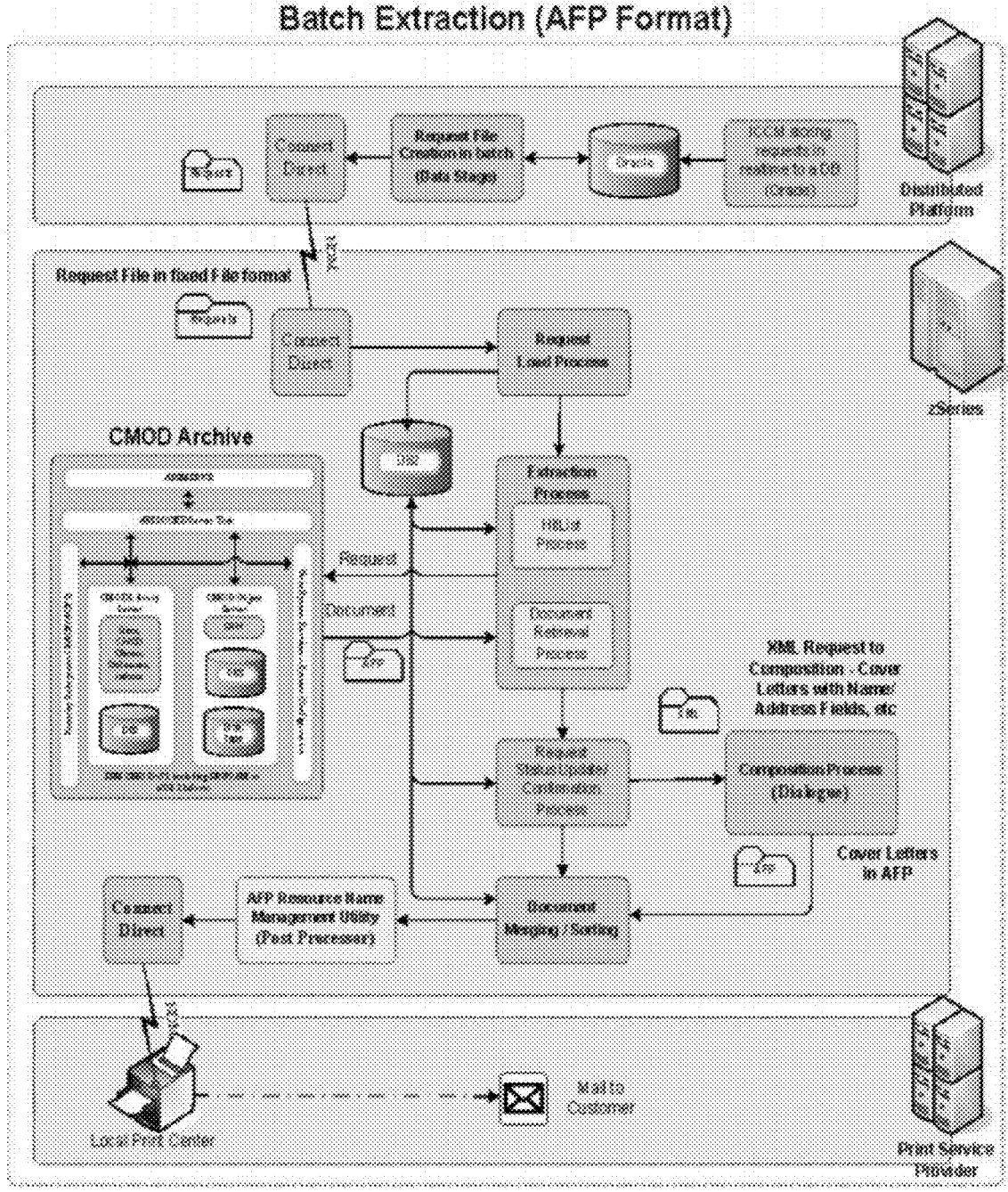
FIG. 35 is an exemplary diagram illustrating ICCM Resend Print Communication functionality.

FIG. 35 is an exemplary diagram illustrating ICCM Resend Print (Archived) Communication functionality. The steps may, for example, be as follows:

ICCM Controller will stack the resend communication requests for print in a DB Request table.

All the resend requests will be written to a file for OnDemand processing. Layout of the file is mentioned below.

The Flat file will be sent over to the zSeries OnDemand high level qualifiers using Connect Direct.

This will trigger a batch job in CA7 Scheduler on zSeries which will process all resend communication requests.

Print output file(s) will be generated & send to local print center for printing & mailing.

On successful processing of Resend requests a confirmation file (CHS) will be sent back to Datastage as a Run task in Connect Direct which will trigger the process of Datastage updating the Communication.

The ICCM (Integrated Customer Communications Module) solution allows business users to send both communications and documents to customers and prospects via multiple delivery channels including eMail, SMS, Secure eMail, Websites, Paper, and ATM. ICCM also supports simultaneous multiple channel delivery, and can, for example, automatically resend duplicate copies via preferred channel, or multiple channels, on customer request.

As a result of the need to deliver a communication or document to a customer via the aforementioned channels, the ICCM fulfilment engine will interface with a Group standard, enterprise content management application to allow it to fetch the appropriate channel layout template, generate personalized, channel optimized content, apply it to the template, and distribute the message onto the customer/prospect as required by the business.

In various embodiments, ICCM provides users the ability to create, modify, and deploy templates in real-time and online. ICCM Template and Content Management is optionally based on entitlements (e.g., by user, user type, user role, product type, channel, customer group/segment, field on screen). Different templates may have different entitlements. Templates are preferably standard across countries. Differences should be to comply with external regulations rather than internal differences. ICCM templates are easily searchable so that duplicates are not created. Templates can be in multiple languages, both single and double byte, and languages that write from right to left. The same template can contain more than one language (e.g., address in English, narrative in Chinese). Templates can include images and graphics, in color and/or black and white. Rendered documents can contain bar code (printable and includable in files such as PDF). Rendered documents are printable on multiple size stationary, pre-printed stock or plain paper, and one side or both sides (duplex) of a sheet.

Templates are able to contain the following, but are not limited to these examples:
  Static data that cannot be changed
  Static data that can be manually changed by a staff user
  Space where a user can manually add data
  Space where supplied dynamic data can be inserted
  Default data which would be replaced if data is provided by the calling process or used if data is not provided
  Expandable areas which can be filled by dynamic data; if such data is not supplied, the rendered document should not show blank space. A template may contain such areas at multiple places. For example, different marketing messages may appear in a composite statement at different places corresponding to the products whose information is being shown. (A composite statement in HUB provides portfolio summary and transaction statements of the various accounts held by a customer).
  Tables that may be repeated for unspecified number of times in a document; the number of repetitions can vary from one document to another In some embodiments, within the content management application (BDE/Teamsite), HTS will provide a set of data capture templates (DCTs) that will allow business users to manage assets (text, images, dynamic data, content fragments) used for their communications. These document capture templates will allow business users to manipulate certain components of the communication (content, color scheme, font, images) in a very non-technical, user friendly manner that does not alter the predefined look, feel, and layout of the communication.

The Teamsite templates will collect multi-channel communication data in a centralized fashion and output content fragments in the form of content control files, or tagged text.

As used herein, the term Teamsite Template is interchangeable with the terms Data Capture Template (DCT) and Primary Business Template. A data capture template is a consolidated data entry point for the communication or document that is to be sent to the customer. This template is designed to collect multi-channel data in a centralized fashion, allowing business users to specify eMail, SMS, Print/PDF, HTML and Secure eMail content all via the same content management tool. This data could be comprised of text, hyperlinks, dynamic "merge" data fields, and images. The DCTs allow users to specify both local (within the workarea) and external data elements (accessible via an HTTP request).

As used herein, IT Templates (Secondary Technology Templates or Channel Optimized Templates—XSLT, or Dialogue (proprietary format)) refer to a template that defines the layout or "landscape" of the document. At run-time, it will combine all of the data elements (content fragments and images) input through the BDE data capture template to format the communication document prior to distribution. Secondary templates are preferably not directly manipulated by a business user, but they will be composed through a combination of data provided through the primary template and logic coded within the secondary template by an HTS resource. Secondary templates will be designed, developed, and maintained by HTS resources based on business requirements.

The layout of a document refers to the look and feel of the document components of the document, including images, and sections of text and paragraphs. The types of layout defined and developed for each group of documents are based on the assumption that a set of potential common layouts will be defined, and they can be used across each groupMember/controlCode/operationalUnit per ICCM installation. Modification to the layout will impact all users using that template, and new template could be added with IT involvement. Layouts available for the initial release are: LTR1, LTR2, MKT1, MKT2, FLX, TC1, TC2, LST1, LST2 and MIX.

The installation of ICCM may include the environment setup for BDE Teamsite, its workarea, the deployment workflows for eChannels and Dialogue, in addition to the setup for content/template hosting servers.

In some embodiments, the ICCM content and templates can make use of the existing customer-facing BDE deployments. Future deployments can make use of the customer facing BDEs already available within the regions.

In some embodiments, steps involving BDE templating include one or more of the following:
  Business Content Manager inputs content and images via the DCT—Teamsite template that was developed by IT:
    DCT is created and managed by HTS, but the business can create and update the assets provided through it;
    Once business user click Save or Generate in Teamsite template, a content control file with pre-defined name based on user selection will be created;
    Business can also upload images that would be needed for the communication document into a specific, pre-defined area in Teamsite;
    The content control file is channel optimized content to be used by application for document composition;
  IT develops Secondary IT templates that mainly used to determine the layout—the look and feel—of the document;
  The content control files, which are created by business user and are channel optimized, and the Secondary IT templates, which are developed and maintained by IT, may be deployed to content host servers at target locations (such as Webservers and App servers);
  The ICCM application engine may pass to the channels the specific information through calculation based on request data from calling system;
  Individual channel will retrieve the content control files and the Secondary IT templates to compose the communication document. Once composed, the channel will deliver the appropriate communication document to the customer/prospect.

Figure 36:
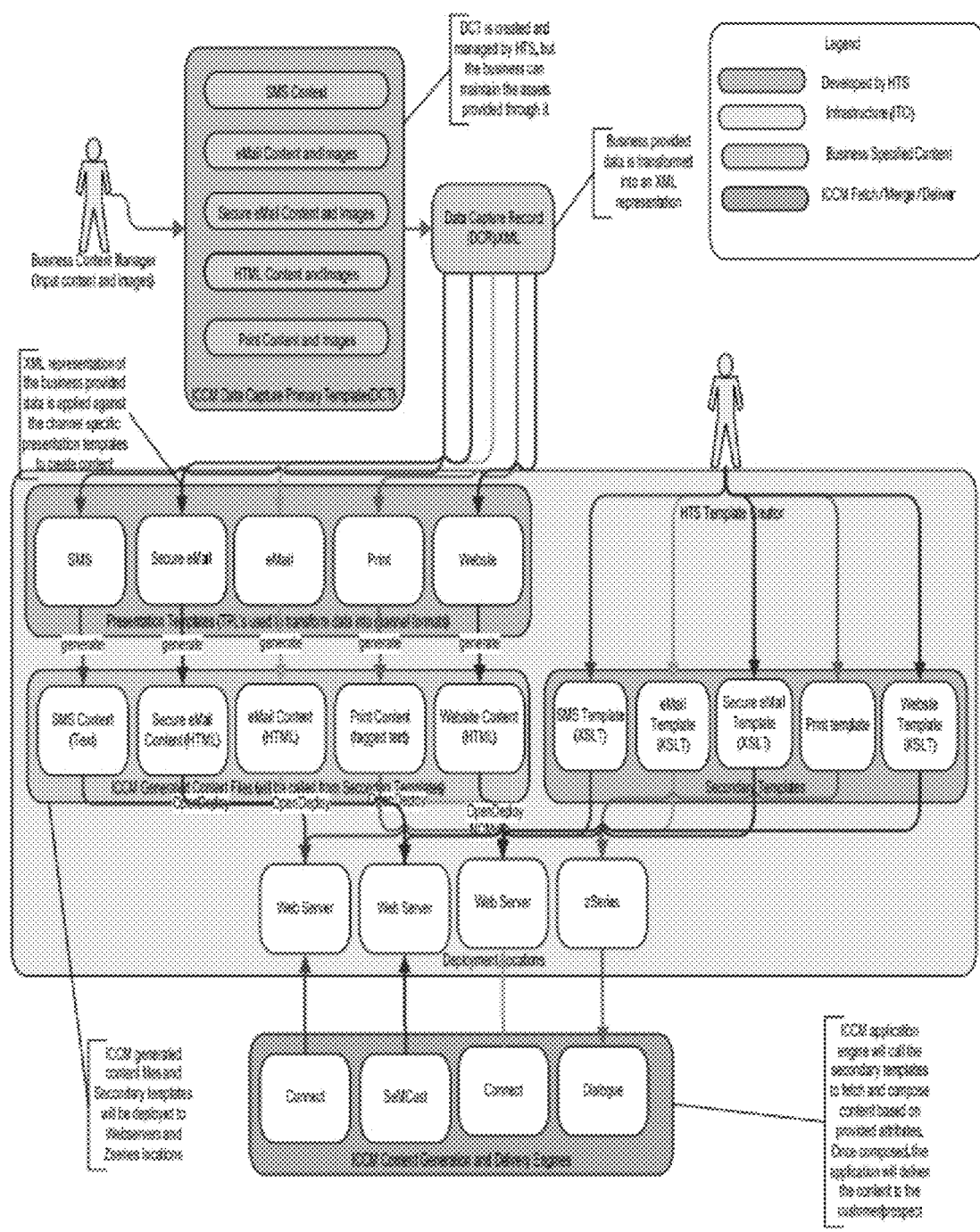
FIG. 36 depicts an exemplary content/template management flow, according to some embodiments.

FIG. 36 depicts an exemplary content/template management flow, according to some embodiments.

Figure 37:
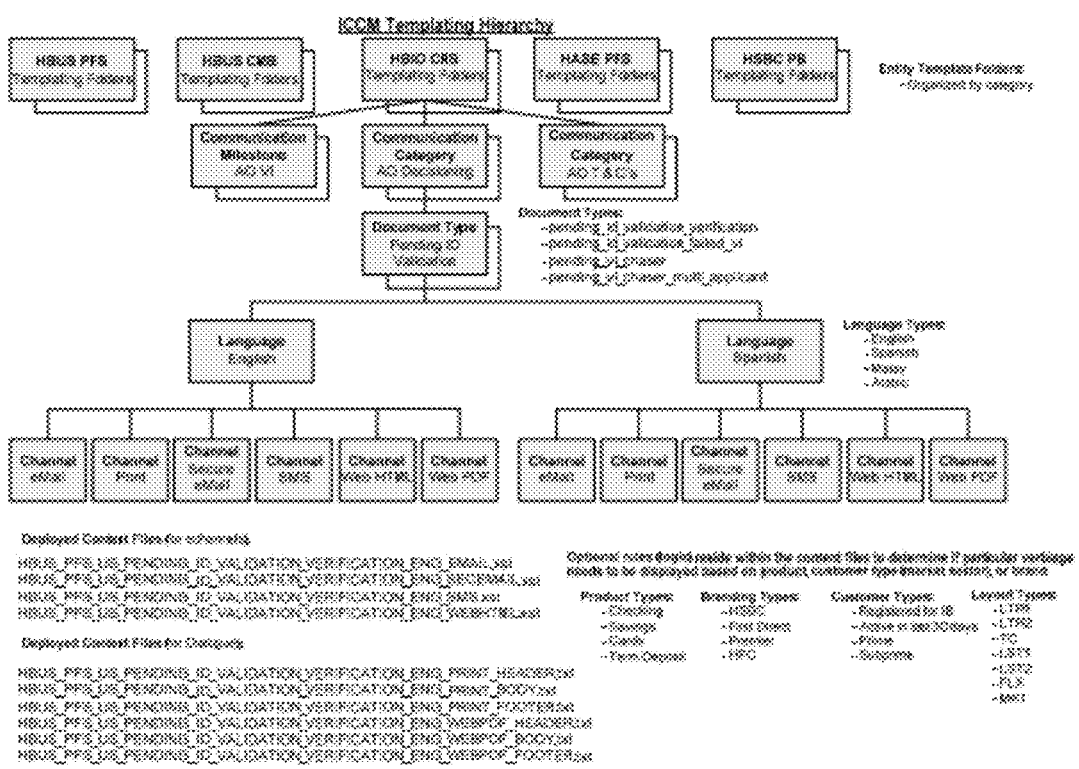
FIG. 37 illustrates an exemplary data capture hierarchy for templates.
Figure 38:
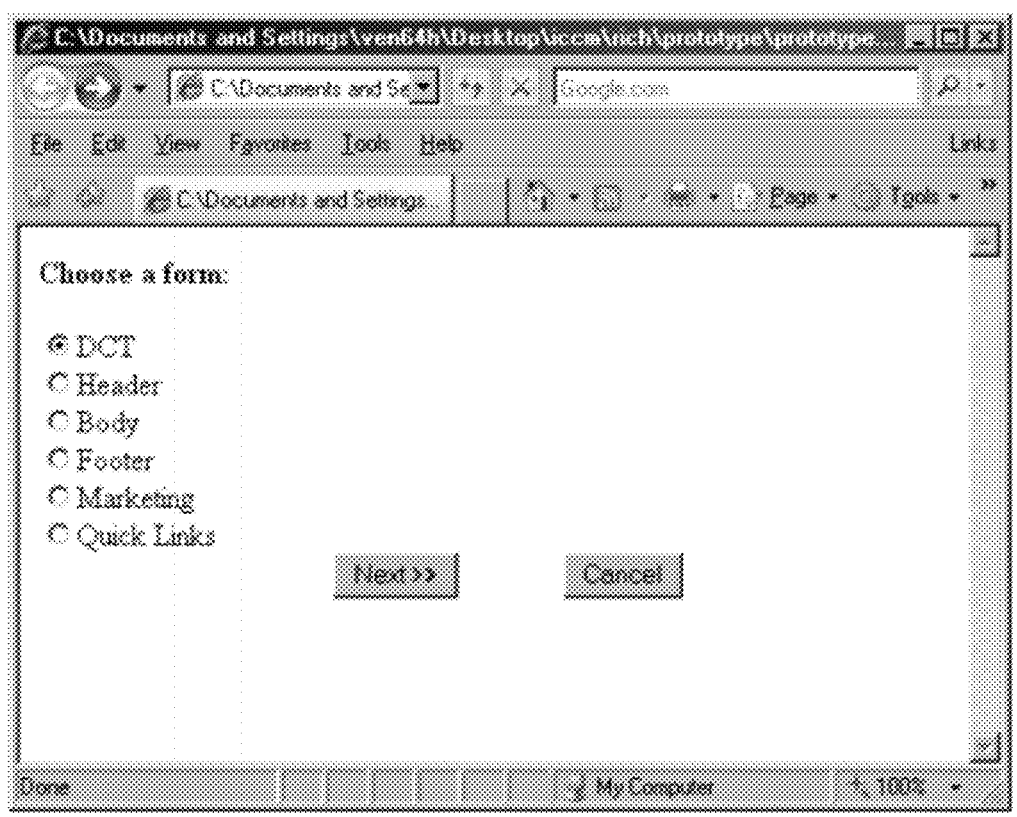
FIGS. 38-41 show screenshots of exemplary content/template management screens.
Figure 39:
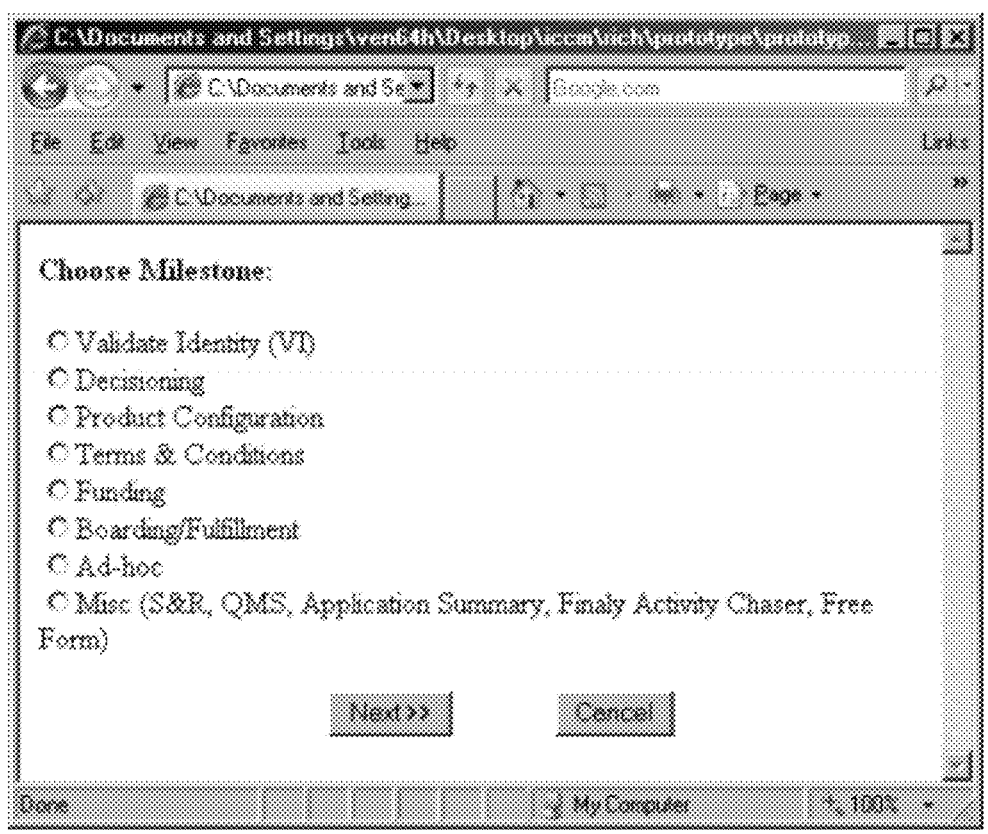
Figure 40:
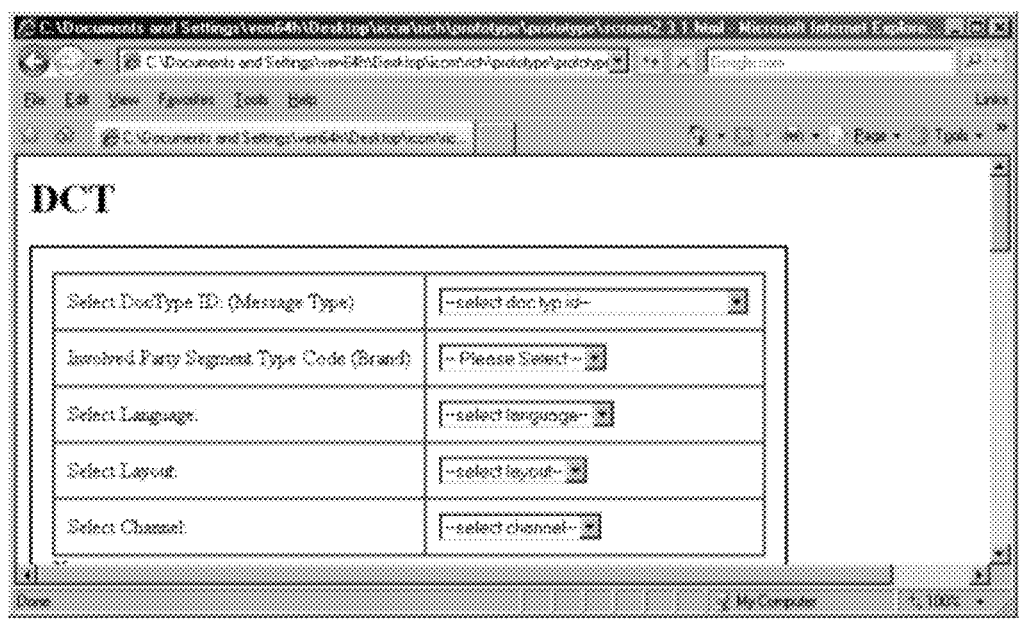
Figure 41:
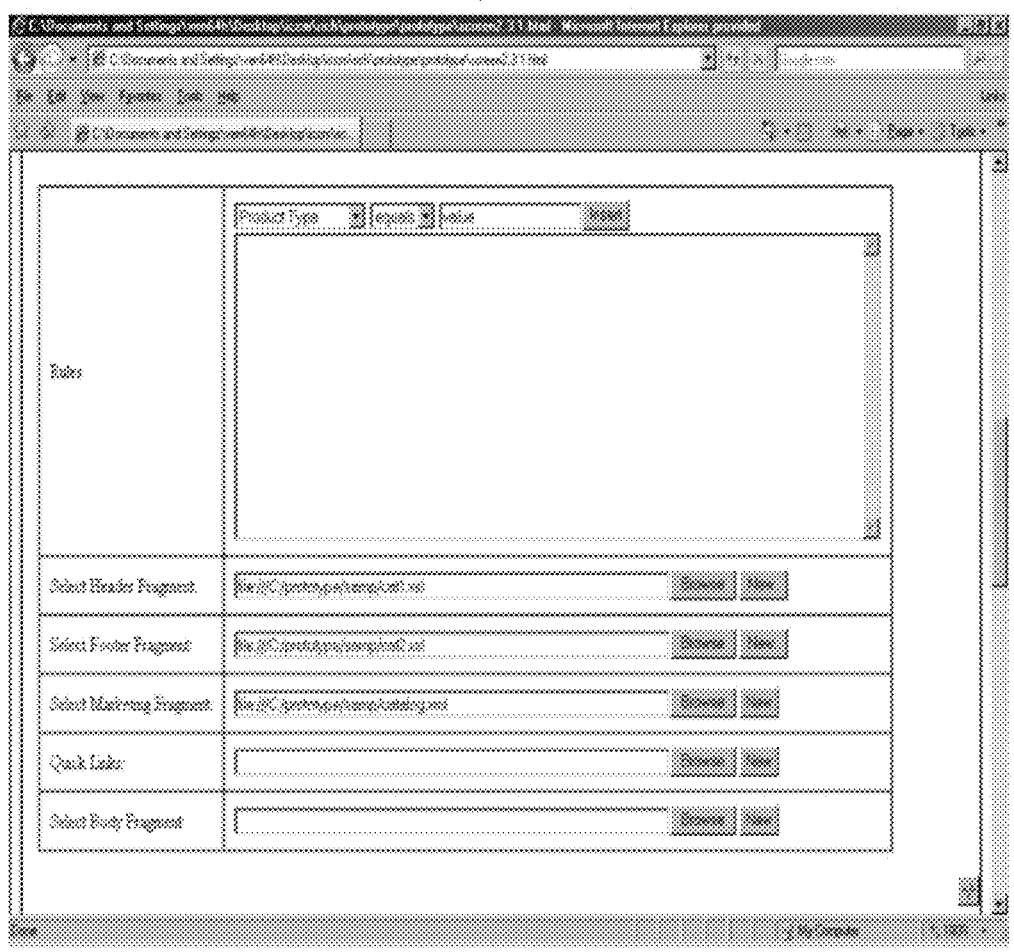

FIG. 37 illustrates an exemplary data capture hierarchy for templates.

In some embodiments, the process for template creation/management is as follows:
  A business user will login to the BDE and navigate to their branch/workarea that is defined for ICCM.
  Within these folders, template categories will provide the organizational breakdown assigned to the sub-folders (here user_content instead of IT_templates):
    ICCM->user_content/control_files/
  The business user can then clicks on File, New Form Entry and select the template they would like user to enter contents for a specific document by selecting a radio button from the screen. The available ICCM Teamsite templates are:
    Complete DCT—where the header, footer, body, marketing, QuickLinks fragments can be chosen
    Header—Compose only the header fragment
    Footer—Compose only the footer fragment
    Body—Compose only the body fragment
    Marketing—Compose only the Marketing fragment
    QuickLinks—Compose only the QuickLinks fragment
  The business user will continue by clicking "Next" button, and screen will display a list of milestones to choose from. The AO milestones are:
    Validate Identity (VI)
    Decisioning
    Product Configuration
    Terms & Conditions
    Funding
    Boarding/Fulfillment
    Ad-hoc
    Misc (S&R, QMS, Application Summary, Finaly Activity Chaser, Free Form)
  The user selects one of the milestone and clicks Next. The next page would show dropdowns for:
    Message Type
    Brand
    Line of Business Description
    Language
    Layout
    Channel
  When the user selects a value from the Channel dropdown, the Teamsite template is to be displayed that is specific for that Channel & Layout;
  The user enters contents and makes selections for images if any to be included in the document.

FIGS. 38-41 show screenshots of exemplary content/template management screens.

Figure 42:
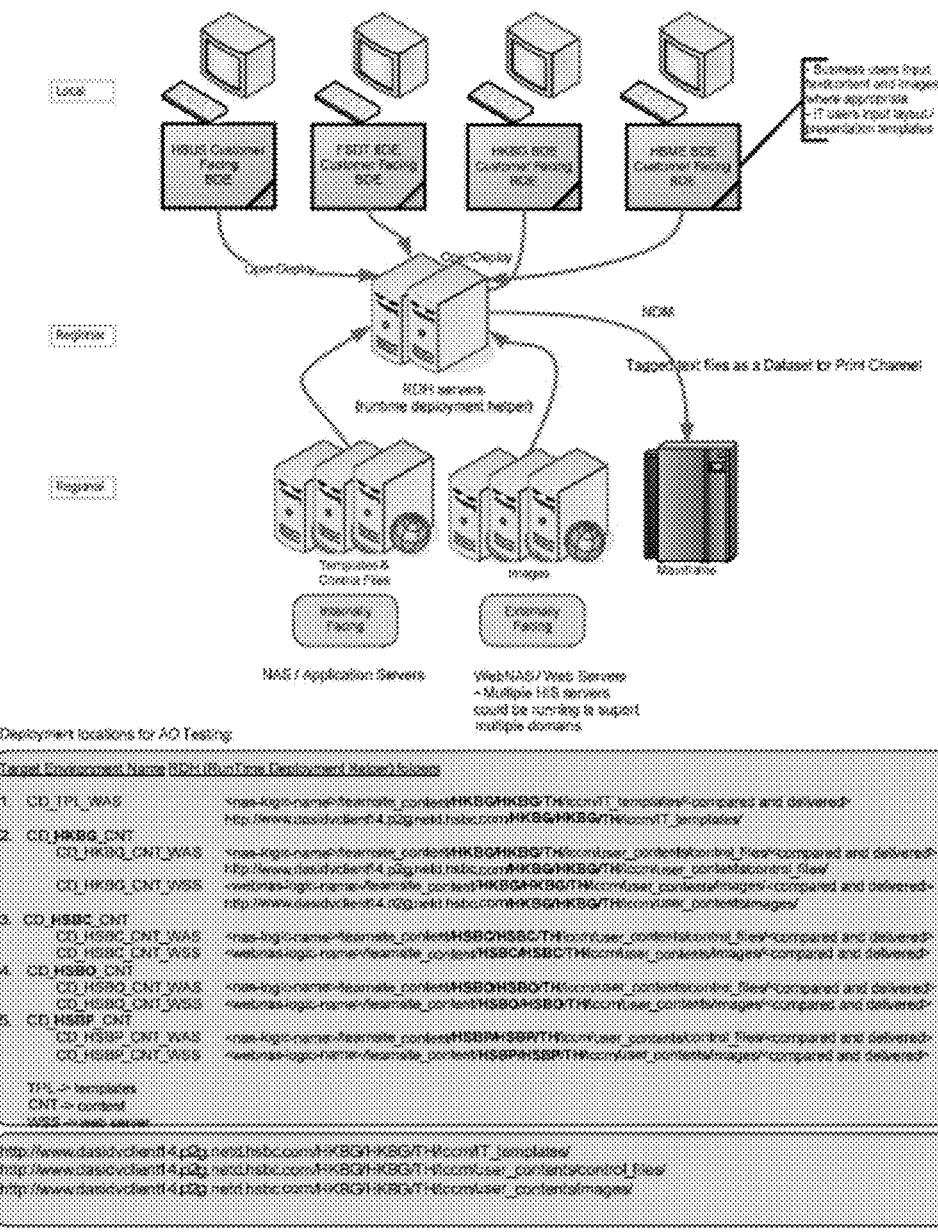
FIG. 42 is an exemplary diagram of Primary Template Deployment.

FIG. 42 is an exemplary diagram of Primary Template Deployment. In some embodiments, when published, the content control files and images will be deployed to content and template hosting servers residing on webservers and appservers. The content files generated for Dialogue/Print will be renamed and bundled, and then transmitted via NDM to the zseries mainframe through NDM Gateway.

Preferably, a business user will be able to create and edit the content and images for a given communication's primary template. The content may consist of multiple metadata attributes and content sections. Communications are designed to be sent over multiple channels (eMail, SMS, Print, etc), and the content/dynamic variables will vary by channel and communication type.

In some embodiments, the content will be captured as fragments. There are, for example, five fragments defined:
  Header
  Footer
  Body
  Marketing
  QuickLinks The template will allow for each of these fragments to be chosen. Rules can be applied based on the input message values. Some of the possible field values for the rules are:
  Product Type
  Product Code
  Market Sector 1
  Market Sector 2
  Market Sector 3
  Market Sector 4

Based on the rules for each of the fields the right fragment will be displayed when the message is composed. All the content and images should be captured via fragments for that channel, layout relating to that milestone, message type. The body fragment would be the one where the template will support additional rules.

For the document output format that is other than text, the content can be formatted (bold, italics, etc.), and the content author should be able to do it at data capturing time.

The content can contain variables that will be replaced at runtime, and the data capture should allow those variables to be placed within the content, preferably restricting to a predefined list of attribute names (as defined by the data dictionary) and enforcing the format. For example, In "Dear ${first_ name} ${last_name}", ${first_name} and ${last_name} are two placeholders for the two variables that to be placed with dynamic data at run-time. The dynamic fields are can be identified using special format, such as <$field_name>.

Content may also contain fixed sections or blocks of space that can be allocated for users to enter data in a "free format" fashion such a enabling the user to manually add a few lines of free-form text to an outbound template.

Dynamic attributes will be selected from a drop down within the body template and they will be confined to those variables predefined within the data dictionary. The values themselves can be added/updated/removed by an administrator within Teamsite/BDE since the file will be stored locally within the Teamsite branch.

In some embodiments, one or more of the following exemplary fields will be available based on the channel within the template:
  a. SMS
    Header Fragment:
      a. Header content text
    Body Fragment:
      a. Main SMS content text field
      b. Drop downs for dynamic attributes
    Footer fragment:
      a. content text
    Notes text field
  b. EMail
    Header Fragment:
      i. Top Header text;
      ii. Header Image include browse field;
      iii. Header Image URL text field;
    Quick Links Fragment:
      i. Optional Quick Link section, which includes Quick Link Heading text field, 1-4 set of a) Quick Link label text and, b) Quick Link URL for the corresponding label;
    Marketing Fragment:
      i. 0 to 2 Marketing Image section, which includes Marketing Image include browse field and optional image clickable URL text field;
    Body Fragment:
      i. Main Email content field;
    Footer Fragment:
      i. Email Footer content field—could be Visual Formatter field or a include browse field depending on the user selection;
      ii. Drop downs for dynamic attributes
      iii. Rules
    Comments text field;
  c. Secure EMail
    Header Fragment:
      a. Header content text;
    Body Fragment:
      a. Main SMS content text field;
    Footer Fragment:
      a. Footer content text or footer include browse field (to include a footer file);
      b. Drop downs for dynamic attributes;
      c. Rules
    Comments text field;
  d. Website
    Header Fragment:
      i. Header Image include browse field;
      ii. Header Image URL text field;
    Body Fragment:
      i. Main Email content field;
    Footer Fragment:
      i. Email Footer content field—could be Visual Formatter field or a include browse field depending on the user selection;
      ii. Drop downs for dynamic attributes
      iii. Rules
    Comments text field
  e. Letters & PDF
    Footer Fragment
    Header Fragment
    Body Fragments (Multiple, depending on the layout type chosen)
      i. Main Letter content
      ii. Drop downs for dynamic attributes
    Marketing Fragment
    Quick Links Fragment In some embodiments, it is the responsibility of the business to associate WebTrends tracking IDs along with the URLs present within the template.

In some embodiments, the ICCM Preview option implemented is not default Preview provided by TeamSite. ICCM provides customized preview functionality using Javascript/Form API and it will open new browser window for Preview. This preview will support any xml input file to be taken as input and apply the user entered content control file (xsl) to it, so XSL transformation will happen in the browser and corresponding output document should be displayed as the result of the Preview function. A few sample input xmls may be provided, which the user can customize or copy and change.

The ICCM Teamsite templates/Business Primary templates will generate the content control files that contains the user entered contents and specified images/footer include files in a format most appropriate for its presentation channel and its delivery application. For example, SMS content can be output as text only or EMail content will be output as text and/or HTML.

In the case for letter, Dialogue—tagged text—Tagged text is a proprietary format required by Dialogue. Except for the channel Dialogue Print/Letter, all content files generated through business primary templates are xsl content control files, which can be used by ICCM to produce the final communication document.

ICCM data capture templates/business primary templates and channel optimized templates will be designed and installed by HTS resources. After successful development and installation, the business user will have access to the set of Teamsite templates that will allow them to add and edit content, select and insert dynamic variables, to produce the content files, and finally, make deployments to various environments for validation and, as well as to PROD region for rollout.

As contents are created/edited/updated through the Teamsite templates/business primary templates, business users should work through their existing Teamsite/BDE approval process before the final deployment. Standard and recommended steps may include, for example:

The author/editor can deploy the document/communication to an IST, QA, or STG environment for verification.

Following a successful verification by an author/editor, the author/editor can submit the completed document for review by an approver prior to publishing to PROD. The editor can select the reviewer from a drop-down box and notify them via an email that an action is required on their part such as reviewing a document or communication so that it can be published to production.

Following review and approval by the appropriate approver, an email will go to the author notifying them that the document/communication has been approved or rejected.

ICCM application servers will operate in a regional deployment model, with full access to local or regionally deployed content. The configuration of the ICCM infrastructure (regional, local, etc.) has no bearing on the creation, manipulation, or deployment of the ICCM templates, the content and images within the templates, or their generated content, as long as the generated content is accessible to internal JAVA based applications and external internet users (customers and prospects) who will need to view the email images within the communication/document.

For each communication channel (SMS, eMail, web, Letter/Print) the generated content from an ICCM Teamsite content generating template (not the secondary template) could be deployed to a mid-tier web server that can be exposed via an HTTP call, accessed locally, or deployed to an alternate file system for replication onto a Dialogue server (zseries) for paper based fulfillment. The files will be deployed as .HTML, .TXT or other types that could be part of the content fragments. The files do not need to be compiled or deployed as EARs WARs TARs, etc. This may be called "hot" deployment since it is not part of a standard J2ee deployment package (standard servlet packaging constructs). Libraries will not be deployed that can be leveraged through the JSPs.

For Dialogue Print/Letter, tagged text contents will be generated, and they will be deployed to the content hosting server just like the content fragments for other channels. But a customized script will conduct concatenating of all content files into a single text file, and another script will transport the new file using scp command to mainframe using NDM process and rename it to the desire name for Dialogue. It will run periodically, probably as a daily job.

In some embodiments, unlike the rest of the channels, images will not be managed through BDE Teamsite, instead they will be managed by Dialogue directly.

ICCM templates can be created from a centralized HTS development area and installed into the entities local Teamsite/BDE implementations.

Each country will have their own branch and workflows defined for the ICCM template deployment process. The entity should be able to deploy to the same target location as where the entities 2G content goes (existing branches) with designated folder structures for ICCM contents and templates.

Figure 43:
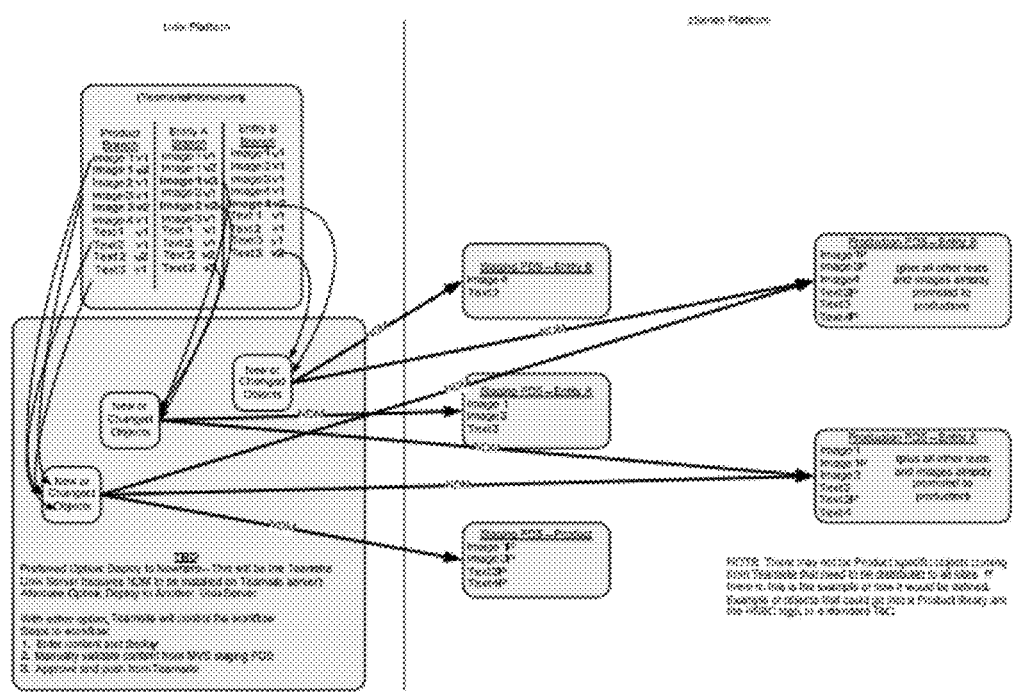
FIGS. 43 and 44 are exemplary diagrams of Dialogue and Teamsite integration, according to some embodiments of the invention.
Figure 44:
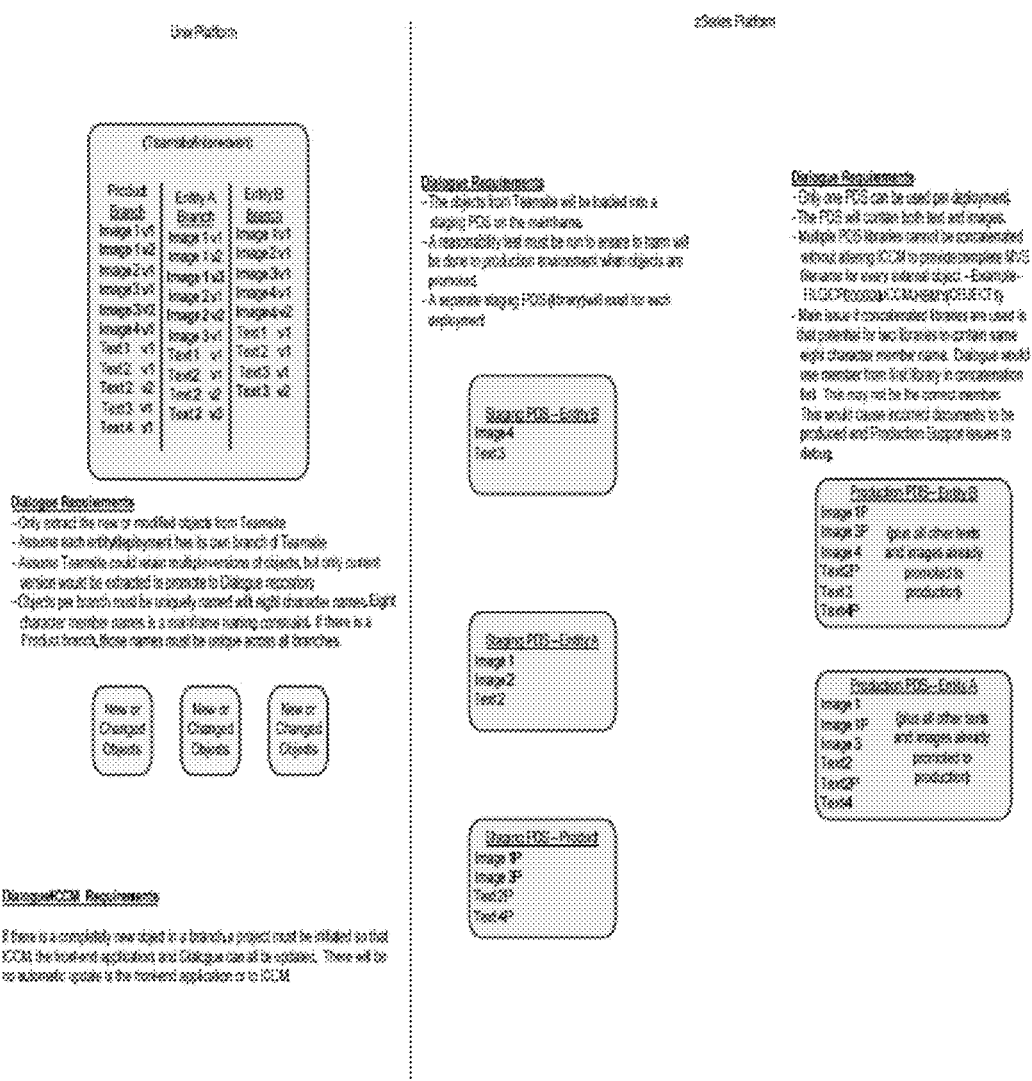
Figure 45:
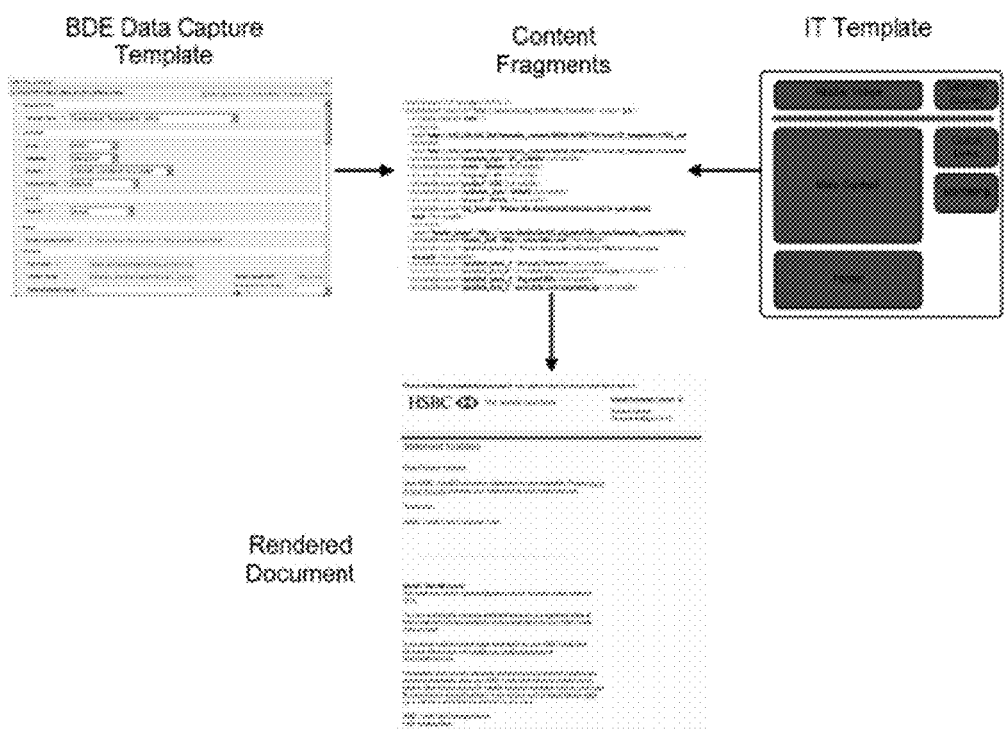
FIGS. 45-48 show schematics of run-time flow, according to various embodiments of the invention.

FIGS. 43 and 44 are exemplary diagrams of Dialogue and Teamsite integration, according to some embodiments of the invention.

Figure 46:
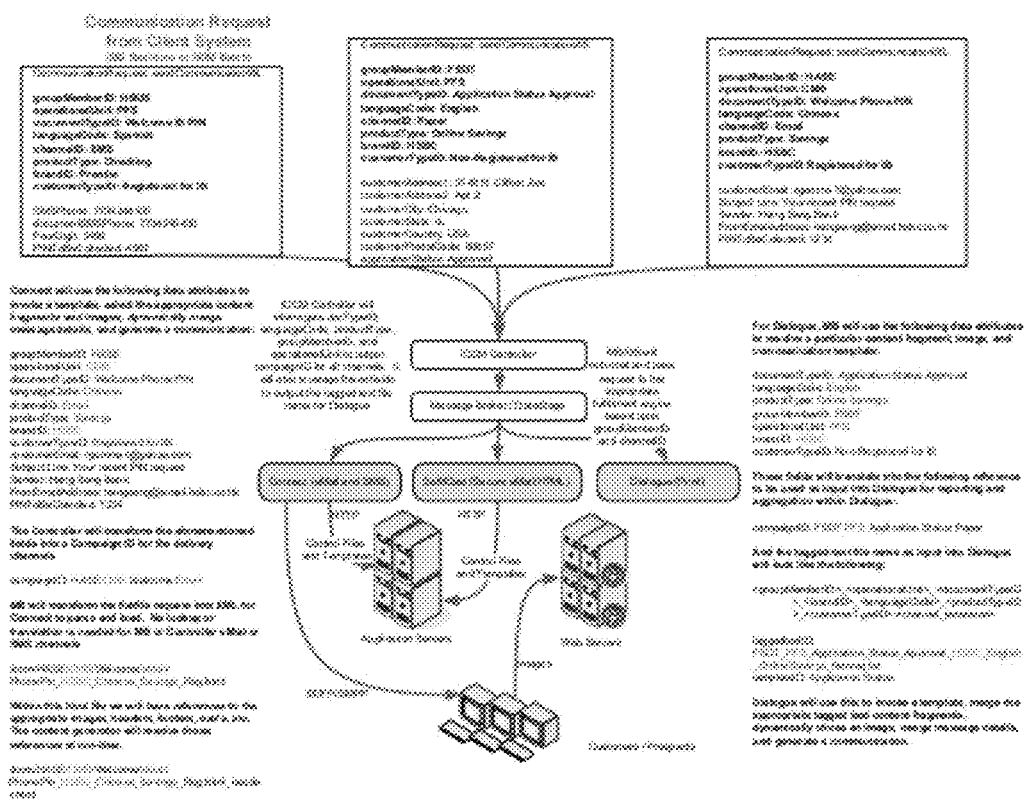
Figure 47:
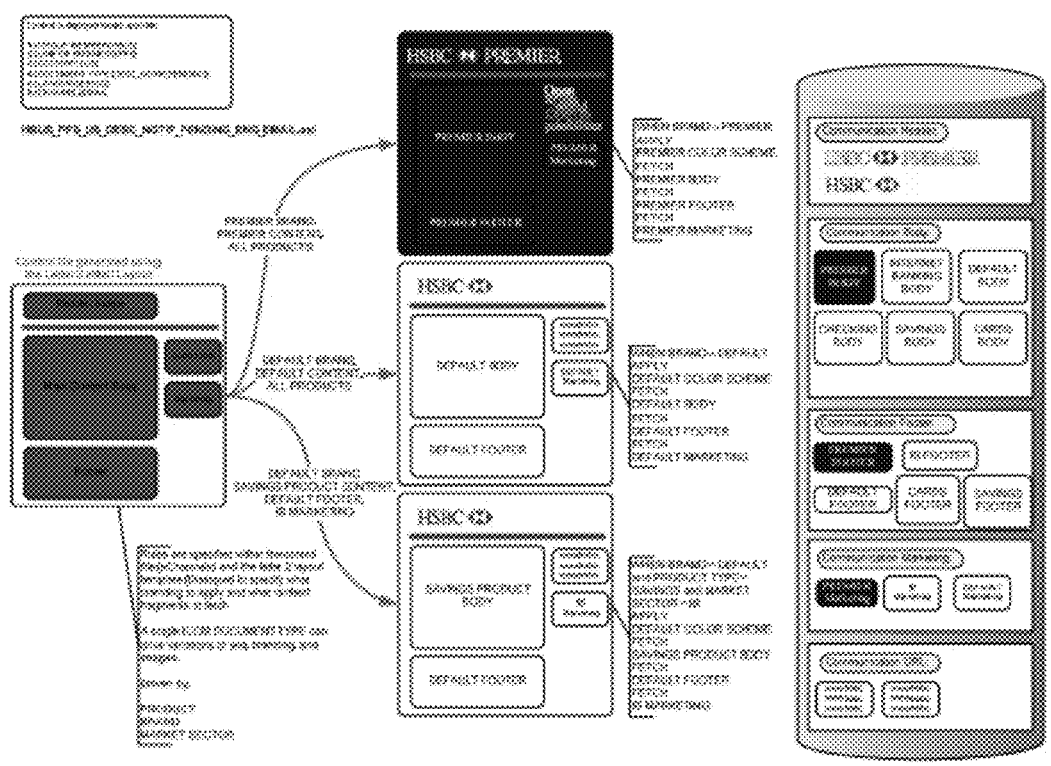
Figure 48:
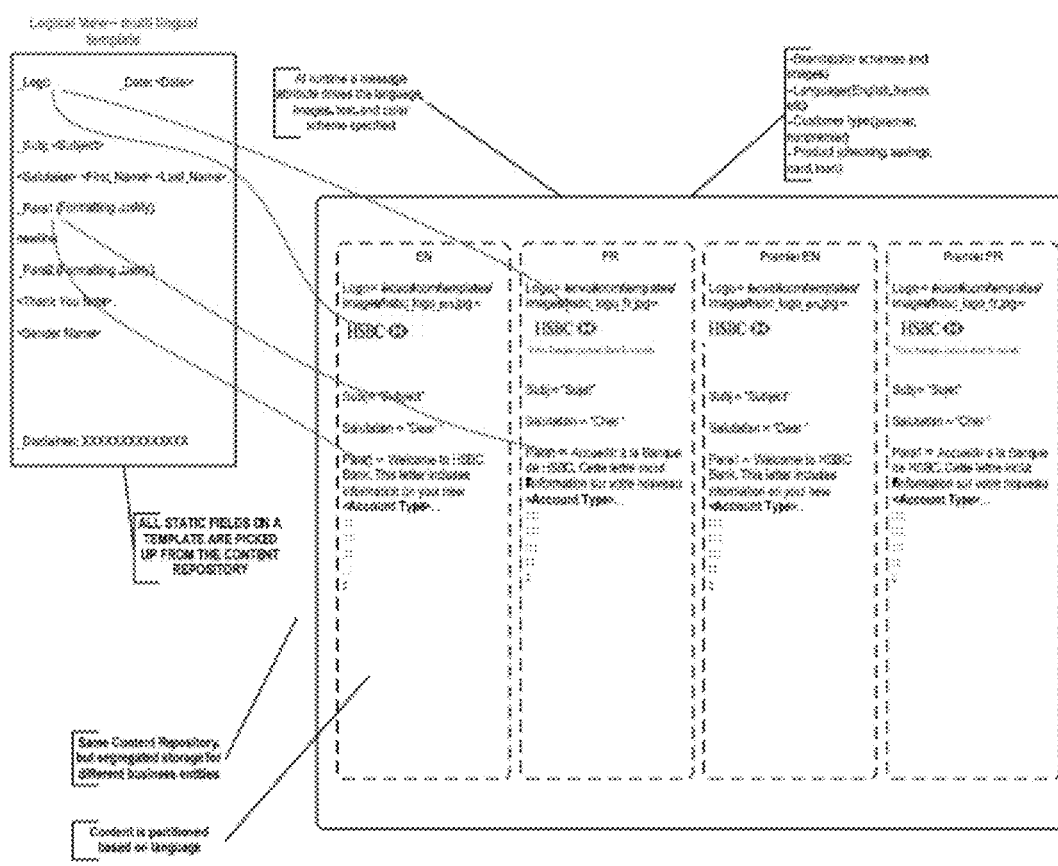

Run-time flow refers to the process by which ICCM receives client requests and instructs its internal functional components to fetch the contents and combine with the client request data to compose the complete communication document before sending it out to the customer. FIGS. 45-48 show various schematics of this process. FIG. 46 is an exemplary diagram of a Communication Request from a client system (MQ real time or NDM batch).

ICCM Front End application provides services for Front End applications to interface with ICCM. ICCM FE is offered as a separate component.

Figure 49:
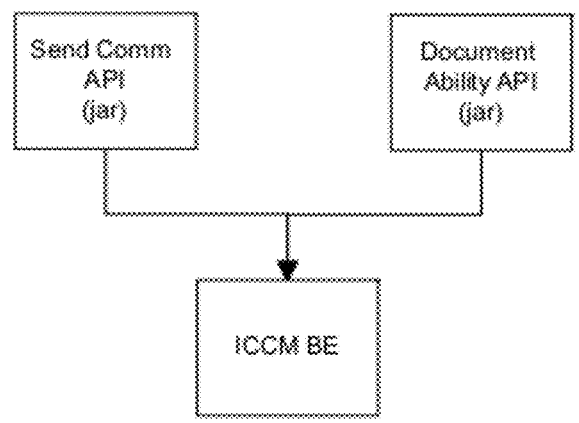
FIG. 49 is an exemplary diagram illustrating how the ICCM Front End may provide a Send Communication Service API and/or Document Ability Service API.

As shown, for example, in FIG. 49, in some embodiments, ICCM Front End provides a Send Communication Service API (this service will allow a Java application to send a communication via ICCM) and/or Document Ability Service API (this service will allow a Java application to check whether a certain doctype (document template ID) is available to be created and subsequently downloaded/printed).

Figure 50:
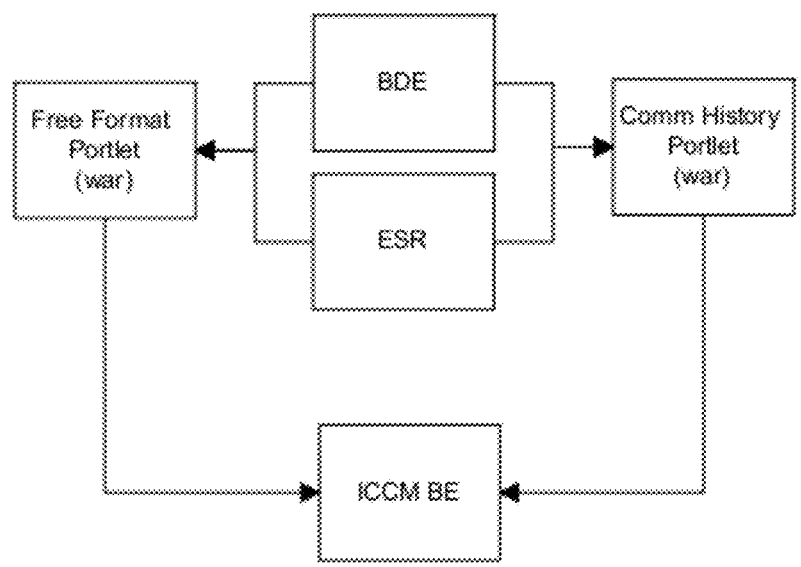
FIG. 50 is an exemplary diagram illustrating how ICCM may provide a Free Format Portlet and/or a Communication History Portlet.

As shown in FIG. 50, ICCM may also provide a Free Format Portlet (an application to send a free format message to a customer via email, mail or SMS) and/or a Communication History Portlet (allows the staff/customer to search a previously sent communication for review and resend to the same delivery channel). Both portlets preferably allow the label, text configuration through the BDE for NLS support. The doctype ID, and key defined by ICCM BE is stored in ESR for centralization.

ICCM Batch Process should be able to receive outbound customer communication requests from the various business processes of Group, generate/retrieve necessary documents/messages, and deliver them to different communication channels as requested. Communication may be requested by, for example, a Business process such as Account Opening, a Staff user, and/or a Customer user. Requested documents may be new and have to be produced, or existing and have to be retrieved from storage and, if necessary, resent.

Figure 51:
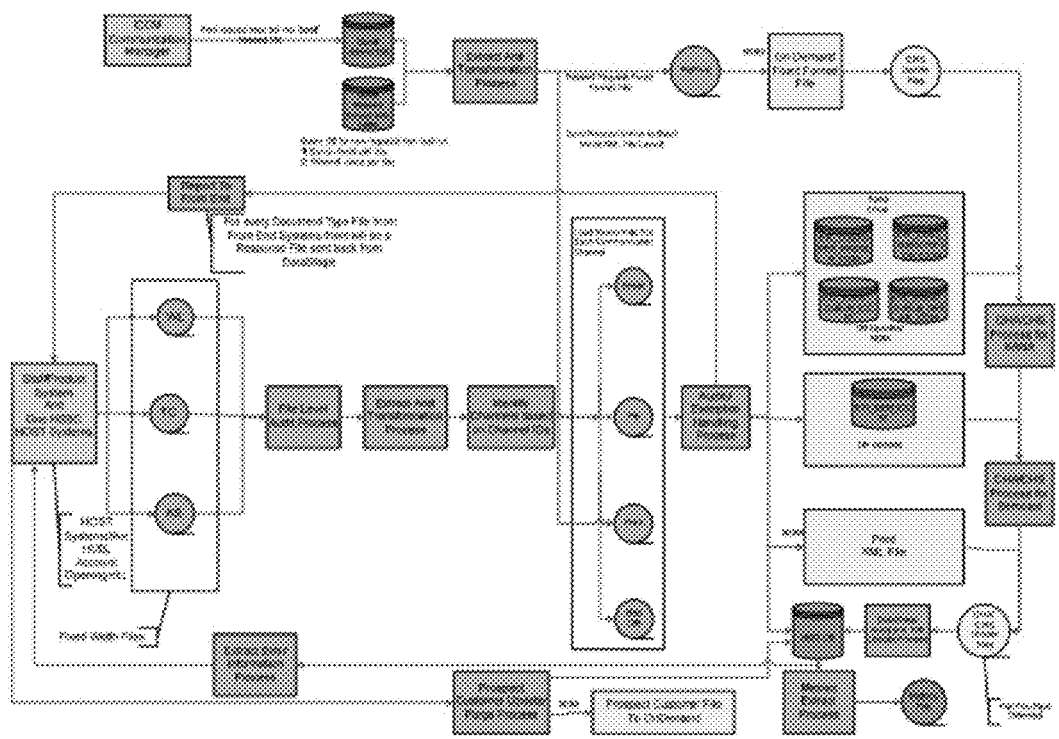
FIG. 51 shows an exemplary high level architecture diagram for DataStage.

In some embodiments, DataStage will receive various files in batch mode and create the required output for various communication channels, Hist DB, calling Systems and BI. FIG. 51 shows an exemplary high level architecture diagram for DataStage.

Figure 52:
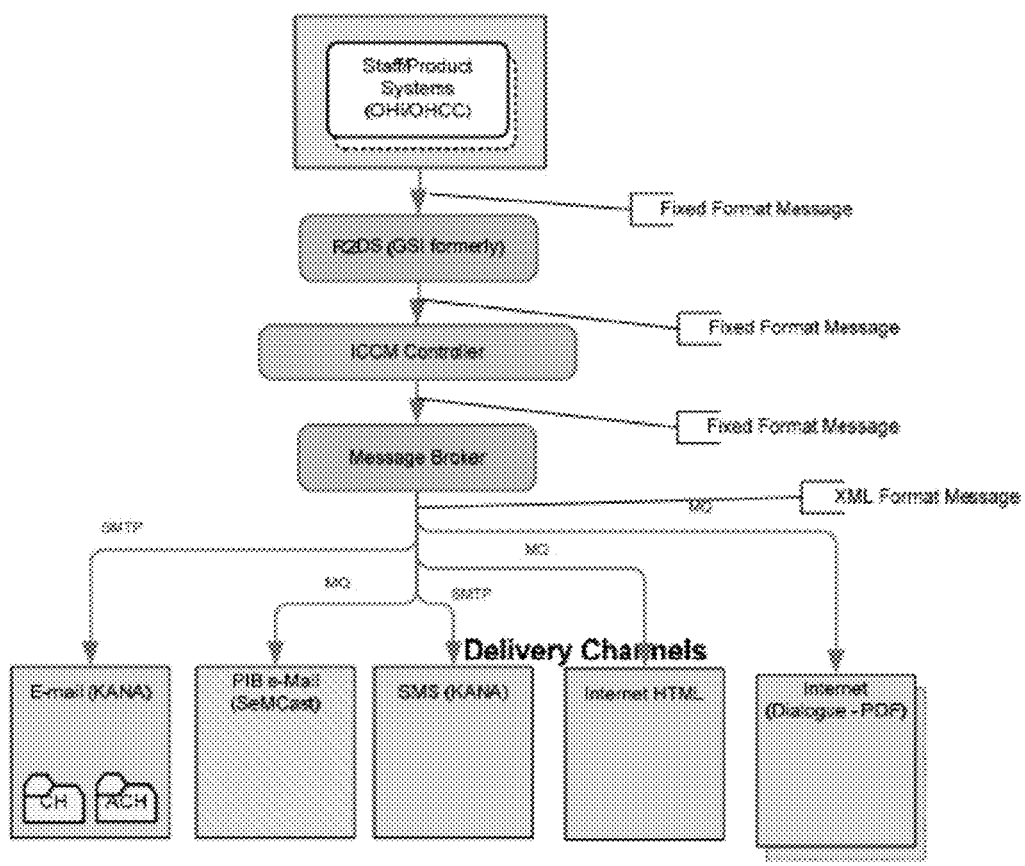
FIG. 52 is an exemplary diagram of how EAI may be used for integration between calling applications to ICCM real-time controller and ICCM controller to delivery channels, according to some embodiments.
Figure 53:
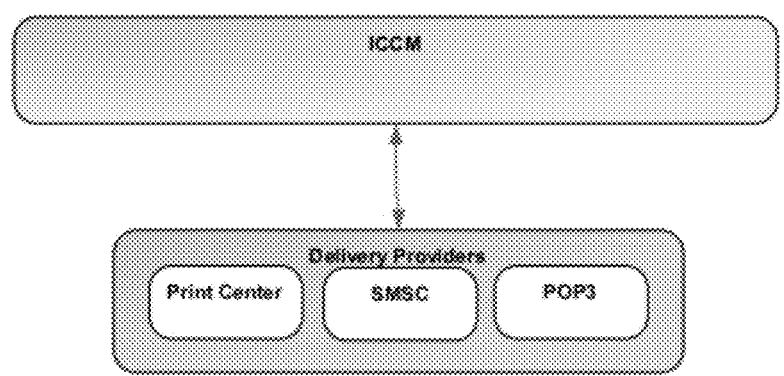
FIG. 53 is an exemplary diagram of how ICCM delivery channels may use third party vendors for delivering communications.

In some embodiments, EAI will be used for integration between calling applications to ICCM real-time controller and ICCM controller to delivery channels. As shown, for example, in FIG. 52, calling applications making real-time requests will use R2DS (formerly GSI) component of EAI to interface with ICCM. ICCM will use Websphere Message Broker to interface with delivery channels. Message broker will be responsible for one or more of the following:

message transformation (from fixed width to XML)
    message routing to the correct delivery channel
    protocol handling—in some embodiments, delivery channels have different integration interfaces, e.g., SeMCast uses MQ, Kana uses SMTP and Dialogue uses MQ In some embodiments, ICCM delivery channels will use third party vendors for delivering communications out to the users. The third party vendors are depicted in the diagram in FIG. 53 and described in Table 5. The integration of delivery channels to third party systems should be a regional effort.

TABLE 5

| Logical Component | Description |
|---|---|
| Print Centre | Local Print service provider |
| SMSC | SMS delivery provider |
| POP3 | eMail Delivery |

In some embodiments, ICCM is a service provider to other systems within AO. The systems may include, for example, HUB, Cards, APe and AO Front End. In some embodiments, one or more of the following four areas are places where requests need to be authenticated and data needs to be secured.

(1) Calling application interfacing with ICCM and ICCM interfacing with other systems—As an internal service provider ICCM assumes that the calling application, upstream of ICCM, will authenticate and authorize a user performing an operation. For the real-time world an interface level authentication will be setup to ensure integrity of data. For the batch scenario a similar mechanism may be used for transferring data through Connect Direct.

(2) Staff authoring content for communications: ICCM also provides ability for staff users to manipulate static content that goes on various communications. The authentication and entitlements will be achieved through Teamsite (see, e.g., description and figures for Template and Content Management).

(3) PIN eMail and SMS request through ICCM (uses netHSM): PIN communications require special handling as security requirements dictate that PIN should not be sent in a non-encrypted format between systems and the PIN should not be stored during the process of sending a communication.

For this purpose the PIN will be encrypted using RSA before sending to ICCM. ICCM controller will not decrypt the PIN and will pass it through to the delivery channel (KANA Connect), in an encrypted format. Kana will decrypt the PIN, right before composition of communication, by calling a crypto provider class. The crypto provider class will retrieve the private key, for decryption, from netHSM. netHSM Java API will be used to access the private key.

(4) Delivery channels interfacing with external third party vendors: Interface to third party vendors (like print centers, SMSC, etc.) is a local implementation. Usually the interface to third party vendors is over a secure channel like VPN using authentication and encryption during transfer of data. Commonly Connect Direct secure transfer is used.

Figure 54:
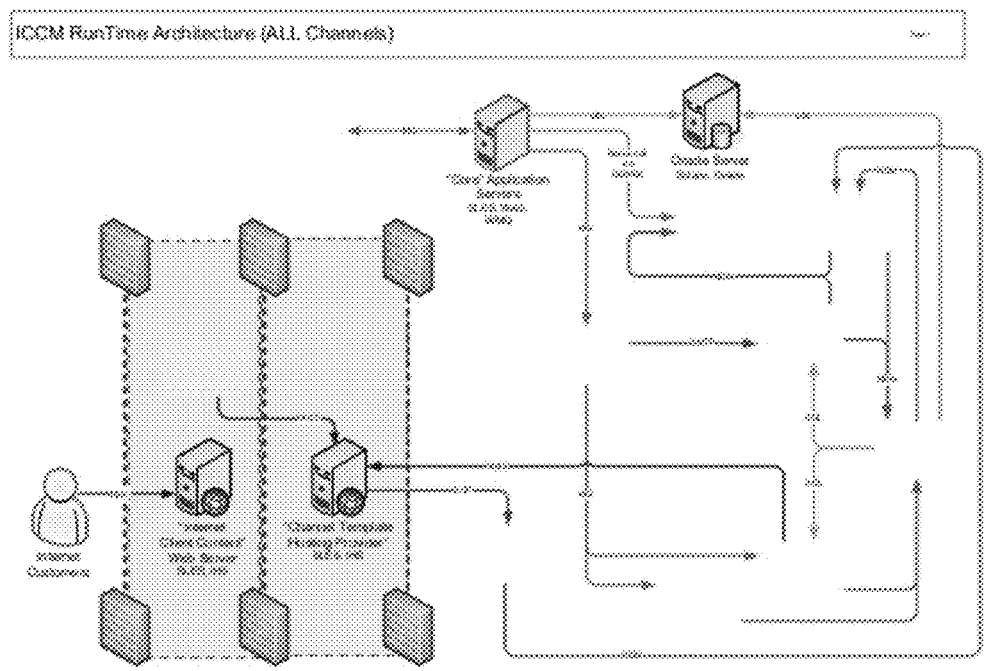
FIG. 54 shows an exemplary conceptual operational architecture for ICCM, according to some embodiments.

FIG. 54 shows an exemplary conceptual operational architecture for ICCM, according to some embodiments.

Table 6 lists various monitoring alerts and recover resilience information for ICCM components.

TABLE 6

| S. No. | Component | Monitoring | Recovery and Resilience |
|---|---|---|---|
| 1 | OnDemand | IBM CMOD - DB2 - Monitoring using Omegamon<br>IBM CMOD - Started tasks for OAM, Server, etc - OPS/MVS monitoring tied to global service desk (failure tickets)<br>OnDemand - batch components (batch archival, resend, etc) - Scheduler (CA7/TWS) tied to global service desk (failure tickets)<br>(batch archival, resend, etc) | IBM CMOD - 24/7 availability with fail over/GSS Sysplex environment |
| 2 | Dialogue | OPS support watches the CA7 scheduling, looking for abends. If a Dialogue engine job fails, Production support is notified. | Clustered environment with fail over/GSS Sysplex environment |
| 3 | Kana Connect | Intranet Server: BMC Patrol/Neitutive Monitoring | Intranet Server: Clustered environment for 24 × 7 availability |
|  |  | DMZ Servers: BMC Patrol/Neitutive Monitoring | DMZ Servers: Clustered environment for 24 × 7 availability |
|  |  | DB Servers: BMC Patrol Oracle KM | DB Servers: Clustered environment for 24 × 7 availability |
| 4 | SeMCast | App Server - BMC Patrol/Neitutive Monitoring | App Server - Clustered environment for 24 × 7 availability |
|  |  | MQ Server - Tivoli Omegamon for Messaging | MQ Server - Clustered environment for 24 × 7 availability |
|  |  | DB Server - BMC Patrol Oracle KM | DB Server - Clustered environment for 24 × 7 availability |
| 5 | Datastage | BMC Patrol | Will be defined as part of the GS definition |

TABLE 6-continued

| S. No. | Component | Monitoring | Recovery and Resilience |
|---|---|---|---|
| 6 | Message Broker | BMC Patrol | Clustered environment for 24 × 7 availability |
| 7 | ICCM Controller | Standard WAS 6.1 Superstack monitoring and alerting tools will be used | Clustered environment for 24 × 7 availability |

As shown, for example, in Table 7, ICCM in general does not retry sending of communications automatically. For real-time if a communication fails then an exception is sent back to the calling system and the transaction is terminated. In case of batch the batch is failed and report is sent back to the calling application.

If a communication has been delivered by ICCM to a delivery channel then the delivery channel may retry sending communication on their own based on the type of failure and the configuration controlling the number of retries within the channel. In some embodiments, Kana Connect is the only channel supporting retry all other channels fail the transaction and no retry is performed.

TABLE 7

| S. No. | Component | Retry |
|---|---|---|
| 1 | Dialogue | No Retry |
| 2 | Kana Connect | Retry is performed base don the type of error (e.g. soft bounces are retried and hard bounces are failed). The number of retries and the interval duration is configured at the product level and can be controlled per campaign. |
| 3 | SeMCast | No Retries |
| 7 | ICCM Controller | No Retries |

Regarding performance benchmarks, for some embodiments, it has been determined with the business that an average of three communications per account opened will be sent and an average of two communications will be sent for every customer created. Based on an average of three communications, exemplary performance figures for ICCM can be illustrated as shown Table 8.

TABLE 8

| Based on PFS volumes | | AO | | | | ICCM (Based on 3 communications per account opened and 2 communications per customer opened) | | |
|---|---|---|---|---|---|---|---|---|
| | | Now | 1H2010 | 1H2011 | 1H2012 | 1H2010 | 1H2011 | 1H2012 |
| Average Account Opened (per day) | | 5,851 | 6,525 | 6,851 | 7,193 | 17553 | 19575 | 20553 |
| | Demand Deposit | 2,272 | 2,386 | 2,505 | 2,630 | 6816 | 7158 | 7515 |
| | Debit Card | 2,172 | 2,281 | 2,395 | 2,514 | 6516 | 6843 | 7185 |
| | Credit Card | 1,453 | 1,526 | 1,602 | 1,682 | 4359 | 4578 | 4806 |
| | Term Deposit | 317 | 333 | 349 | 367 | 951 | 999 | 1047 |
| Average Customer Created (per day) | | 2,291 | 2,406 | 2,526 | 2,652 | 4582 | 4812 | 5052 |
| Peak Account Opened (per day) | | 14,678 | 15,412 | 16,182 | 16,992 | 44034 | 46236 | 48546 |
| | Demand Deposit | 4,383 | 4,602 | 4,832 | 5,074 | 13149 | 13806 | 14496 |
| | Debit Card | 8,347 | 8,764 | 9,203 | 9,663 | 25041 | 26292 | 27609 |
| | Credit Card | 6,633 | 6,965 | 7,313 | 7,679 | 19899 | 20895 | 21939 |
| | Term Deposit | 809 | 849 | 892 | 937 | 2427 | 2547 | 2676 |
| Peak Customer Created (per day) | | 6,747 | 7,084 | 7,439 | 7,810 | 13494 | 14168 | 14878 |
| Peak Period | | 7 | hours | | | | | |
| 1.1.1 Concurrency Peaks | | | | | | | | |
| Concurrency Peaks | | | | | | | | |
| User Requests to open anaccount | | Max | | | | | | |
| Demand Deposit; New To Bank Customer | | 3.8 | /min | | | 6/min | | |
| Demand Deposit; Existing Customers | | 3.8 | /min | | | 6/min | | |
| Transfer Funds to DD Account | | 4.6 | /min | | | 6/min | | |
| Credit Card; New To Bank Customer | | 5.8 | /min | | | 6/min | | |
| Credit Card; Existing Customer | | 5.8 | /min | | | 6/min | | |
| Balance Transfer to Card Account | | 9.3 | /min | | | 9.3/min | | |

The ICCM components have capabilities to handle much higher volumes. This is evident in other solutions using similar tools. For example, Dialogue produces, for example, 20 million statements per month for CRS. Kana handles, for example, 60 million messages a month in the US.

Table 9 lists exemplary environments that are built for the core product, their usage and scope.

TABLE 9

| Name | Function | Scope | Comments |
| --- | --- | --- | --- |
| DEV-INT - Dev Integration | To Unit test ICCM core functionality and to support Dev environments for | This environment will be used by the development team to deploy and test the code. | Deployment of code drops to this environment is per schedule of the development teams and the environment can be used for adhoc deployments for fixing and testing of code. This environment is for integration testing and will not have resiliency and recovery tools in place. This single installation of ICCM will service all DEV-INT regions for calling applications |
| SIT - System Integration Testing | The purpose of the environment is to support System Integration Testing for various sub-systems. The environment will be used by technology team to test various functions for delivery to the SAT environment. | This environment is meant for cross team testing and helps in testing integration of AO components working together. | Deployments to this environment are controlled through a fixed schedule. Deployments outside of the scheduled deployments are controlled through a change control process. Fixes are promoted to the environment only after they have been tested in Dev-Int env. This environment is for integration testing and will not have resiliency and recovery tools in place. |
| SAT - System Acceptance Testing | Systems Acceptance Testing environment used by the testing team | This environment if for TCoE team and supports the purpose of validating and certifying the functionality of the solution | Deployments to this environment are also controlled as per schedule and fixes need to be tested in De-In and SIT before being promoted to this environment |
| Performance Testing | Serves the purpose of supporting performance testing of applications | Used by GPCoE to validate performance of various components. | Being defined currently |

Figure 55:
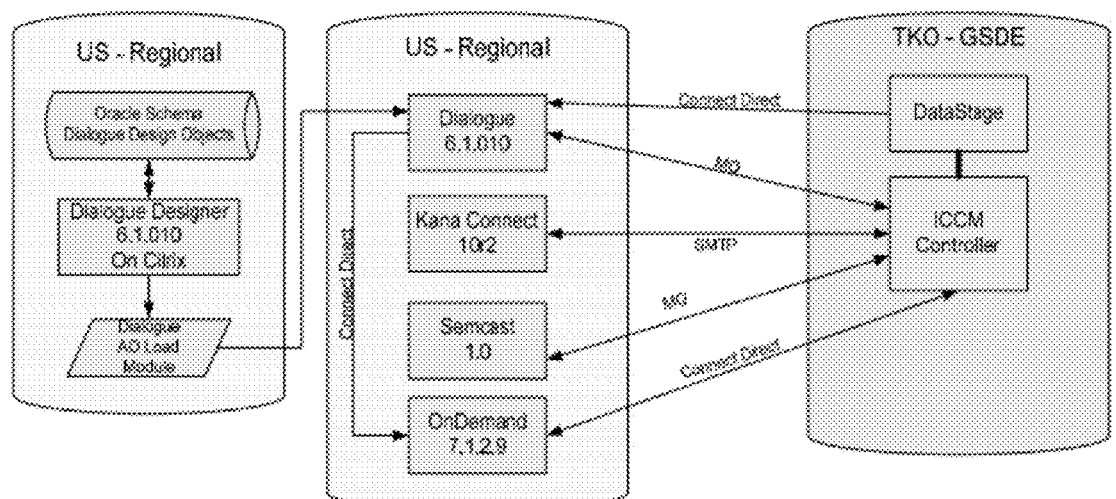
FIG. 55 depicts the ITO setup for SIT environment, according to some embodiments.

FIG. 55 depicts the ITO setup for SIT environment, according to some embodiments.

Figure 56:
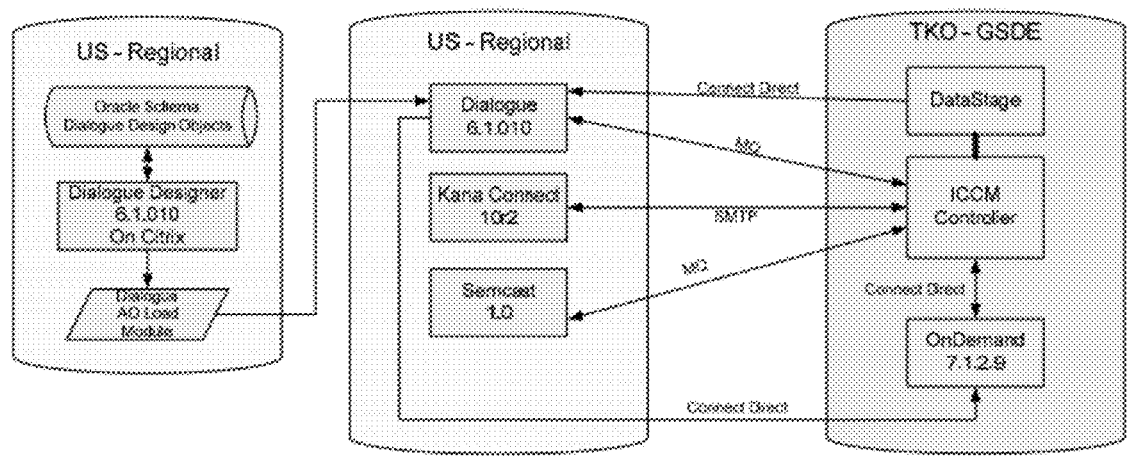
FIG. 56 depicts the ICCM SAT environment with Goldstacks for OnDemand and DataStage.

FIG. 56 depicts the ICCM SAT environment with Goldstacks for OnDemand and Datastage.

Table 10 lists configuration items, according to some embodiments.

TABLE 10

| S. No. | Component | Configuration Items |
| --- | --- | --- |
| 1 | OnDemand | Indexing parameters |
| | | Life cycle management of documents |
| | | Folder configurations |
| | | Single stream/multiple stream archival |
| | | Batch/JES archival |
| | | Cover letter selection per request or per bundle |
| | | Server connections and Search key configuration |
| 2 | Dialogue | Rules for content selection and for logo selection |
| | | Printer requirements such as barcoding, output queue segmentation, and inserting |
| | | Paper size and output media (AFP, PostScript, etc.) |
| | | Job and proc changes to incorporate assigned high-level qualifiers and naming conventions |
| 3 | Kana Connect | Campaign Name |
| | | Subject |
| | | Email address |
| | | Input Message/ExternalXML |

TABLE 10-continued

| S. No. | Component | Configuration Items |
| --- | --- | --- |
| | | Message Template |
| | | Message Content |

TABLE 10-continued

| S. No. | Component | Configuration Items |
| --- | --- | --- |
| | | Priority Message |
| | | DB Config |
| 4 | SeMCast | MQ Config |
| | | Decision Config for destination MQ |
| | | Template Config for pib email and internet html |
| | | DB configuration |
| | | Content Server Config |
| 6 | Message Broker | Deploy message flows |
| | | MQ configs |
| 7 | ICCM Controller | Priority message config |
| | | MQ configs |
| | | Alternate template ID config |

Figure 57:
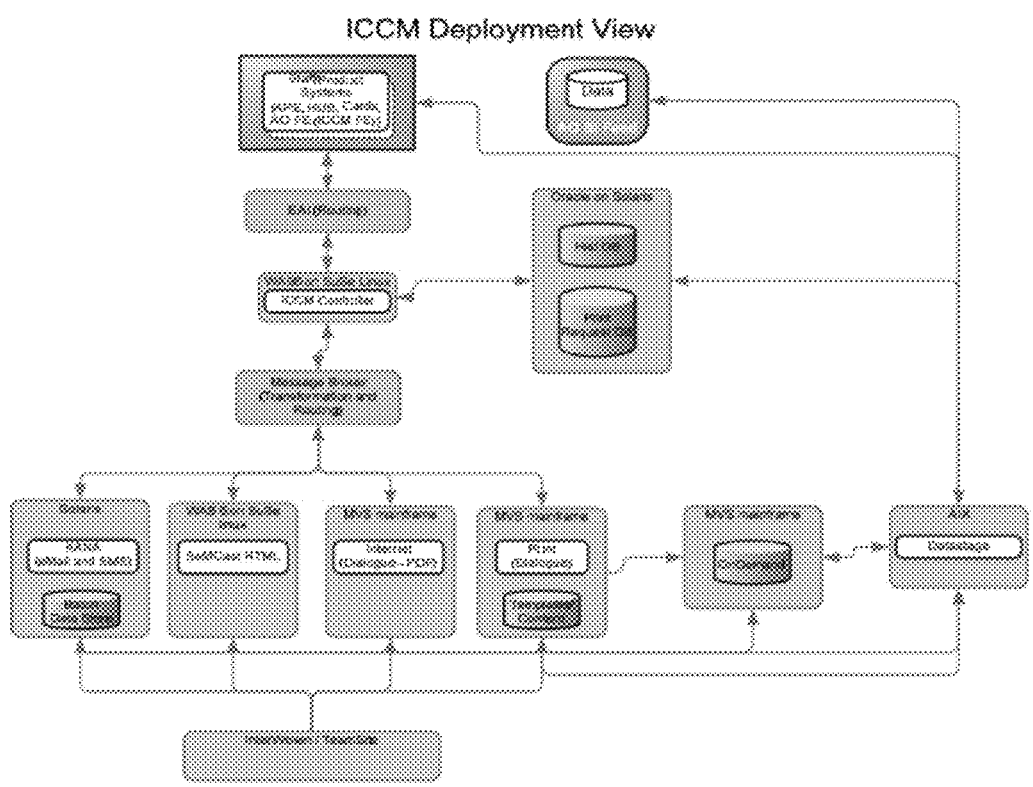
FIG. 57 illustrates an exemplary logical deployment view of ICCM, according to some embodiments.

FIG. 57 illustrates an exemplary logical deployment view of ICCM, according to some embodiments.

Table 11 describes ICCM Configuration Management, according to some embodiments.

TABLE 11

| ICCM Configuration | Description |
| --- | --- |
| Document Content & Templates (may need IT support for defining Templates) | The ICCM (Integrated Customer Communications Module) solution allows business users to send both communications and documents to customers and prospects via multiple delivery channels encapsulating eMail, SMS, Secure eMail, Websites, and Paper (with other channels to be added at later releases).<br>As a result of the need to deliver a communication or document to a customer via the aforementioned channels, the ICCM fulfilment engine will interface with a Group standard content management application so that it can fetch the appropriate channel template, generate personalized, channel optimized content, and distribute the message onto the customer/prospect as required by the business.<br>Within the content management application (BDE/Teamsite), HTS will develop a set of document capture templates that will allow the business users to manage assets (text, images, dynamic data, content fragments) used for their communications. These templates will not allow the users to control the layout or apply conditional logic; however these features may be added at a later date.<br>The Teamsite templates will be designed to collect multi-channel data in a centralized fashion and output content fragments in the form of content control files, or tagged text. |
| Document Types | ICCM enables businesses and regions to define specific Document Types. For ICCM Document Types will have to be configured in BDE (Templates) and will need IT support. Each document types can also be further specified if it is to be archived or not. This allows the resend of the previously sent communication in the same channel. |
| Communication Priority Settings based on Document Types | ICCM Provides the ability to treat transmission of certain document types on priority. This is supported only in real time mode. Businesses in various regions can determine their own priority document types. Configuration will need IT support. |
| Document retention period in OnDemand (configured with IT support) | Document retention period will need to be configured in onDemand based on regional requirements. This will be an IT controlled configuration and will be configured within OnDemand jobs for data clean-up. The retention period will also be configured for maintaining documents on DASD or Tape. |
| Document archival (IT controlled configuration) | Configuration setting to enable archival of certain types of documents within OnDemand. This will be IT controlled configuration and will be governed on the basis of regional requirements. |

In some embodiments, ICCM maintains a history of the communications that it has processed and also archive composed documents for resend. For this purpose, ICCM maintains a Communications history database where all communications through ICCM are recorded. In some embodiments, for archival of composed documents, a commercially available archival application, such as OnDemand, is used.

In some embodiments, ICCM provides a single standard interface for sending out communications through various channels. As part of this ICCM accepts the incoming messages in standard OH format that is a fixed format message. The delivery channels of ICCM may require the data to be formatted to suit the channel needs. In some embodiments, this format is XML. Additionally delivery channels may not accept the incoming data to have the NLS fields encoded (NLS fields are Base64 encoded as per OH messaging strategy). In such cases, the NLS data should be decoded before being sent to the delivery channels. In some embodiments, ICCM uses Messages Broker in real-time and Datastage in batch mode to perform these operations.

Additionally, there are certain rules where the incoming data might be a code and needs to be converted to appropriate text to go on the composed document. This may be performed at each of the delivery channels. The code to text translation for eMessaging (Kana and SeMCast) channels is stored within the BDE. For Dialogue this is stored within the Dialogue PUB file.

In some embodiments, ICCM uses OH messaging strategy to define messages for applications calling ICCM. ICCM will use fixed format messages from calling applications to ICCM. Messages between ICCM and delivery channels will be XML based. ICCM will transform the messages from Fixed Format to XML for consumption by the delivery channels. The message format may be the same for both batch and real-time. ESA process is followed for both service and message modeling.

Table 12 lists some exemplary messages that may be provided by ICCM.

TABLE 12

| S. No. | Message List | Description |
| --- | --- | --- |
| 1 | RSENDCOMN | Message for resending a communication |
| 2 | RTRVARCHDOC | Message to retrieve a document from OnDemand |
| 3 | SENDCOMNWL | Send Welcome Letter |
| 4 | SENDCOMNTC | Send Terms and Condition |
| 5 | SENDCOMNAS | Send Application Status |
| 6 | SENDCOMNFF | Send Free Format Communication |
| 7 | CREATCOMNWL | Create a PDF or HTML version of welcome letter |
| 8 | CREATCOMNTC | Create a PDF or HTML version of Terms and Conditions |
| 9 | CREATCOMNAS | Create a PDF or HTML version of Application Status |
| 10 | UPDTCOMNHIST | Update status in communication history |
| 11 | SRCHCOMNHISTSUM | Search Communication history |
| 12 | RTRVCOMNHISTDTL | Retrieve history details |

In some embodiments, the ICCM message may have a structure as shown in Table 13.

TABLE 13

| Standard FF Meta Data | Core FF Data | Local Field with Predefined Blocks |
| --- | --- | --- |

Standard Fixed Format (FF) Meta Data will generally contain all the data necessary to perform the communication such as destination address, DocumentTypeID, etc. Whatever is internal to ICCM for request processing is generally part of metadata. For example, an RQSTHDR segment holds fields such as Channel Identifier, frontEndId, groupMember, etc.

The Core FF Data area may contain the document data used for communication that is deemed to be part of the core product for a given document type. It holds the fields which are part of customer communications. For example, for AS Communication Information, mentioned fields are part of Core FF Data—fundingAmount, dateOfSweep, fundingExchangeRate, etc.

Local Field with Predefined Blocks may have sub blocks of different data types to serve regional/local fields. Local fields are the placeholders which are specific to region, and subcategorized to different logical section based on the data types, for example, NLSSupported Fields, non NLS fields, Date, Time, Amount, etc.

In some embodiments, the envelope for message transfer will be the standard ISM 1.2. This will apply both to message interface between calling applications to ICCM and ICCM to Delivery Channels. The NLS fields between calling applications to ICCM will be Base64 encoded UTF-8 data. The NLS fields between ICCM to Delivery channels will be UTF-8.

Figure 58:
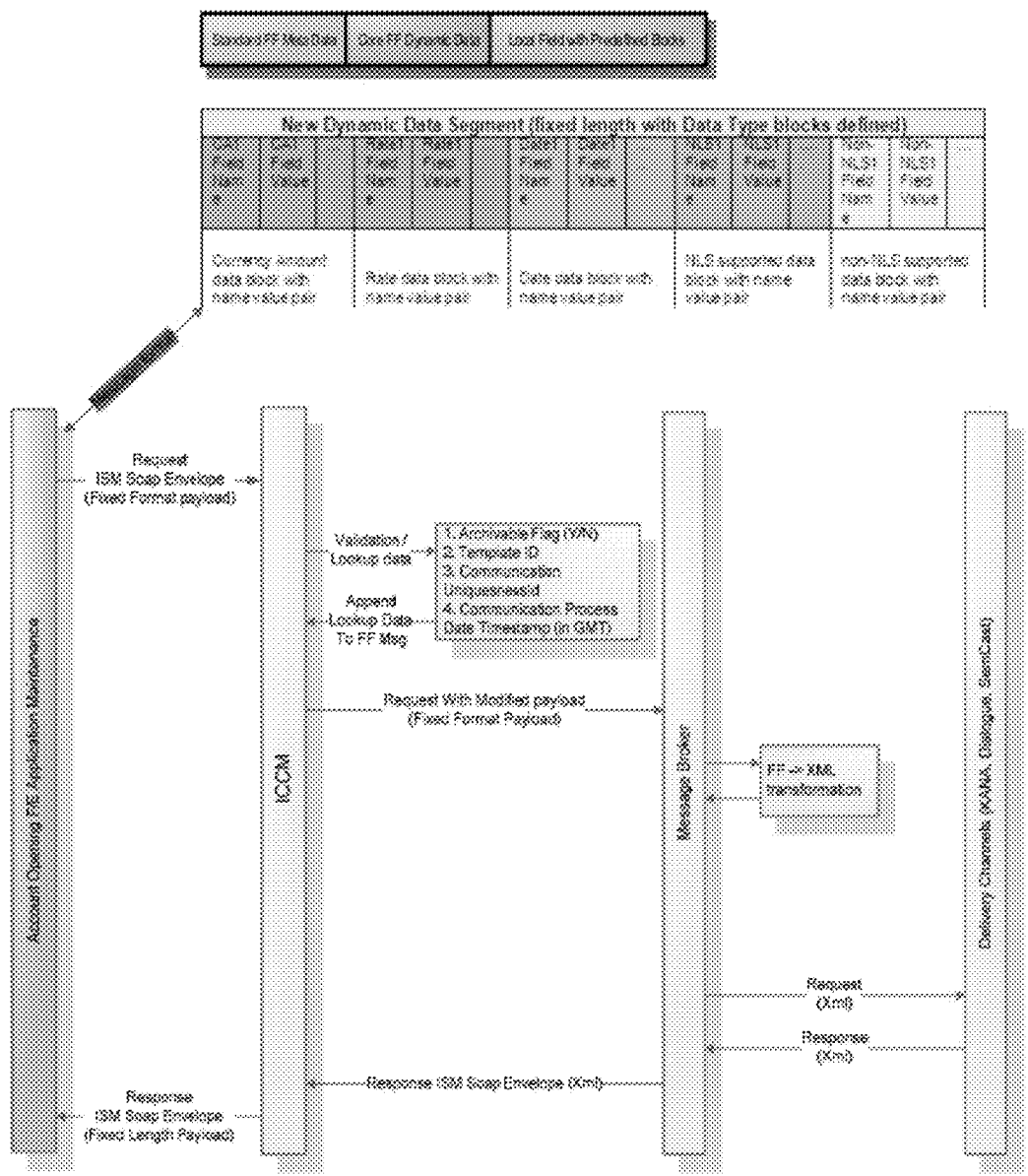
FIG. 58 shows an exemplary diagram of the process of transforming incoming requests from Fixed Format to XML.
Figure 59:
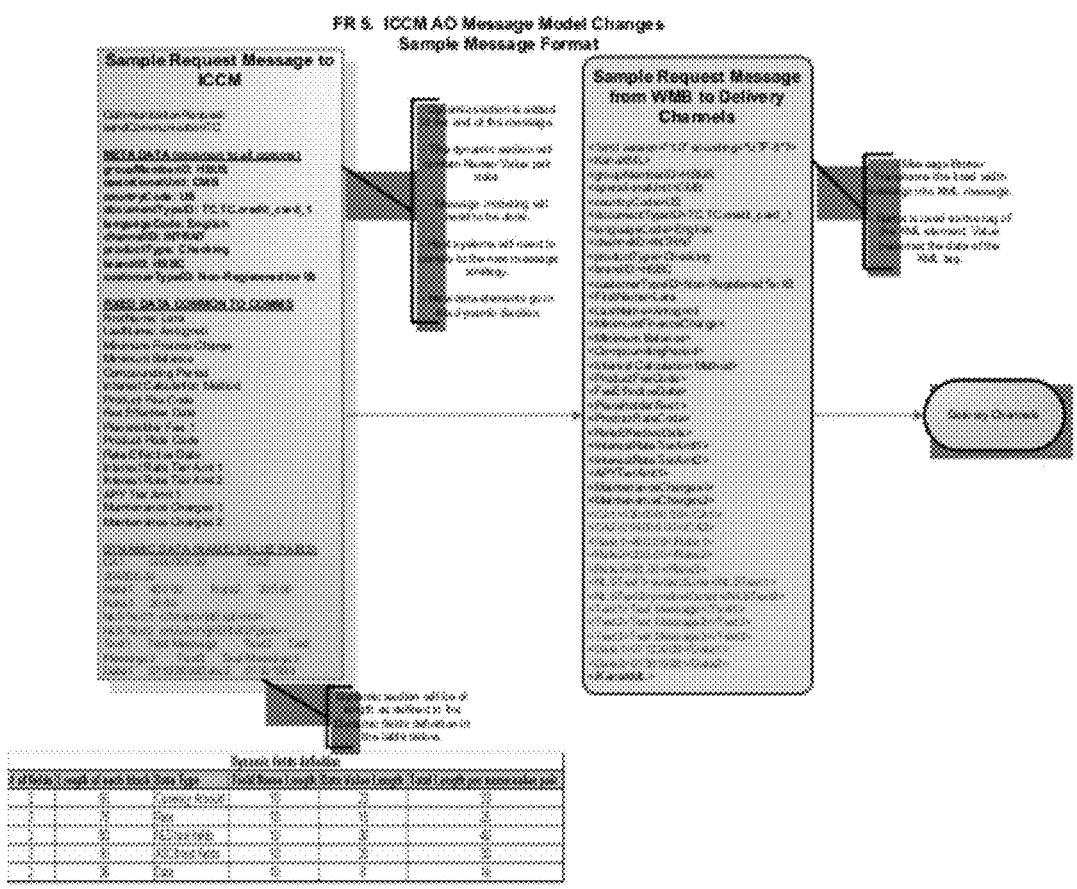
FIG. 59 depicts the transformation of an incoming request from Fixed Format to XML, according to some embodiments.

In some embodiments, ICCM accepts the incoming requests in Fixed Format and the delivery channels require XML as input. FIG. 58 describes the transformation process. FIG. 59 depicts the transformation of the message. The transformation may be performed, for example, in Message Broker for real-time and within Datastage for batch.

Overall, ICCM provides a variety of core functions including:

Design
    A set of tools and automated processes to enable IT and business users to deswign visual aspects of a communication Compose
    A run time function that merges raw communication data with the communication design to create the eventual communication Deliver
    Transmission of composed communication using a variety of communication channels Store
    Archival of the delivered communication and a set of functions to view and manage the communication Retrieve
    Retrieval of communication for display on staff and customer channels In various embodiments, ICCM supports a variety of communication processing modes, including:

On Demand Delivery
    Communication is generated and delivered in real time, as an automated step in a business process or an explicit request from a staff user Scheduled Delivery
    Communication is generated and delivered in bulk as part of scheduled offline business processes Deferred Delivery
    When a request for On Demand cannot be immediately processed due to inherent delivery channel limitations, business policies or local regulations, it may be queued for scheduled processing at a compliant time Online Management
    User Journeys for staff and customers to manage communications using the distribution channels A duration/tolerance can be specified for the modes (e.g., "real time" may not necessarily signify instantaneous, but can mean "within the next x minutes maximum").

Figure 60:
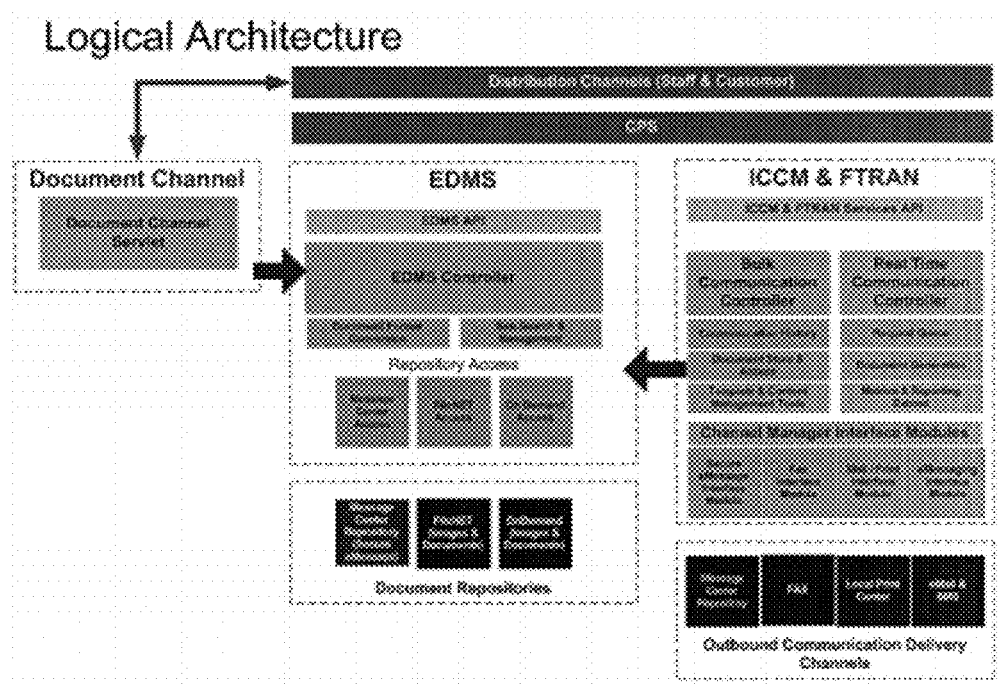
FIG. 60 shows an exemplary diagram of the logical architecture for ICCM and related components, according to some embodiments.

In some embodiments, ICCM and related components may include one or more of the components listed in Table 14. FIG. 60 shows an exemplary diagram of the logical architecture for these components, according to some embodiments.

TABLE 14

| | | | | |
|---|---|---|---|---|
| ICCM | Utilities to design, compose, deliver and record customer communications over multiple channels | X X X | | |
| FTRAN | A file transformation utility to transform structured data from distribution channels to a variety of document formats | X | | |
| EDMS | Document Archival, Search and Retrieval Services | | X | X |
| Message Centre | Fulfillment/Storage for Customer Secure eMessages | X | | |
| Document Channel | An Alternate document retrieval channel for large files | | | X |

Table 15 lists some exemplary ICCM use cases.

TABLE 15

| | | | | |
|---|---|---|---|---|
| 1 | Send Communication | X X | | X |
| 2 | Queue a Communication Request | X | | |
| 3 | Create Communication History | X | | |
| 4 | Update Communication Archival Status | X | | |
| 5 | Update Communication Status | X | | |
| 6 | Process Queued Communication Requests | X | | |
| 7 | Resend a Communication | X | | |
| 8 | Queue a Resend Request | X | | |
| 9 | Process Queued Resend Communication Requests | X | | |
| 10 | Convert Prospects to Customers | X | | |
| 11 | Purge Communication History | X | | |
| 12 | Create Metrics Extract | X | | |
| 13 | Generate Error Report | X | | |
| 14 | Generate a Communication | X | | |
| 15 | Retrieve archived Communication | | X | |
| 16 | Archive Communication | | X | |
| 17 | List/Search Templates | X | | |
| 18 | Get Template Details | X | | |
| 19 | Search Communication History | X | | |
| 20 | Retrieve Communication Details | X | | |
| 21 | Update Communication History | X | | |
| 22 | Create and Manage Document Template | X | | |
| 23 | Define Rule and Data Dictionary | X | | |
| 24 | Define Data Capture Template | X | | |
| 25 | Define Document Fragments | X | | |
| 26 | Deploy Template | X | | |
| 27 | Transfer Templates & Content to Dialogue | | | |
| 28 | Serve Content | X | | |
| 29 | Federated Document Search | | X | |
| 30 | Retrieve a Document | | X | X |
| 31 | Retrieve Document Pages | | X | |
| 32 | Archive a Document | | X | X |
| 33 | Split Document | | X | |
| 34 | Index/Re-Index a Document | | X | |
| 35 | Document Conversion | | X | |
| 36 | Retrieve Secure eMessages from a Folder | | X | X |
| 37 | Retrieve a Secure Message | | X | X |
| 38 | Return count of unread messages in a folder | | X | X |
| 39 | Mark a Secure eMessage read/unread | | X | X |
| 40 | Delete/Undelete a Message | | X | X |
| 41 | Create a new Message in a folder | | X | X |
| 42 | Purge Secure eMessages | | X | X |
| 43 | File Transformation | | | X X |

In various embodiments, ICCM supports one or more of:

New Communication Documents
    New templates and content in ICCM

Figure 61:
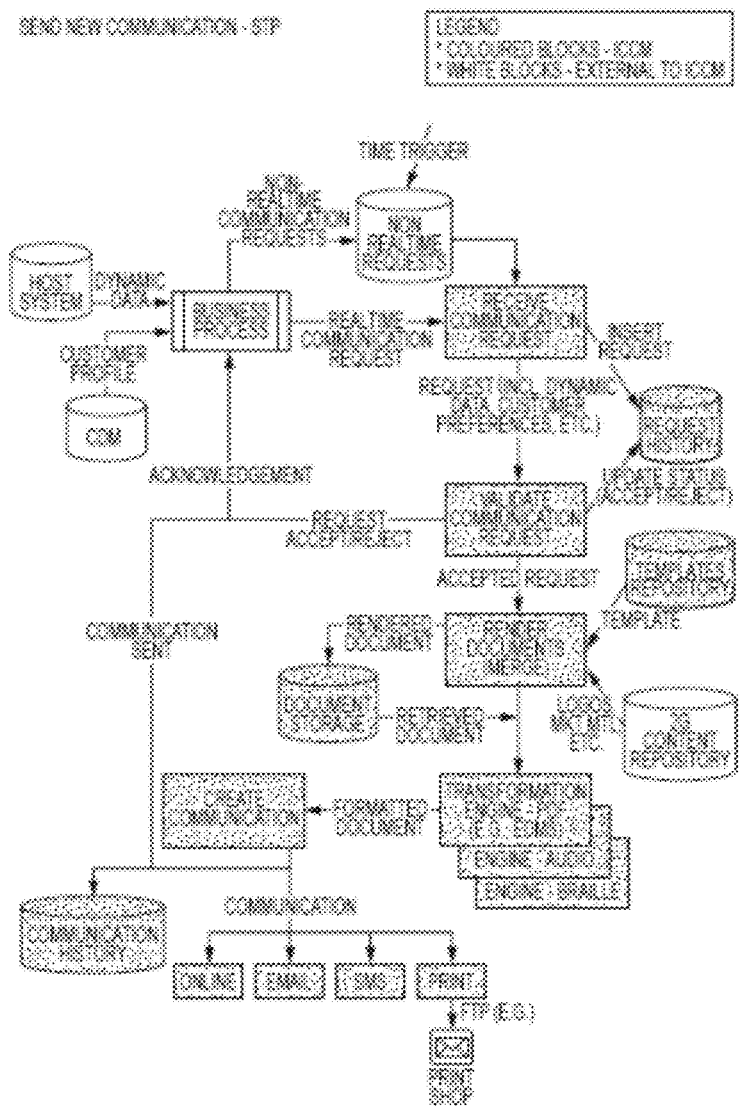
FIG. 61 shows an exemplary process diagram for Send New Communication (Straight Through Processing), according to some embodiments.
Figure 62:
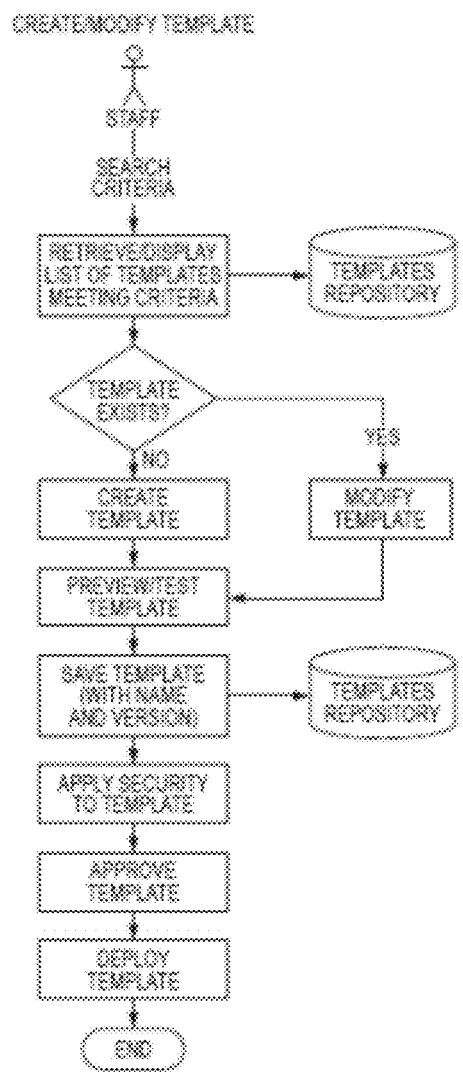
FIG. 62 shows an exemplary process diagram for Create/Modify Template according to some embodiments.

Send Templated Communications
    Allows staff to send any communication for which templates exist in ICCM
    Support for preview of communication, and approval based on user entitlements Communication Viewing
  Search and view communication documents on staff and customer channels
Message Center
  Support inbound communication; fulfillment database to hold secure eMessages; integration with staff mail boxes; EDMS can manage secure eMessages
Document Channel
  HTTP-based document retrieval channel to handle large documents; FTRAN and ICCM can temporarily archive large documents; front end applications can use document channel to retrieve documents for viewing
Communication Channels
  Include fax and Message Center
Resend Communications
  Support for resending non ICCM documents to customers, as well as sending multiple copies
Send Communications
  Support for multi-cast (send communication to multiple customers)
Generic Interface for ICCM
  Generic and granular interface for ICCM can avoid IT code changes for template changes to a business communication FIGS. 61 and 62 show exemplary process diagrams for Send New Communication (Straight Through Processing) and Create/Modify Template functions, respectively.

Figure 63:
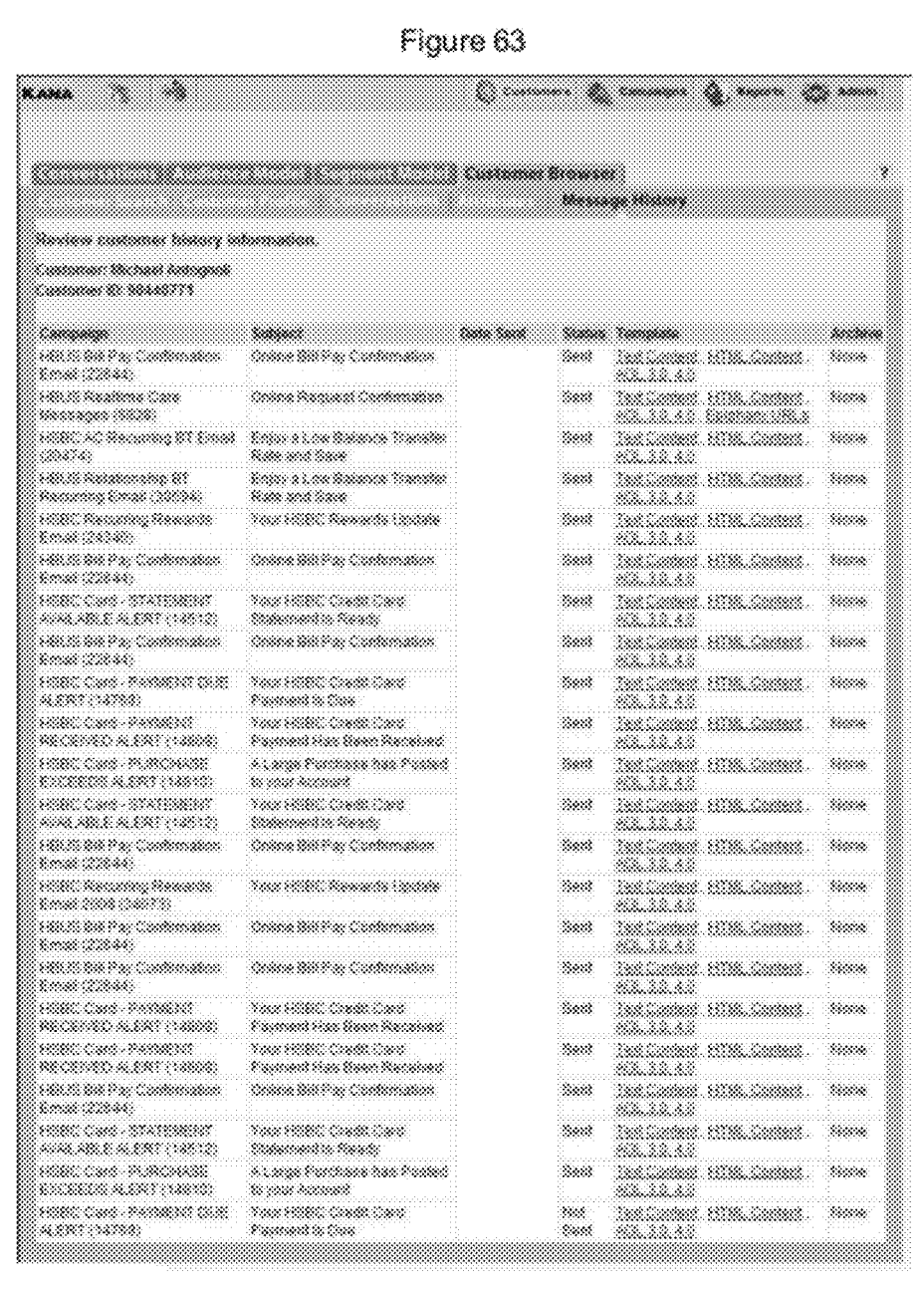

FIG. 63 shows an exemplary customer history screen, according to some embodiments. A customer may have a customer ID, and a message history may be displayed, showing messages, for example, by one or more of campaign, subject, date sent, status, template, and archive.

In some embodiments, ICCM is the group strategic solution for the delivery and receipt of structured customer communications. Structured customer communications refer to both printed and electronic formats commonly delivered as letters, invoices, alerts, notifications, agreements, advices, etc.

In various embodiments, ICCM can help an organization deliver global customer service and brand excellence, for example:
Provide Multi-Channel Integration
  Single content repository controls "look and feel" across channels allowing for consistent brand and marketing
  Channel preferences can be controlled by customer to easily switch to low-cost or convenient channels
Develop Modular Solution
  Can be coupled to a larger system, able to work with various group systems following IT standards
  Customer agnostic—fits PFS, CMB, institutional clients, third party, etc.
Produce Cost Savings
  Reduce deployment and maintenance time for communications
  Facilitate migration from paper to electronic formats
Deliver Consistent Customer Experience
  Enable communications to express voice and tone of the organization's brand across geographic entities
  Users are provided a consolidated view of communications history with retrieve, view, and resend capabilities
Empower Business Users
  Business users directly control content, timing, and customer groups for communications
  Control over most effective design for each channel Benefits of ICCM may include, for example: reduce redundant functionality across group systems and regional solutions; improve deployment processes and increase utilization of group systems; increase global propositions and capabilities; expand direct channel product range and leverage direct for emerging markets; establish a single operational model, delivering economies of scale in existing and emerging markets while providing scalability; eradicate duplication on a global scale through global simplification and standardization.

Table 16 summarizes exemplary features and benefits of ICCM.

TABLE 16

| Features: | Benefits: |
| --- | --- |
| Standard content and templates. Pre-built "look and feel" for standardized communications as part of a workstream release. Initial release contains standard content and templates for Account Opening of Savings, Checking, Term Deposit, Overdraft and Credit Cards. | Cost savings to individual entities with pre-developed templates that can be configured upon deployment for local compliance for rapid deployment. |
| Template Management. System to organize, version, dynamically update, and administer content and templates. | Reduced time to market and staff effort over multiple designs of communications. |
| Multi-channel outbound delivery. Communications delivered via email, SMS, high-volume print, secure bank mail, fax, local print, and additional channels as needed. | Single solution in support of multiple channels reduces redundant outbound communication solutions and promotes consistent branding and marketing. |
| Multi-channel inbound acceptance. Offers an automated solution to receive, classify, notify, reply and store from end-customer channels SMS, email, physical mail, and branch. | Single solution in support of multiple channels reduces redundant inbound communication solutions and promotes consistent handling |
| Archive and Records Management. Storage for all types of structured communications configurable for efficient management. | Reduces cost of saving documents by keeping only what is necessary and for the optimal amount of time. |
| Communications History. Searchable and viewable history of all communication requests made to ICCM. Communications which have been archived are retrievable in same search. | Complete history of all structured communications delivered to a customer assists both CRM and Compliance needs. |

Table 17 summarizes exemplary product applications of ICCM and their functions. Additional ICCM product capabilities are also contemplated.

TABLE 17

| Component: | Function: |
| --- | --- |
| ICCM Controller | In house developed Java-based application that orchestrates inbound and outbound communications. Manages channel selection(s), failure handling, archive, and history activities. |
| Business Design Environment | Provides design and delivery for communications. |
| HP Dialogue | Provides control for channel dependent settings (templates). Returns delivery success and failure information to ICCM Controller. |
| BrickStreet Connect | |
| SemCast | |
| EDMS | Provides archive and retrieval services. Inbound and Outbound customer communications are stored, depending on business need, and are available for later retrieval and resend. |
| IBM On Demand | |

The detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the instructions and/or operations performed may be referred to in terms, such as generating, determining, adding and/or comparing. The instructions and/or operations described herein which form part of the present invention are machine operations. Useful machines for performing the operation of the present invention include general purpose digital computers or similar devices that have been programmed to perform these specialized operations.

The present invention also relates to apparatus for performing these operations. This apparatus may be specially constructed for the required purpose or it may comprise a general purpose computer as selectively activated or reconfigured by a computer program stored in the computer. Various general purpose machines may be used with programs written in accordance with the teachings herein providing a specialized machine thereby, or it may prove more convenient to construct more specialized apparatus to perform the required method steps. The required structure for a variety of these machines will appear from the description given.

The system according to the invention may include a general purpose computer programmed in a particular manner, or a specially programmed special purpose computer. The user may interact with the system, for example, via a personal computer, wireless device, PDA, etc. Either of these may be implemented as a distributed computer system rather than a single computer. Similarly, the communications link may be a dedicated link, a modem over a POTS line, the Internet, an Intranet and/or any other method of communicating between computers and/or users. Moreover, the processing could be controlled by a software program on one or more computer systems or processors, or could even be partially or wholly implemented in hardware.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, laptop/notebook, mini, mainframe and super computers, wireless smart devices, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

It is to be understood that the invention is not limited in its application to the details of construction and to the arrangements of the components set forth in the description above or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

What is claimed is:

1. An integrated customer communications computer system, comprising:
    at least one computer database; and
    a communications computer system, in communication with said at least one database and at least one component of an account opening system, and configured to provide outbound customer communications,
    wherein the communications computer system generates documents associated with the communications in a predefined format, in real-time or in batch, by merging templates comprising static data received from a template repository, dynamic data received from said at least one component of the account opening system, and static content for the templates received from a content repository, and
    wherein the communications computer system includes:
        a communication manager, comprising:
            a communication controller receiving, recording, sending, and processing at least one of communication requests and history requests from the at least one component of the account opening system, and transmitting communications responsive thereto;
            a document manager managing documents associated with the communications; and
            a communication history component maintaining a record of the communications transmitted, including at least one of date, time, channel, and content, and saving the record to a communication history database;
        a plurality of transmission channels for transmitting the communications;
        an interface for managing the templates and the content; and
        a document repository storing, retrieving, and managing storage of the documents
    wherein the interface for managing the templates is configured to provide a user functionality to create, preview, edit, maintain and delete communication templates for different channels, define what data items are included in the communication, insert dynamic variables that vary by at least one of channel and communication type, define a source of the dynamic data for the communication, and make deployments to various environments for validation.

2. The integrated customer communications computer system of claim 1, wherein the communications computer system transmits the documents to at least one of the channels via a communication link.

3. The integrated customer communications computer system of claim 1, wherein the communications computer system transmits the documents to at least one of multiple channels and multiple recipients.

4. The integrated customer communications computer system of claim 1, wherein the communications computer system receives channel preferences for the communication from a customer data management system.

5. The integrated customer communications computer system of claim 1, wherein the communication requests comprise individual communication requests and batch communication requests.

6. The integrated customer communications computer system of claim 5, wherein the communication manager further comprises a batch handler managing batch communications responsive to the batch communication requests.

7. The integrated customer communications computer system of claim 1, wherein the communication requests are for at least one of a new document to be generated by the communications computer system and an existing document to be retrieved from said at least one database.

8. The integrated customer communications computer system of claim 1, wherein the communications computer system is configured to determine when more than one communication for the same recipient is transmitted by the same communication method, and when the more than one communication is transmitted by the same communication method, the communications computer system groups the communications together into one communication.

9. The integrated customer communications computer system of claim 1, wherein the communications computer system provides logs of the communications to a customer contact history database.

10. The integrated customer communications computer system of claim 1, wherein said document repository manages the storage of the documents by setting a configurable maximum storage period at a document level.

11. The integrated customer communications computer system of claim 1, wherein the communications computer system converts a saved document to a different format for transmission.

12. The integrated customer communications module of claim 1, wherein said communication history component maintains and configures the communication history to be searchable by at least one of customer, communication type, channel, and date.

13. The integrated customer communications computer system of claim 1, wherein the communications computer system provides the communications automatically, responsive to a predetermined configurable trigger event or alert.

14. The integrated customer communications computer system of claim 1, wherein the communications computer system is configured to capture metrics data regarding messages sent, delivered, bounced, opened, and clicked, and transmit the metrics data to a computer intelligence system to generate reports at aggregate and detailed customer level views.

15. The integrated customer communications computer system of claim 1, wherein the communications computer system further includes an interface that is configured to provide a user functionality to manage communications; access, retrieve, and view the stored documents; view the communication history; and view metrics and request reports.

16. The integrated customer communications computer system of claim 1, wherein said communication controller receives the at least one of communication requests and history requests from at least one of a front end application, an application processing engine, and a product or service system.

17. The integrated customer communications computer system of claim 16, wherein said communication controller is configured to route the communication requests to a predetermined channel for distribution.

18. The integrated customer communications computer system of claim 16, wherein the front end application executes at least one of a free format portlet to transmit a free format communication, and a communication history portlet enabling a user to search the transmitted communications for review and resend to the same transmission channel.

19. The integrated customer communications computer system of claim 1, wherein the communications computer system transmits the documents to a third party system, including at least one of a print service provider, an SMS provider, and an email provider.

20. The integrated customer communications computer system of claim 1, wherein the communication requests include a request type, a message ID, a message version, a product type, a document type, a channel ID, customer data, and account information.

21. The integrated customer communications computer system of claim 1, wherein the communication requests comprise information regarding what documents are to be sent, the dynamic data required to generate the documents, the document formats, the delivery channels, and the data required by the delivery channels.

22. The integrated customer communications computer system of claim 1, wherein the communications computer system is configured to determine when the data required by the delivery channels is not provided in the communication request, and when the data required by the delivery channels is not provided in the communication request, the communications computer system retrieves the data from the at least one component of the account opening system.

23. The integrated customer communications computer system of claim 1, wherein the communications computer system further includes a message handler providing an interface to external applications.

24. The integrated customer communications computer system of claim 1, wherein the communications computer system is configured to transmit the communications using the dynamic data and the templates to an automated teller machine (ATM).

25. The integrated customer communications computer system of claim 1, wherein said interface for managing the templates and the content is configured to be accessible to a user based on entitlements.

26. The integrated customer communications computer system of claim 1, wherein said interface for managing the templates and the content is configured to provide the user functionality to request the communications, wherein said user functionality to request the communications comprises functionality to:
    select the template comprising at least one of header, footer, marketing, body, and web links;
    select a milestone comprising at least one of validate identity, decisioning, product configuration, funding, and boarding/fulfillment;
    select at least one of a message type, a brand, a line of business description, a language, a layout, and a channel; and
    enter the content and select images to be included in the document,
and wherein the communications computer system is configured to display, responsive to the user selection, the template specific for the selected channel and layout.

27. The integrated customer communications computer system of claim 1, wherein said interface for managing the templates and the content is configured to interface with a content management application to retrieve a channel layout template, generate the content, apply the content to the template, and transmit the communication to the customer.

28. The integrated customer communications computer system of claim 1, wherein said interface for managing the templates and the content is configured to receive input from a user comprising at least one of text, images, layout, and templates, and to deploy content control files comprising user entered content and images in a predetermined format responsive to the channel to a content and template host server.

29. The integrated customer communications computer system of claim 28, wherein said content and template hosting server is configured to be accessible to local interfaces of different geographical locations for managing the templates and the content.

30. The integrated customer communications computer system of claim 1, wherein said communication controller is configured to receive inbound communications from a plurality of channels.

31. A computer implemented method of providing integrated customer communications, comprising:
    generating documents associated with the communications in a predefined format, in real-time or in batch, by merging templates comprising static data received from a template repository, dynamic data received from at least one component of the account opening system, and static content for the templates received from a content repository, wherein said generating comprises:
        receiving, recording, sending, and processing at least one of communication requests and history requests from the at least one component of the account opening system, and transmitting communications responsive thereto;
        managing documents associated with the communications; and
        maintaining a record of the communications transmitted, including at least one of date, time, channel, and content, and saving the record to a communication history database;
    transmitting the communications via one or more transmission channels;
    managing the templates and the content; and
    storing, retrieving, and managing storage of the documents,
    wherein he managing the templates comprises creating, previewing, editing, maintaining and deleting communication templates for different channels, defining what data items are included in the communication, inserting dynamic variables that vary by at least one of channel and communication type, defining a source of the dynamic data for the communication, and making deployments to various environments for validation.

32. The computer implemented method of providing customer communications of claim 31, further comprising transmitting the documents to at least one of multiple channels and multiple recipients.

33. The computer implemented method of providing customer communications of claim 31, further comprising managing batch communications responsive to batch communication requests.

34. The computer implemented method of providing customer communications of claim 31, further comprising determining when more than one communication for the same recipient is transmitted by the same communication method, and when the more than one communication is transmitted by the same communication method, grouping the communications together into one communication.

35. The computer implemented method of providing customer communications of claim 31, further comprising providing logs of the communications to a customer contact history database.

36. The computer implemented method of providing customer communications of claim 31, further comprising generating the documents associated with the communications automatically, responsive to a predetermined configurable trigger event or alert.

37. The computer implemented method of providing customer communications of claim 31, further comprising capturing metrics data regarding messages sent, delivered, bounced, opened, and clicked, and transmitting the metrics data to a computer intelligence system to generate reports at aggregate and detailed customer level views.

38. The computer implemented method of providing customer communications of claim 31, further comprising at least one of managing communications; accessing, retrieving, and viewing the stored documents; viewing the communication history; and viewing metrics and request reports.

39. The computer implemented method of providing customer communications of claim 31, further comprising transmitting the documents to a third party system, including at least one of a print service provider, an SMS provider, and an email provider.

40. The computer implemented method of providing customer communications of claim 31, further comprising determining when the data required by the delivery channels is not provided in the communication request, and when the data required by the delivery channels is not provided in the communication request, retrieving the data from the at least one component of the account opening system.

41. The computer implemented method of providing customer communications of claim 31, further comprising transmitting the communications using the dynamic data and the templates to an automated teller machine (ATM).

42. The computer implemented method of providing customer communications of claim 31, further comprising requesting the communications, wherein said requesting the communications comprises:
selecting the template comprising at least one of header, footer, marketing, body, and web links;
selecting a milestone comprising at least one of validate identity, decisioning, product configuration, funding, and boarding/fulfillment;
selecting at least one of a message type, a brand, a line of business description, a language, a layout, and a channel; and
entering the content and select images to be included in the document.

43. The computer implemented method of providing customer communications of claim 31, wherein the managing the templates and the content comprises interfacing with a content management application to retrieve a channel layout template, generate the content, apply the content to the template, and transmit the communication to the customer.

44. The computer implemented method of providing customer communications of claim 31, wherein the managing the templates and the content comprises receiving input from a user comprising at least one of text, images, layout, and templates, and deploying content control files comprising user entered content and images in a predetermined format responsive to the channel to a content and template host server.

45. The computer implemented method of providing customer communications of claim 31, further comprising receiving inbound communications from a plurality of channels.

46. The integrated customer communications computer system of claim 1,
wherein said communication controller receives, records, sends, and processes the communication requests and history requests from the at least one component of the account opening system, and transmits the communications responsive thereto, and
wherein the communication history component maintains a record of the communications transmitted, including the date, the time, the channel, and the content, and saves the record to the communication history database.

47. An integrated customer communications computer system, comprising:
at least one computer database; and
a communications computer system, in communication with said at least one database and at least one component of an account opening system, and configured to provide outbound customer communications,
wherein the communications computer system generates documents associated with the communications in a predefined format, in real-time or in batch, by merging templates comprising static data received from a template repository, dynamic data received from said at least one component of the account opening system, and static content for the templates received from a content repository, and
wherein the communications computer system includes:
a communication manager, comprising:
a communication controller receiving, recording, sending, and processing at least one of communication requests and history requests from the at least one component of the account opening system, and transmitting communications responsive thereto;
a document manager managing documents associated with the communications; and
a communication history component maintaining a record of the communications transmitted, including at least one of date, time, channel, and content, and saving the record to a communication history database;
a plurality of transmission channels for transmitting the communications;
an interface for managing the templates and the content; and
a document repository storing, retrieving, and managing storage of the documents,
wherein said communication controller receives the at least one of communication requests and history requests from at least one of a front end application, an application processing engine, and a product or service system, and
wherein the front end application executes at least one of a free format portlet to transmit a free format communication, and a communication history portlet enabling a user to search the transmitted communications for review and resend to the same transmission channel.

48. An integrated customer communications computer system, comprising:
at least one computer database; and
a communications computer system, in communication with said at least one database and at least one component of an account opening system, and configured to provide outbound customer communications,
wherein the communications computer system generates documents associated with the communications in a predefined format, in real-time or in batch, by merging templates comprising static data received from a template repository, dynamic data received from said at least one component of the account opening system, and static content for the templates received from a content repository, and
wherein the communications computer system includes:
a communication manager, comprising:

a communication controller receiving, recording, sending, and processing at least one of communication requests and history requests from the at least one component of the account opening system, and transmitting communications responsive thereto;

a document manager managing documents associated with the communications; and a communication history component maintaining a record of the communications transmitted, including at least one of date, time, channel, and content, and saving the record to a communication history database;

a plurality of transmission channels for transmitting the communications;

an interface for managing the templates and the content; and a document repository storing, retrieving, and managing storage of the documents, wherein said interface for managing the templates and the content is configured to provide the user functionality to request the communications, wherein said user functionality to request the communications comprises functionality to:

select the template comprising at least one of header, footer, marketing, body, and web links;

select a milestone comprising at least one of validate identity, decisioning, product configuration, funding, and boarding/fulfillment;

select at least one of a message type, a brand, a line of business description, a language, a layout, and a channel; and enter the content and select images to be included in the document, and wherein the communications computer system is configured to display, responsive to the user selection, the template specific for the selected channel and layout.

49. An integrated customer communications computer system, comprising:

at least one computer database; and a communications computer system, in communication with said at least one database and at least one component of an account opening system, and configured to provide outbound customer communications, wherein the communications computer system generates documents associated with the communications in a predefined format, in real-time or in batch, by merging templates comprising static data received from a template repository, dynamic data received from said at least one component of the account opening system, and static content for the templates received from a content repository, and wherein the communications computer system includes:

a communication manager, comprising:

a communication controller receiving, recording, sending, and processing at least one of communication requests and history requests from the at least one component of the account opening system, and transmitting communications responsive thereto;

a document manager managing documents associated with the communications; and a communication history component maintaining a record of the communications transmitted, including at least one of date, time, channel, and content, and saving the record to a communication history database;

a plurality of transmission channels for transmitting the communications;

an interface for managing the templates and the content; and a document repository storing, retrieving, and managing storage of the documents wherein said interface for managing the templates and the content is configured to receive input from a user comprising at least one of text, images, layout, and templates, and to deploy content control files comprising user entered content and images in a predetermined format responsive to the channel to a content and template host server, and wherein said content and template hosting server is configured to be accessible to local interfaces of different geographical locations for managing the templates and the content.

50. A computer implemented method of providing integrated customer communications, comprising:

generating documents associated with the communications in a predefined format, in real-time or in batch, by merging templates comprising static data received from a template repository, dynamic data received from at least one component of the account opening system, and static content for the templates received from a content repository, wherein said generating comprises:

receiving, recording, sending, and processing at least one of communication requests and history requests from the at least one component of the account opening system, and transmitting communications responsive thereto;

managing documents associated with the communications; and maintaining a record of the communications transmitted, including at least one of date, time, channel, and content, and saving the record to a communication history database;

transmitting the communications via one or more transmission channels;

managing the templates and the content;

storing, retrieving, and managing storage of the documents; and requesting the communications, wherein said requesting the communications comprises:

selecting the template comprising at least one of header, footer, marketing, body, and web links;

selecting a milestone comprising at least one of validate identity, decisioning, product configuration, funding, and boarding/fulfillment;

selecting at least one of a message type, a brand, a line of business description, a language, a layout, and a channel; and entering the content and select images to be included in the document.

* * * * *